(12) United States Patent
Ingersoll et al.

(10) Patent No.: US 8,161,741 B2
(45) Date of Patent: Apr. 24, 2012

(54) SYSTEM AND METHODS FOR OPTIMIZING EFFICIENCY OF A HYDRAULICALLY ACTUATED SYSTEM

(75) Inventors: Eric D. Ingersoll, Cambridge, MA (US); Justin A. Aborn, Hingham, MA (US); Matthew Blieske, Boston, MA (US)

(73) Assignee: General Compression, Inc., Newton, MA (US)

( * ) Notice: Subject to any disclaimer, the term of this patent is extended or adjusted under 35 U.S.C. 154(b) by 0 days.

(21) Appl. No.: 12/977,724

(22) Filed: Dec. 23, 2010

(65) Prior Publication Data

US 2011/0258996 A1     Oct. 27, 2011

Related U.S. Application Data

(60) Provisional application No. 61/290,107, filed on Dec. 24, 2009.

(51) Int. Cl.
*F15B 11/16* (2006.01)
*F04B 35/02* (2006.01)

(52) U.S. Cl. ............. 60/425; 91/519; 417/396; 417/403

(58) Field of Classification Search .................... 91/519; 60/425; 417/396, 399, 401, 403
See application file for complete search history.

(56) References Cited

U.S. PATENT DOCUMENTS

| | | | |
|---|---|---|---|
| 1,045,961 A | 12/1912 | Ferranti |
| 1,230,028 A | 6/1917 | Rardon |
| 1,918,789 A | 7/1933 | Titsworth |
| 1,947,304 A | 2/1934 | Morro |
| 2,339,086 A | 1/1944 | Makaroff |
| 2,479,856 A | 8/1949 | Mitton |
| 2,898,183 A | 8/1959 | Fauser |
| 3,014,639 A | 12/1961 | Boli |
| 3,232,524 A | 2/1966 | Rice at al. |
| 3,530,681 A | 9/1970 | Dehne |

(Continued)

FOREIGN PATENT DOCUMENTS

GB        2013318 A    8/1979

(Continued)

OTHER PUBLICATIONS

Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute, 50 pages.

(Continued)

*Primary Examiner* — Daniel Lopez
(74) *Attorney, Agent, or Firm* — Cooley LLP

(57) ABSTRACT

Systems and methods for efficiently operating a hydraulically actuated device/system are described herein. For example, systems and methods for efficiently operating a gas compression and expansion energy storage system are disclosed herein. Systems and methods are provided for controlling and operating the hydraulic actuators used within a hydraulically actuated device/system, such as, for example, a gas compression and/or expansion energy system, within a desired efficiency range of the hydraulic pump(s)/motor(s) used to supply or receive pressurized hydraulic fluid to or from the hydraulic actuators. In such a system, a variety of different operating regimes can be used depending on the desired output gas pressure and the desired stored pressure of the compressed gas. Hydraulic cylinders used to drive working pistons within the system can be selectively actuated to achieve varying force outputs to incrementally increase the gas pressure within the system for a given cycle.

27 Claims, 60 Drawing Sheets

U.S. PATENT DOCUMENTS

| | | | |
|---|---|---|---|
| 3,618,470 A * | 11/1971 | Mueller et al. | 91/515 |
| 3,677,008 A | 7/1972 | Koutz | |
| 3,792,643 A * | 2/1974 | Scheafer | 91/519 |
| 3,818,801 A * | 6/1974 | Kime | 91/519 |
| 3,832,851 A | 9/1974 | Kiernan | |
| 3,854,301 A | 12/1974 | Cytryn | |
| 3,958,899 A | 5/1976 | Coleman, Jr. et al. | |
| 3,968,732 A | 7/1976 | Fitzgerald | |
| 4,150,547 A | 4/1979 | Hobson | |
| 4,215,548 A | 8/1980 | Beremand | |
| 4,348,863 A | 9/1982 | Taylor et al. | |
| 4,466,244 A | 8/1984 | Wu | |
| 4,478,556 A | 10/1984 | Gozzi | |
| 4,537,558 A | 8/1985 | Tsunoda et al. | |
| 4,585,039 A | 4/1986 | Hamilton | |
| 4,593,202 A | 6/1986 | Dickinson | |
| 4,603,551 A | 8/1986 | Wood | |
| 4,610,369 A | 9/1986 | Mercier | |
| 4,706,685 A | 11/1987 | Jones, Jr. et al. | |
| 4,714,411 A | 12/1987 | Searle | |
| 4,761,118 A | 8/1988 | Zanarini | |
| 4,765,225 A | 8/1988 | Birchard | |
| 4,784,579 A | 11/1988 | Gazzera | |
| 4,849,648 A | 7/1989 | Longardner | |
| 4,959,958 A | 10/1990 | Nishikawa et al. | |
| 5,099,648 A | 3/1992 | Angle | |
| 5,138,936 A | 8/1992 | Kent | |
| 5,142,870 A | 9/1992 | Angle | |
| 5,161,865 A | 11/1992 | Higashimate et al. | |
| 5,169,295 A | 12/1992 | Stogner et al. | |
| 5,179,837 A | 1/1993 | Sieber | |
| 5,184,936 A | 2/1993 | Nojima | |
| 5,253,619 A | 10/1993 | Richeson et al. | |
| 5,259,738 A | 11/1993 | Salter et al. | |
| 5,322,418 A | 6/1994 | Comer | |
| 5,387,089 A | 2/1995 | Stogner et al. | |
| 5,394,695 A | 3/1995 | Sieber | |
| 5,537,822 A | 7/1996 | Shnaid et al. | |
| 5,564,912 A | 10/1996 | Peck et al. | |
| 5,584,664 A | 12/1996 | Elliott et al. | |
| 5,622,478 A | 4/1997 | Elliott et al. | |
| 5,634,340 A | 6/1997 | Grennan | |
| 5,674,053 A | 10/1997 | Paul et al. | |
| 5,716,197 A | 2/1998 | Paul et al. | |
| 5,769,610 A | 6/1998 | Paul et al. | |
| 5,771,693 A | 6/1998 | Coney | |
| 5,782,612 A | 7/1998 | Margardt | |
| 5,807,083 A | 9/1998 | Tomoiu | |
| 5,839,270 A | 11/1998 | Jirnov et al. | |
| 5,863,186 A | 1/1999 | Green et al. | |
| 5,993,170 A | 11/1999 | Stevens et al. | |
| 6,026,349 A | 2/2000 | Heneman | |
| 6,052,992 A | 4/2000 | Eroshenko | |
| 6,113,357 A | 9/2000 | Dobbs | |
| 6,145,311 A | 11/2000 | Cyphelly | |
| 6,206,660 B1 | 3/2001 | Coney et al. | |
| RE37,603 E | 3/2002 | Coney | |
| 6,371,145 B1 | 4/2002 | Bardon | |
| 6,371,733 B1 | 4/2002 | Renfro | |
| 6,397,794 B1 | 6/2002 | Sanderson et al. | |
| 6,446,587 B1 | 9/2002 | Sanderson et al. | |
| 6,460,450 B1 | 10/2002 | Sanderson et al. | |
| 6,499,288 B1 | 12/2002 | Knight | |
| 6,558,134 B2 | 5/2003 | Serafin et al. | |
| 6,568,169 B2 | 5/2003 | Conde et al. | |
| 6,568,911 B1 | 5/2003 | Brightwell et al. | |
| 6,638,024 B1 | 10/2003 | Hancock | |
| 6,652,241 B1 | 11/2003 | Alder | |
| 6,652,243 B2 | 11/2003 | Krasnov | |
| 6,655,155 B2 | 12/2003 | Bishop | |
| 6,695,591 B2 | 2/2004 | Grimmer et al. | |
| 6,711,984 B2 | 3/2004 | Tagge et al. | |
| 6,725,671 B2 | 4/2004 | Bishop | |
| 6,733,253 B2 | 5/2004 | Vockroth | |
| 6,817,185 B2 | 11/2004 | Coney et al. | |
| 6,829,978 B2 | 12/2004 | Sanderson et al. | |
| 6,854,377 B2 | 2/2005 | Sanderson et al. | |
| 6,913,447 B2 | 7/2005 | Fox et al. | |
| 6,915,765 B1 | 7/2005 | Sanderson et al. | |
| 6,925,973 B1 | 8/2005 | Sanderson et al. | |
| 6,957,632 B1 | 10/2005 | Carlson et al. | |
| 6,959,546 B2 | 11/2005 | Corcoran | |
| 6,994,104 B2 | 2/2006 | Bishop et al. | |
| 6,997,685 B2 | 2/2006 | Lemmen | |
| 7,001,158 B2 | 2/2006 | Dunn | |
| 7,007,589 B1 | 3/2006 | Sanderson | |
| 7,011,469 B2 | 3/2006 | Sanderson et al. | |
| 7,021,602 B2 | 4/2006 | Davis et al. | |
| 7,210,496 B2 | 5/2007 | Suzuki | |
| 7,219,682 B2 | 5/2007 | Agnew et al. | |
| 7,257,952 B2 | 8/2007 | Bishop et al. | |
| 7,308,361 B2 | 12/2007 | Enis et al. | |
| 7,377,492 B2 | 5/2008 | Vrana et al. | |
| 7,395,748 B2 | 7/2008 | Krimbacher | |
| 7,488,159 B2 | 2/2009 | Bhatt et al. | |
| 7,527,482 B2 | 5/2009 | Ursan et al. | |
| 7,530,300 B2 | 5/2009 | Hornstein | |
| 7,543,668 B1 | 6/2009 | Schechter | |
| 7,604,064 B2 | 10/2009 | Irwin, Jr. | |
| 7,610,955 B2 | 11/2009 | Irwin, Jr. | |
| 7,640,736 B2 | 1/2010 | Arbel et al. | |
| 7,656,055 B2 | 2/2010 | Torres et al. | |
| 7,663,255 B2 | 2/2010 | Kim et al. | |
| 7,696,632 B1 | 4/2010 | Fuller | |
| 7,802,426 B2 | 9/2010 | Bollinger | |
| 7,832,207 B2 | 11/2010 | McBride et al. | |
| 7,874,155 B2 | 1/2011 | McBride et al. | |
| 7,900,444 B1 | 3/2011 | McBride et al. | |
| 2003/0180155 A1 | 9/2003 | Coney et al. | |
| 2005/0180864 A1 | 8/2005 | Ursan et al. | |
| 2006/0078445 A1 | 4/2006 | Carter, III et al. | |
| 2006/0218908 A1 | 10/2006 | Abou-Raphael | |
| 2006/0248886 A1 | 11/2006 | Ma | |
| 2007/0187918 A1 | 8/2007 | Mizuno | |
| 2008/0060862 A1 | 3/2008 | Schlele et al. | |
| 2008/0163618 A1 | 7/2008 | Paul | |
| 2009/0260361 A1 | 10/2009 | Prueitt | |
| 2009/0282822 A1 | 11/2009 | McBride et al. | |
| 2009/0301089 A1 | 12/2009 | Bollinger | |
| 2010/0018196 A1 | 1/2010 | Li et al. | |
| 2010/0089063 A1 | 4/2010 | McBride et al. | |
| 2010/0139277 A1 | 6/2010 | McBride et al. | |
| 2010/0205960 A1 | 8/2010 | McBride et al. | |
| 2010/0229544 A1 | 9/2010 | Bollinger et al. | |
| 2010/0307156 A1 | 12/2010 | Bollinger et al. | |
| 2010/0326062 A1 | 12/2010 | Fong et al. | |
| 2010/0326064 A1 | 12/2010 | Fong et al. | |
| 2010/0326066 A1 | 12/2010 | Fong et al. | |
| 2010/0326068 A1 | 12/2010 | Fong et al. | |
| 2010/0326069 A1 | 12/2010 | Fong et al. | |
| 2010/0326075 A1 | 12/2010 | Fong et al. | |
| 2010/0329891 A1 | 12/2010 | Fong et al. | |
| 2010/0329903 A1 | 12/2010 | Fong et al. | |
| 2010/0329909 A1 | 12/2010 | Fong et al. | |
| 2011/0023488 A1 | 2/2011 | Fong et al. | |
| 2011/0023977 A1 | 2/2011 | Fong et al. | |
| 2011/0030359 A1 | 2/2011 | Fong et al. | |
| 2011/0030552 A1 | 2/2011 | Fong et al. | |
| 2011/0056193 A1 | 3/2011 | McBride et al. | |
| 2011/0056368 A1 | 3/2011 | McBride et al. | |
| 2011/0061741 A1 | 3/2011 | Ingersoll et al. | |
| 2011/0061836 A1 | 3/2011 | Ingersoll et al. | |
| 2011/0062166 A1 | 3/2011 | Ingersoll et al. | |
| 2011/0079010 A1 | 4/2011 | McBride et al. | |
| 2011/0083438 A1 | 4/2011 | McBride et al. | |
| 2011/0131966 A1 | 6/2011 | McBride et al. | |
| 2011/0167813 A1 | 7/2011 | McBride et al. | |
| 2011/0258999 A1 | 10/2011 | Ingersoll et al. | |
| 2011/0259001 A1 | 10/2011 | McBride et al. | |
| 2011/0259442 A1 | 10/2011 | McBride et al. | |

FOREIGN PATENT DOCUMENTS

| | | |
|---|---|---|
| WO | WO 90/03516 A1 | 4/1990 |
| WO | WO 93/06367 A1 | 4/1993 |
| WO | WO 98/17492 | 4/1998 |
| WO | WO 2005/069847 A2 | 4/2005 |
| WO | WO 2008/139267 | 11/2008 |

| WO | WO 2009/034548 | 3/2009 |
| WO | WO 2010/135658 | 11/2010 |
| WO | WO 2011/079267 | 6/2011 |
| WO | WO 2011/079271 | 6/2011 |

OTHER PUBLICATIONS

Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.

Carbon Trust, "Hydraulic Transmission System for Large Wind Turbines," Jan. 2007, 1 page.

Erbe, R., "Water Works: Less Expensive Than Oil and Environmentally Friendly, Water-Based Hydraulics Deserve a Closer Look," Machine Design, Sep. 13, 2007, vol. 116, 5 pages.

Simetric, "Mass, Weight, Density or Specific Gravity of Liquids," [online], [retrieved on Jan. 2, 2008]. Retrieved from the Internet: <URL: http://www.simetric.co.uk/si_liquids.htm>, 5 pages.

Ahrens, F. W., "Preliminary Evaluation of the Use of Hydraulic Air Compressors in Water-Compensated Reservoir Compressed Air Storage Power Plants," NTIS, Prepared for CAES Technology Symposium 1978, May 15-17, 1978, Pacific Grove, CA, Argonne National Laboratory, Argonne, Illinois, 24 pages.

"Swash-plate Type Axial Piston Pumps for Open Circuits in General Industrial Machinery," Kawasaki K3VG, Kawasaki Motor Corp., USA, 2006, 24 pages.

Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media, Inc., 4 pages.

Hydraulics & Pneumatics, Wobble-Plate Piston Pump [online], [retrieved on Oct. 18, 2007]. Retrieved from the Internet: <URL: http://www.hydraulicspneumatics.com/200/issue/article/true/43640>, 2007, Penton Media, Inc., 13 pages.

Sanderson, A. E., "Hydraulic System for Control of Power Windmills," undated, 11 pages.

Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15, 1978, 2 pages.

Cyphelly et al., "Usage of Compressed Air Storage Systems," Program Elektricity, Final Report May 2004, Ordered by the Swiss Federal Office of Energy.

\* cited by examiner

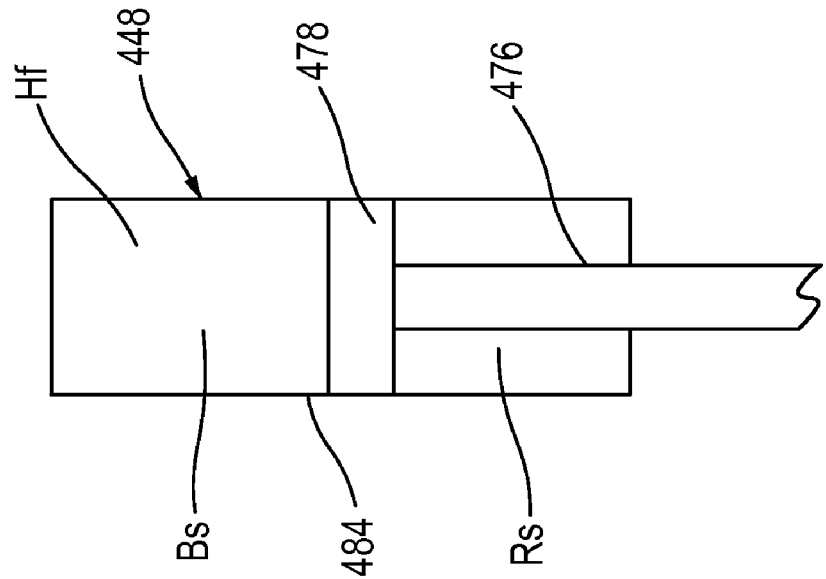
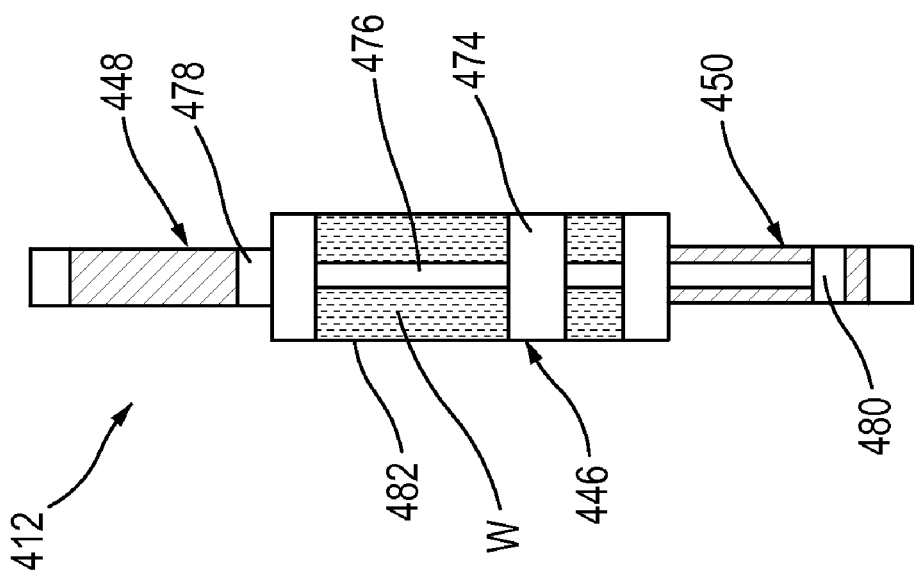
FIG. 6B
FIG. 6A

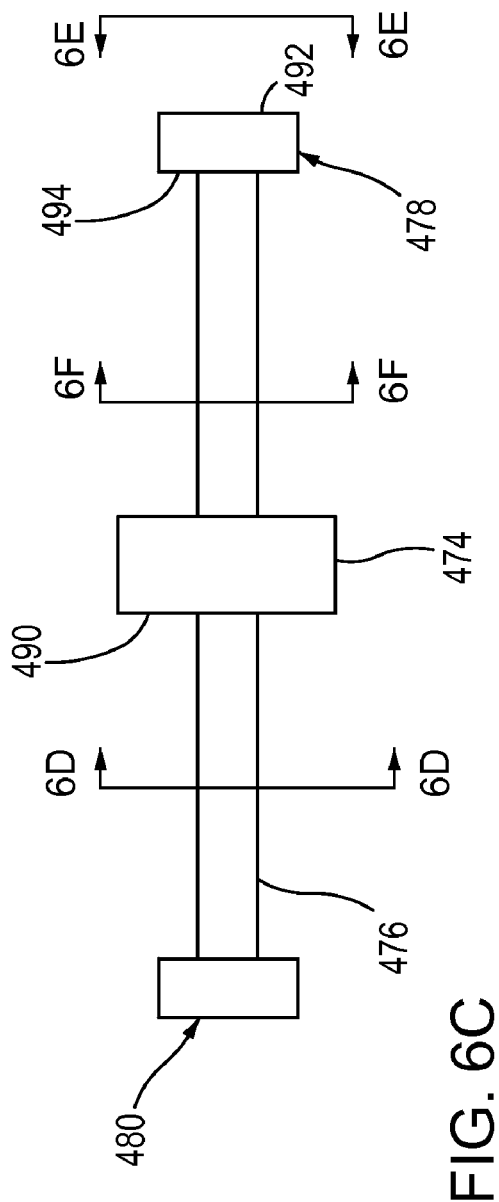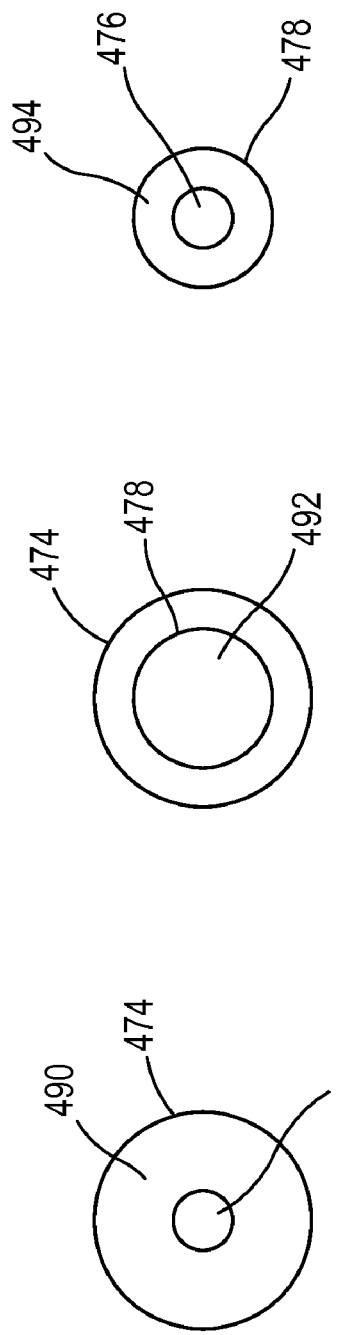

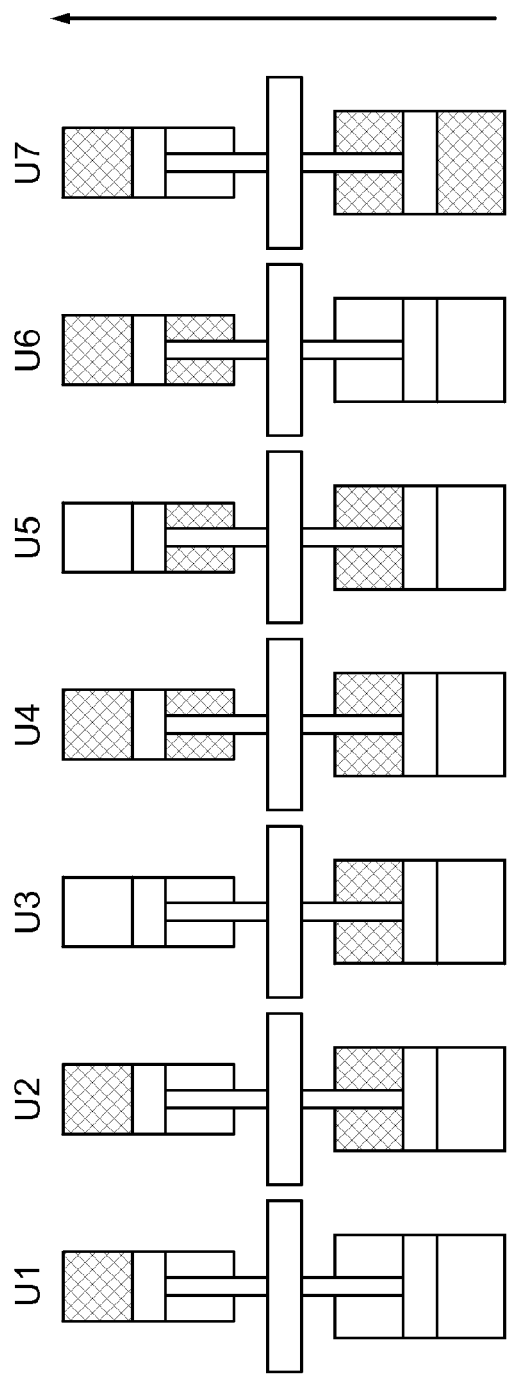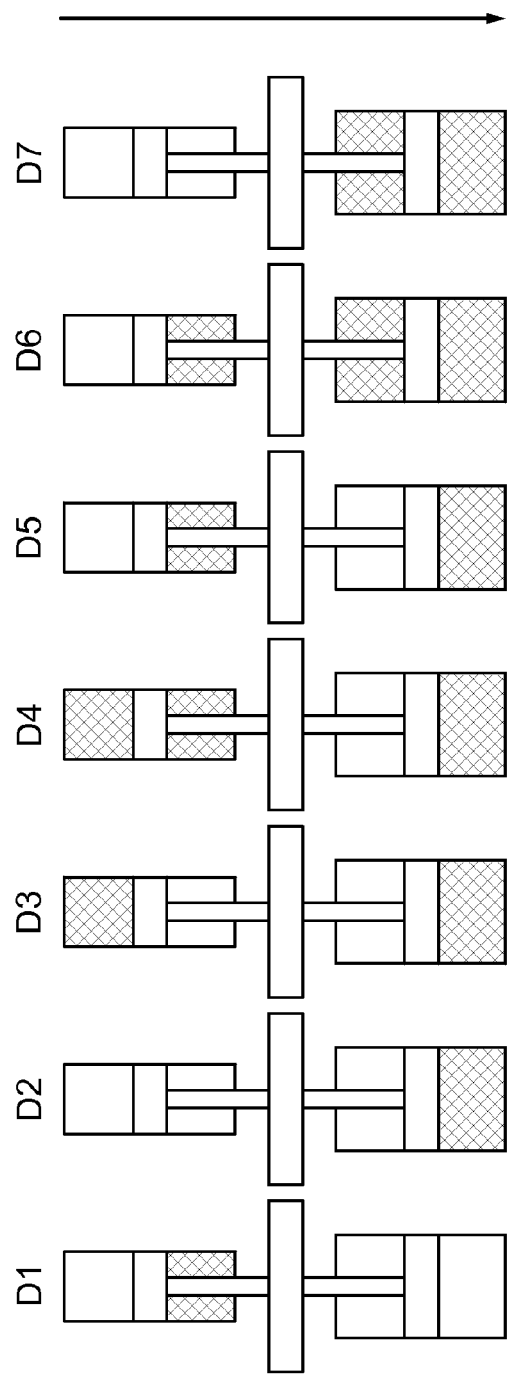

| Chamber | Hydraulic Piston Area | DIR | D1 | D2 | D3 | D4 | D5 | D6 | D7 | - | U1 | U2 | U3 | U4 | U5 | U6 | U7 | U8 |
|---|---|---|---|---|---|---|---|---|---|---|---|---|---|---|---|---|---|---|
| C1 | A1 | Down | P | P | N | N | P | P | P | N | N | N | N | N | P | N | N | P |
| C2 | A2 | Up | N | P | P | N | N | N | P | N | P | P | P | N | N | N | P | P |
| C3 | A3 | Down | P | P | P | P | P | N | N | N | P | N | N | N | N | P | N | P |
| C4 | A4 | Up | P | N | N | N | N | N | N | N | P | P | P | P | P | P | N | P |
| Net Surface Area | A1 < A3<br>A2 < A4<br>Rod 2 < Rod 3 | | A1+<br>A3−A4 | A1−A2<br>+A3 | A3−<br>A2 | A3 | A1+<br>A3 | A1 | A1−<br>A2 | 0 | −A2+A3<br>−A4 | −A2−<br>A4 | A1−<br>A2−<br>A4 | −A4 | A1−<br>A4 | A3−A4 | −A2 | A1−A2+<br>A3−A4 |
| | | | D1 | D2 | D3 | D4 | D5 | D6 | D7 | | U1 | U2 | U3 | U4 | U5 | U6 | U7 | U8 |
| Identical cylinders | A1 = A4<br>A2 = A3<br>Rod 2 = Rod 3 | | A3 | A1 | 0 | A3 | A1+<br>A3 | A1 | A1−<br>A2 | 0 | −A4 | −A2−<br>A4 | −A2 | −A4 | 0 | A3−A4 | −A2 | 0 |

FIG. 51D

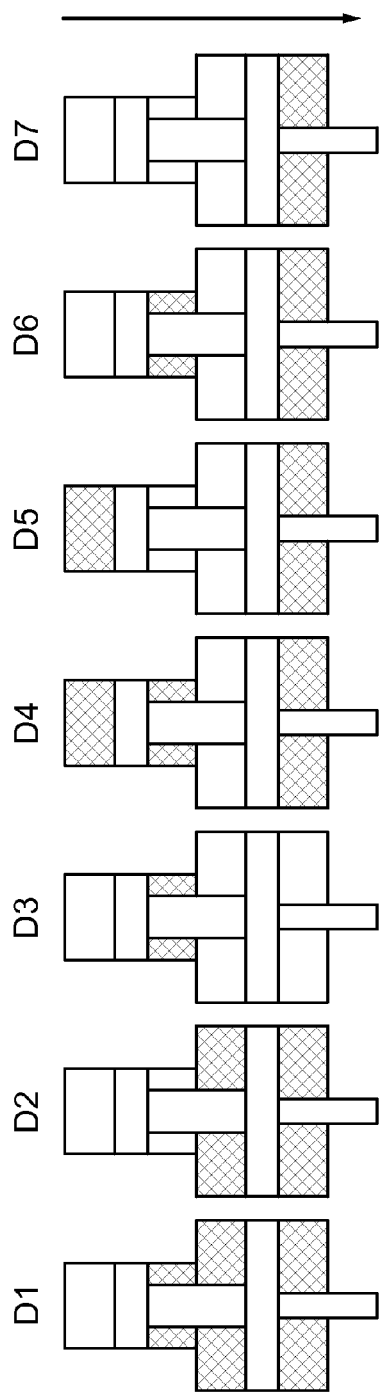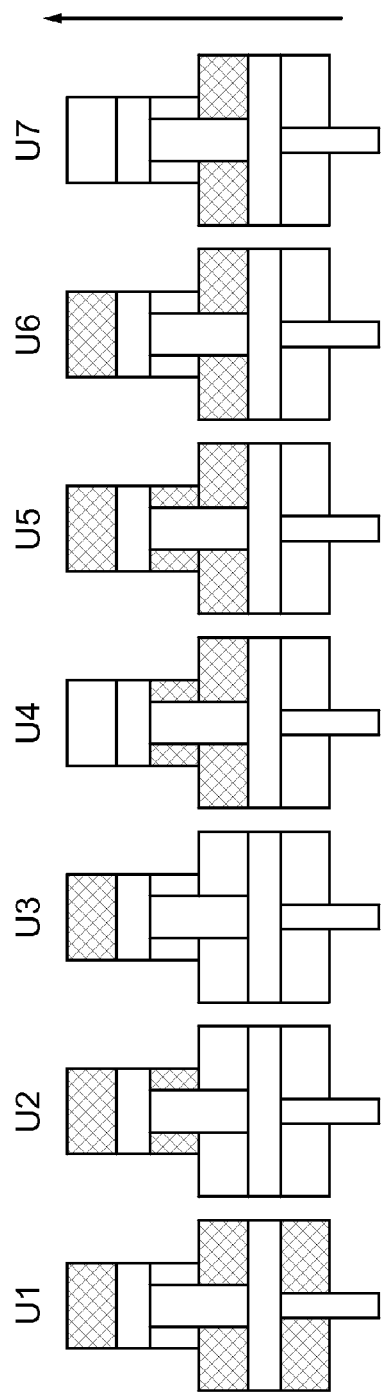

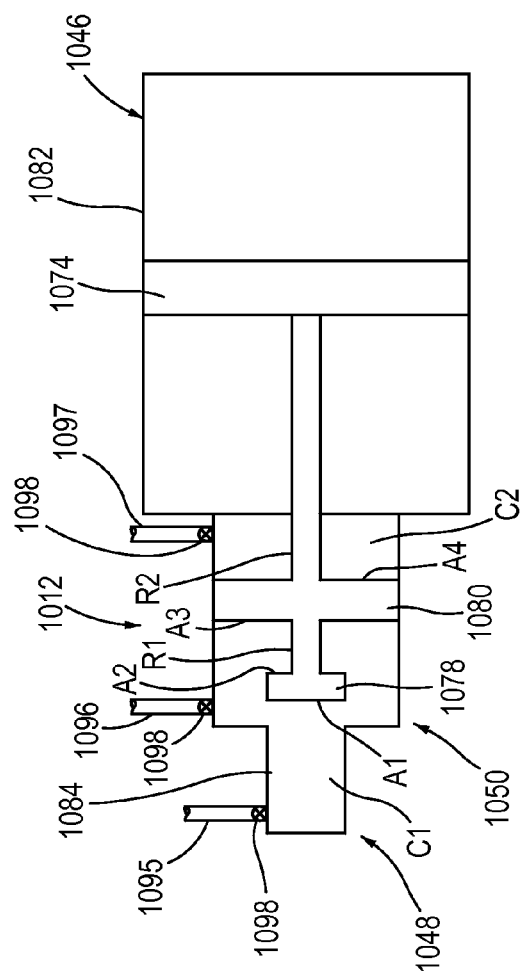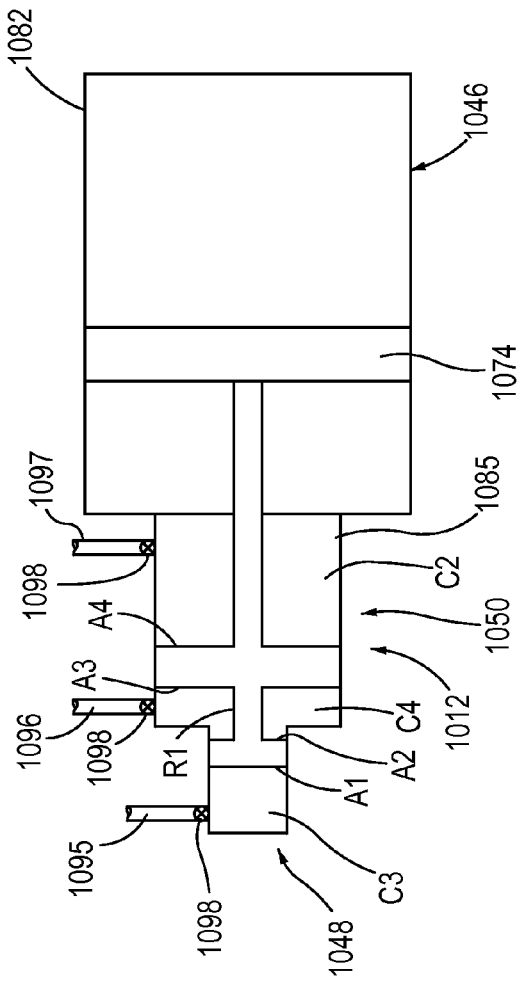

SYSTEM AND METHODS FOR OPTIMIZING EFFICIENCY OF A HYDRAULICALLY ACTUATED SYSTEM

CROSS REFERENCE TO RELATED APPLICATIONS

This application claims priority to and the benefit of U.S. Provisional Patent Application Ser. No. 61/290,107, filed Dec. 24, 2009, entitled "System and Methods for Optimizing Efficiency of a Hydraulically Actuated System," the disclosure of which is hereby incorporated by reference in its entirety.

BACKGROUND

The invention relates generally to systems and methods of optimizing the energy efficiency of hydraulic actuation systems, for use in, for example, storing energy using a system and methods for optimizing the efficiency of a compressed air energy storage system.

Traditionally, electric power plants have been sized to accommodate peak power demand. Moreover, electric power plant sizing must take into account their maximum power output, minimum power output, and a middle power output range within which they most efficiently convert fuel into electricity. Electric power plants are also constrained in terms of how quickly they can start-up and shut-down, and it is commonly infeasible to completely shut-down a power plant. The combination of power output constraints, and start-up and shut-down constraints, restricts a power plant's ability to optimally meet a fluctuating power demand. These restrictions may lead to increased green house gas emissions, increased overall fuel consumption, and/or to potentially higher operating costs, among other drawbacks. Augmenting a power plant with an energy storage system may create an ability to store power for later use, which may allow a power plant to fulfill fluctuating consumer demand in a fashion that minimizes these drawbacks.

An energy storage system may improve overall operating costs, reliability, and/or emissions profiles for electric power plants. Existing energy storage technologies, however, have drawbacks. By way of example, batteries, flywheels, capacitors and fuel cells may provide fast response times and may be helpful to compensate for temporary blackouts, but have limited energy storage capabilities and may be costly to implement. Installations of other larger capacity systems, such as pumped hydro systems, require particular geological formations that might not be available at all locations.

Intermittent electric power production sites, such as some wind farms, may have capacities that exceed transmission capabilities. Absent suitable energy storage systems, such intermittent power production sites may not be capable of operating at full capacity. The applicants have appreciated that intermittent production sites may benefit from a storage system that may be sized to store energy, when the production site is capable of producing energy at rates higher than may be transmitted. The energy that is stored may be released through the transmission lines when power produced by the intermittent site is lower than transmission line capacity.

Electric power consumption sites, such as buildings, towns, cities, commercial facilities, military facilities, may have consumption that periodically exceeds electricity transmission capabilities. Absent suitable energy storage systems, such power consumers may not be capable of operating at preferred levels. The applicants have appreciated that transmission constrained consumption sites may benefit from a storage system that may be sized to store energy, when the consumption site is consuming energy at rates lower than may be transmitted, and that the transmitted energy that is not immediately consumed may be stored. The energy that is stored may be released to the consumers when power consumption of the consumers is higher than the transmission line capacity.

Compressed air energy storage systems (CAES) are another known type of system in limited use for storing energy in the form of compressed air. CAES systems may be used to store energy, in the form of compressed air, when electricity demand is low, typically during the night, and then to release the energy when demand is high, typically during the day. Such systems include a compressor that operates, often at a constant speed, to compress air for storage. Turbines, separate from the compressor, are typically used to expand compressed air to produce electricity. Turbines, however, often require the compressed air to be provided at a relatively constant pressure, such as around 35 atmospheres. Additionally or alternatively, air at pressures higher than 35 atmospheres may need to be throttled prior to expansion in the turbine, causing losses that reduce the efficiency of the system, and/or reduce the energy density that a storage structure may accommodate. Additionally, to increase electrical energy produced per unit of air expanded through the turbine, compressed air in such systems is often pre-heated to elevated temperatures (e.g., 1000 C) prior to expansion by burning fossil fuels that both increases the cost of energy from the system and produces emissions associated with the storage of energy.

Known CAES-type systems for storing energy as compressed air have a multi-stage compressor that may include intercoolers that cool air between stages of compression and/or after-coolers that cool air after compression. In such a system, however, the air may still achieve substantial temperatures during each stage of compression, prior to being cooled, which will introduce inefficiencies in the system. Thus, there is a need to provide for CAES type systems that have improved efficiencies.

A CAES system may be implemented using a hydraulic drive system comprised of hydraulic components including components such as hydraulic pumps. Therefore, there is also a need for a system and methods to obtain a high efficiency output of a compressed air energy storage system, or other systems used to compress and/or expand gas, including controls and operating modes that allow for adjusting or varying the pressures and/or flow rates of hydraulic fluid within hydraulic pumps used in operation of such a system.

SUMMARY OF THE INVENTION

Systems and methods for efficiently operating a hydraulically actuated device/system are described herein. For example, systems and methods for efficiently operating a gas compression and expansion energy storage system are disclosed herein. Systems and methods are provided for controlling and operating the hydraulic pumps/motors used within a hydraulically actuated device/system, such as, for example, a gas compression and/or expansion energy system, within a maximum efficiency range of the pumps throughout an entire cycle of the system. In such a system, a variety of different operating regimes can be used depending on the desired output gas pressure and the desired stored pressure of the compressed gas. Hydraulic cylinders used to drive working pistons within the system can be selectively actuated and/or can be actuated to achieve varying force outputs to incrementally increase the gas pressure, within the system for a given cycle.

BRIEF DESCRIPTION OF THE DRAWINGS

FIGS. 6A and 6B are each a schematic illustration of a portion of an actuator of the air compression and expansion system of FIG. 5.

FIG. 6C is a side view of a portion of an actuator of the system of FIG. 5.

FIG. 6D is a cross sectional view taken along line 6D-6D in FIG. 6C.

FIG. 6E is an end view taken along line 6E-6E in FIG. 6C.

FIG. 6F is a cross sectional view taken along line 6F-6F in FIG. 6C.

FIG. 51B and FIG. 51C each include multiple schematic illustrations of the actuator of FIG. 51A showing different gears of the actuator.

FIG. 51D is a table illustrating various parameters related to implementing multiple different gears shown in FIG. 51B and FIG. 51C.

FIG. 52B and FIG. 52C each include multiple schematic illustrations of the actuator of FIG. 52A showing different gears of the actuator.

FIG. 54A is a schematic illustration of an actuator according to another embodiment, shown in a first configuration.

FIG. 54B is a schematic illustration of the actuator of FIG. 54A, shown in a second configuration.

DETAILED DESCRIPTION

Figure 1:
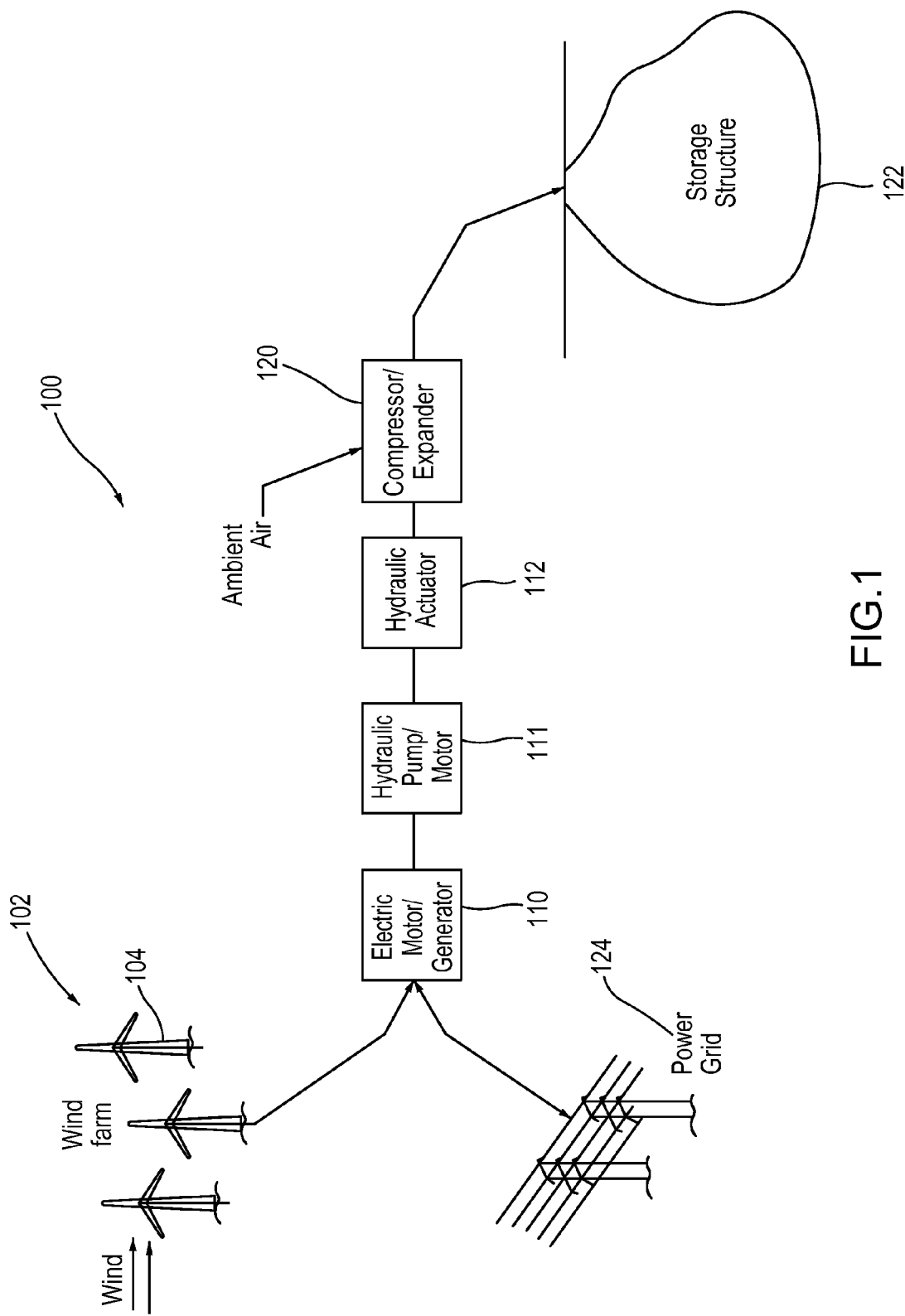
FIG. 1 is a schematic illustration of an air compression and expansion energy system according to an embodiment.

Systems and methods for efficiently operating a gas compression and/or expansion system are disclosed herein. The gas compression and/or expansion systems can use one or more hydraulic pumps/motors to move (or be moved by) gas and liquid within the system, and systems and methods are described herein to operate the hydraulic pump/motor in its most efficient regime, continuously or substantially continuously, during an operating cycle or stroke of the system. Hydraulic pumps can have efficient operating ranges that can vary as a function of, for example, flow rate and pressure, among other parameters. Systems and methods of operating the hydraulic pumps/motors are provided to allow them to function at an optimal efficiency throughout the stroke or cycle of the gas compression and/or expansion system.

As described herein, in some embodiments, hydraulic pumps/motors can be used to drive (or be driven by) a working piston within a gas compression and/or expansion system, in which a working piston can act on (or be acted on) gas contained in a working chamber to compress or expand the gas, directly, or indirectly through a liquid disposed between the working piston and the gas in the working chamber. The hydraulic loads applied to the working piston(s) can be varied during a given cycle of the system. For example, by applying hydraulic fluid pressure to different hydraulic pistons, and/or different surfaces of the piston(s) within the hydraulic pump(s)/motor(s), the ratio of the net working surface area of the hydraulic actuator to the working surface area of the working piston acting on the gas in the working chamber can be varied, and therefore the ratio of the hydraulic fluid pressure to the gas pressure in the working chamber can be varied during a given cycle or stroke of the system. In addition, the number of working pistons/working chambers and hydraulic cylinders can be varied as well as the number of piston area ratio changes within a given cycle. As used herein the term "piston" is not limited to pistons of circular cross-section, but can include pistons with a cross-section of a triangular, rectangular, or other multi-sided shape.

A gas compression and/or expansion system as described herein can include one or multiple stages of compression and/or expansion. For example, a system can include a single stage compression/expansion device, two stages, three stages, etc. As described herein, a system can also include "gear shifts" or "gear changes" within a given stage as will be described in detail below with reference to specific embodiments. As used herein, the terms "gear change" or "gear shift" are used to described a change in the ratio of the pressure of the hydraulic fluid in the active hydraulic actuator chambers to the pressure of the gas in the working chamber actuated by (or actuating) the hydraulic actuator, which is essentially the ratio of the pressurized surface area of the working piston(s) to the net area of the pressurized surface area(s) of the hydraulic piston(s) actuating the working piston(s). As used herein the term "gear" can refer to a state in which a hydraulic actuator has a particular piston area ratio (e.g., the ratio of the net working surface area of the hydraulic actuator to the working surface area of the working piston acting on, or being acted on by, the gas in a working chamber) at a given time period.

In some embodiments, a hydraulic actuator as described herein can be used to drive, or be driven by, a working piston within, for example, a water pump/motor, to move water (or other liquid) in and out of the working chamber of a pressure vessel used to compress and/or expand a gas, such as air, contained in the working chamber. As described herein, an actuator can also include "gear shifts" or "gear changes" (described above) during a cycle or stroke of the actuator. In some embodiments, an actuator as described herein can be used to drive, or be driven by, a working piston disposed within a compression and/or expansion device. For example, in some such embodiments, the working piston can be driven to compress one or more fluids within a working chamber. As used herein, "fluid" can mean a liquid, gas, vapor, suspension, aerosol, or any combination thereof. Although particular embodiments of an actuator are described herein to drive, or be driven by, a water pump/motor and/or a compression and/or expansion device, it should be understood that the various embodiments and configurations of an actuator can be used to drive, or be driven by, a working piston within a water pump, a compression and expansion device, a compression device, an expansion device, any other device in which a working piston is used to move a fluid, and/or any device to which motive force can be applied or from which motive force can be received.

In some embodiments, the devices and systems described herein can be configured for use only as a compressor. For example, in some embodiments, a compressor device described herein can be used as a compressor in a natural gas pipeline, a natural gas storage compressor, or any other industrial application that requires compression of a gas. In another example, a compressor device described herein can be used for compressing carbon dioxide. For example, carbon dioxide can be compressed in a process for use in enhanced oil recovery. In another example, a compressor device described herein can be used for compressing air. For example, compressed air can be used in numerous applications which may include cleaning applications, motive applications, ventilation applications, air separation applications, cooling applications, amongst others.

In some embodiments, the devices and systems described herein can be configured for use only as an expansion device. For example, an expansion device as described herein can be used to generate electricity. In some embodiments, an expansion device as described herein can be used in a natural gas transmission and distribution system. For example, at the intersection of a high pressure (e.g., 500 psi) transmission system and a low pressure (e.g., 50 psi) distribution system, energy can be released where the pressure is stepped down from the high pressure to a low pressure. An expansion device as described herein can use the pressure drop to generate electricity.

In some embodiments, a compression and/or expansion device as described herein can be used in an air separation unit. In one example application, in an air separator, a compression and/or expansion device can be used in a process to liquefy a gas. For example, air can be compressed until it liquefies and the various constituents of the air can be separated based on their differing boiling points. In another example application, a compression and/or expansion device can be used in an air separator co-located with in a steel mill where oxygen separated from the other components of air is added to a blast furnace to increase the burn temperature.

A compression and/or expansion system can have a variety of different configurations and can include one or more actuators that are use to compress/expand air within a compression/expansion device. In sonic embodiments, an actuator can include one or more pump/motor systems, such as for example, one or more hydraulic pumps/motors that can be use to move, or be moved by, one or more fluids within the system between various water pumps/motors and pressure vessels. U.S. provisional patent application No. 61/216,942, filed May 22, 2009, and U.S. patent publication nos. 2011/0061741, 2011/0061836 and 2011/0062166, each filed May 21, 2010 and entitled "Compressor and/or Expander Device (collectively referred to herein as the "the Compressor and/or Expander Device applications"), the disclosures of which are hereby incorporated herein by reference, in their entireties, describe various energy compression and/or expansion systems in which the systems and methods described herein can be employed.

As background, FIG. 1 is a schematic illustration of an embodiment of an energy system 100 in which a compressor/expander device may be used to both store energy and release energy that has previously been stored. As shown in FIG. 1, a wind farm 102 including a plurality of wind turbines 104 may be used to harvest and convert wind energy to electric energy for delivery to a motor/generator 110. It is to be appreciated that the system 100 may be used with electric sources other than wind farms, such as, for example, with the electric power grid, or solar power sources. The motor/generator 110 converts the input electrical power from the wind turbines or other sources into mechanical power. That mechanical power can then be used to drive a hydraulic pump/motor 111. In turn, the hydraulic pump/motor converts the input mechanical power into hydraulic power, which can be used to drive a hydraulic actuator 112 connected to a compressor/expander device 120.

Energy can be stored within the system 100 in the form of compressed gas, which can be expanded at a later time period to access the energy previously stored. To store energy generated by the wind farm 102, the hydraulic actuator 112 can change the volume of a working chamber (e.g. by moving a piston in a cylinder) and/or to cause liquid to be introduced into the working chamber to reduce the volume available within the working chamber for gas. The reduction in volume compresses the gas. During this process, heat can be removed from the gas. During compression, the gas is delivered to a downstream stage of the compressor/expander device 120 and eventually, at an elevated pressure, to a compressed gas storage structure 122 (also referred to herein as a "cavern"). At a subsequent time, for example, when there is a relatively high demand for power on the power grid, or when energy prices are high, compressed gas may be communicated from the storage structure 122 and expanded through the compressor/expander device 120. Expansion of the compressed gas drives the hydraulic actuator 112 that, in turn, drives, by hydraulic power, the hydraulic pump/motor 111 to produce mechanical power, which in turn drives motor/generator 110 to produce electric power for delivery to the power grid 124. Heat at a relatively low temperature (e.g., between for example, about 10° C. and about 90° C.) may be added to the gas during expansion to increase the energy generated per unit mass of air during the expansion process. Heat at relatively high temperatures (e.g. greater than about 90° C.) may be added during expansion to increase the energy generated per unit mass of air during the expansion process.

Figure 2A:
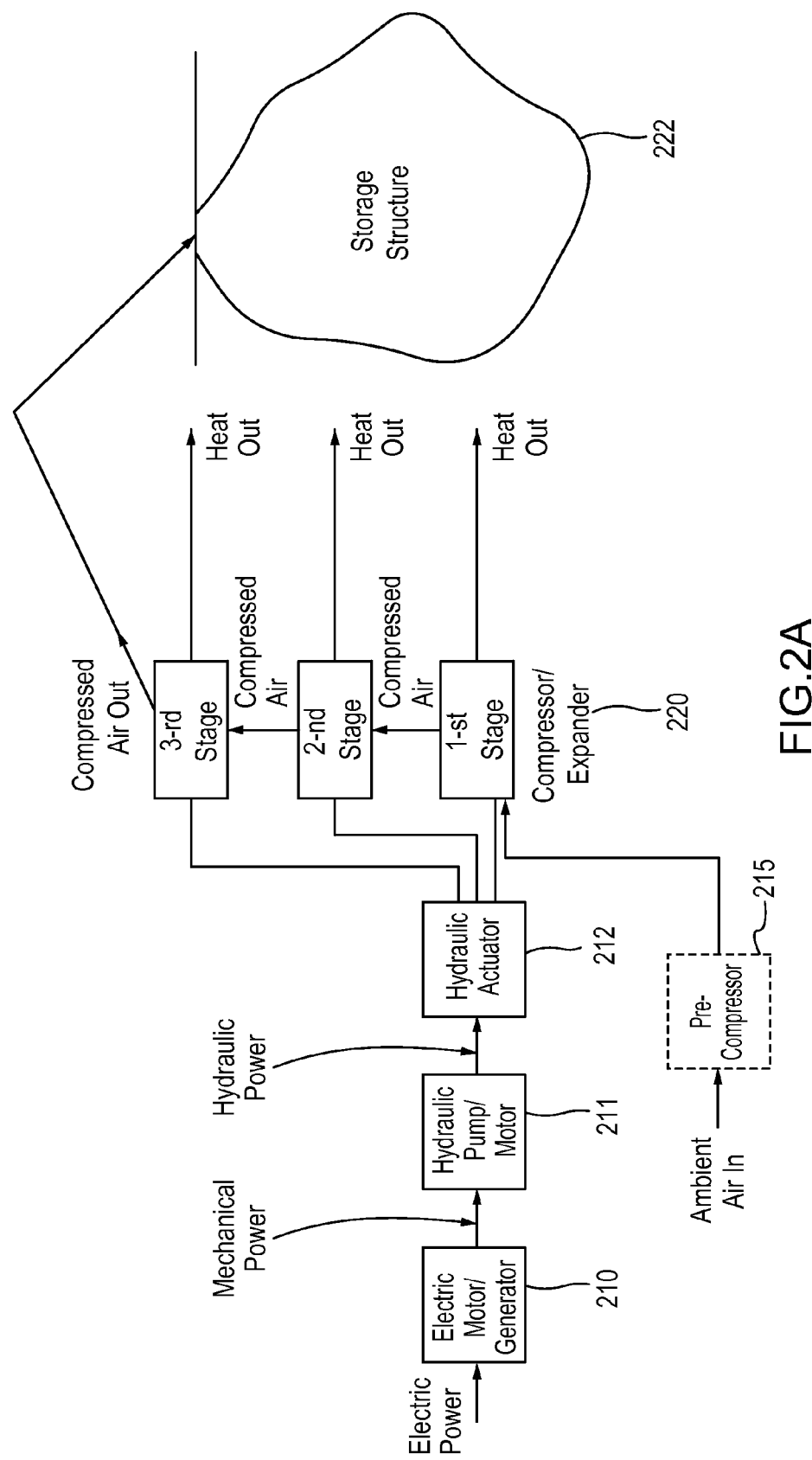
FIG. 2A is a schematic illustration of an air compression and expansion energy system showing the flow of energy during a compression cycle, according to one embodiment

FIG. 2A is a schematic illustration of energy flow through a multi-stage system 200 similar to the system 100 of FIG. 1, at one example operating condition. A gas, in this example air, is being compressed for storage. As described above, electric power from, for example, a wind farm, is used to drive a motor/generator 210 to produce mechanical power, which in turn drives hydraulic pump/motor 211 to produce hydraulic power, which in turn drives an actuator 212. Actuator 212 can reduce the volume of a working chamber available to contain air to be reduced, which compresses the air.

As shown in FIG. 2A, a multi-stage compressor/expander device 220 can receive ambient air at a first stage of the compressor/expander device 220. In some embodiments, ambient air can optionally be processed in a pre-compressor 215 prior to being provided to the first stage of the compressor/expander device 220. Heat energy can be removed during compression via a liquid that is present in the working chamber(s) of a multi-stage compressor/expander device 220 to maintain the air that is being compressed at a relatively constant temperature. The heat energy can be transferred from the liquid and the compressor/expander device 220 to, for example, a heat sink via, for example a heat exchanger. The air may achieve pressures of about, for example, 150 psi, 1,000 psi, and 3,000 psi at each of first, second, and third stages, respectively, before being delivered to a storage structure 222 at a pressure of about 3,000 psi, according to one embodiment. The temperature of the air, after being provided to the compressor/expander device 220, and initially compressed and cooled, remains relatively constant, such as, for example, at about 5° C., 10° C., 20° C., 30° C. or other temperatures that may be desirable, until discharged to the storage structure 222. Air stored in the storage structure 220 may be heated (or cooled) naturally through conductive and convective heat transfer if the storage structure 222 is naturally at a higher (or lower) temperature. For example, in some cases, the storage structure may be an underground structure, such as a salt cavern constructed in a salt dome. It is to be appreciated that FIG. 2A illustrates one operating condition for one embodiment of a system, and that other operating conditions exist and other system embodiments are also contemplated.

Figure 2B:
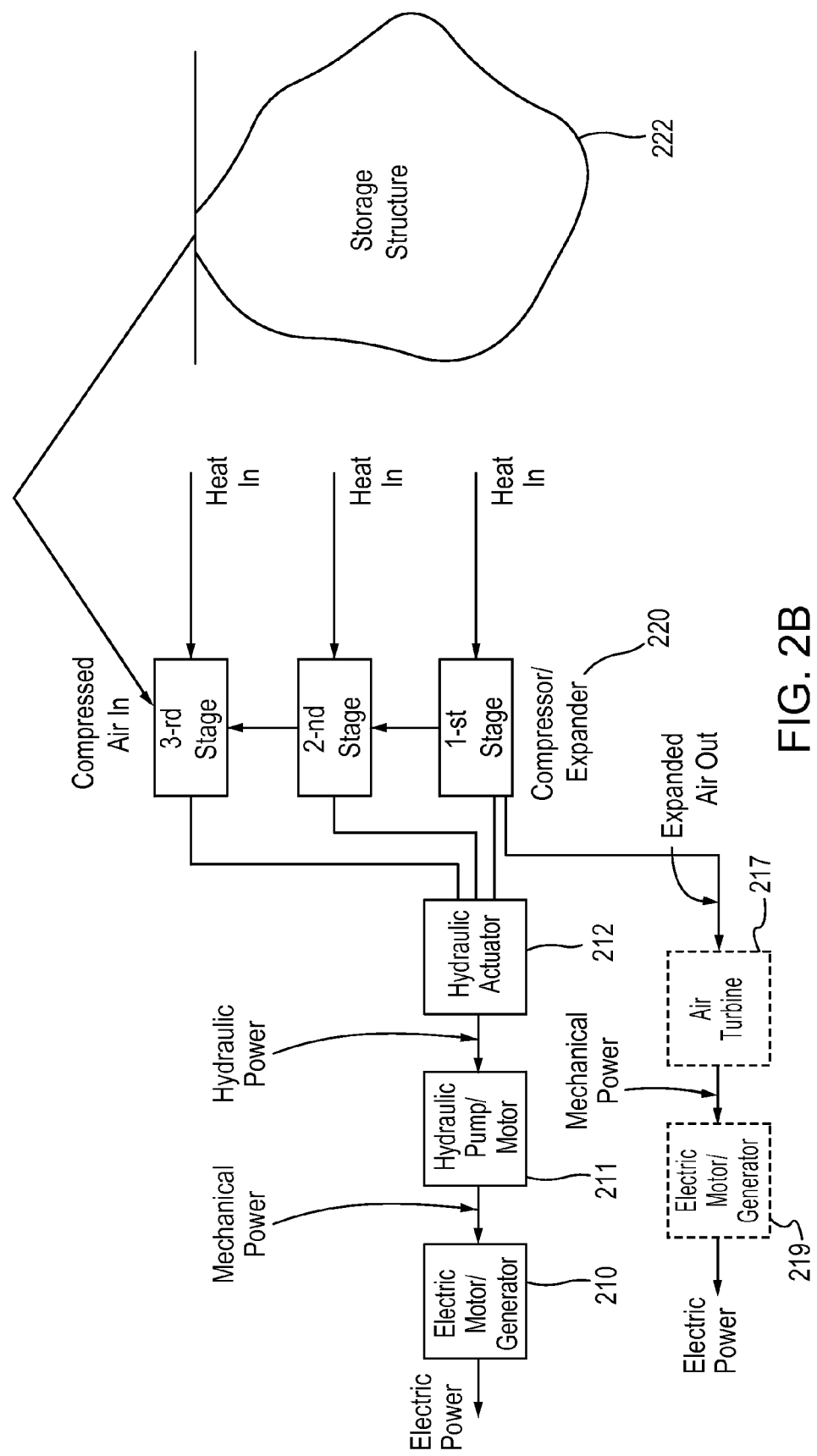
FIG. 2B is a schematic illustration of an air compression and expansion energy system showing the flow of energy during an expansion cycle, according to one embodiment

FIG. 2B is a schematic representation of energy flow through the system 200 of FIG. 2A at one operating condition, as air is communicated from storage for the production of energy. In one example operating condition, air in the storage structure 222 can be at about 3000 psi, and can be expanded through the third, second, and first stages of the compressor/expander device to pressures of, for example, about 1000 psi, 150 psi, and 0 psi, respectively. Heat may be added to the air before and/or during expansion at each of the third, second, and first stages, respectively, to hold air temperatures at a substantially constant temperature, such as at about 35° C. or other temperatures, during the entire expansion process. It is to be appreciated, that the overall temperature change of air during expansion may be limited by a relatively large amount of air that expands in a relatively small volume of a pressure vessel and that is in contact with substantial heat transfer surfaces. It is to be appreciated, that it may be desirable to add heat to the air such that air temperature increases substantially, such as temperatures higher than 35° C. The compressor/expander device 220 produces mechanical power that is converted by hydraulic actuator 212 into hydraulic power, which is applied to hydraulic pump/motor 211, which in turn converts the hydraulic power to mechanical power. The mechanical power is applied to motor/generator 210, which converts the mechanical power to electric power. It is to be understood that actuators other than hydraulic actuators can alternatively be used. As another source of producing electric power, as the expanded air exits the first stage of the compressor/expander device 220, the air can optionally be provided to an air turbine 217, which can convert the air to mechanical power. The mechanical power can be applied to a motor/generator 219, which converts the mechanical power to electric power.

Figure 3:
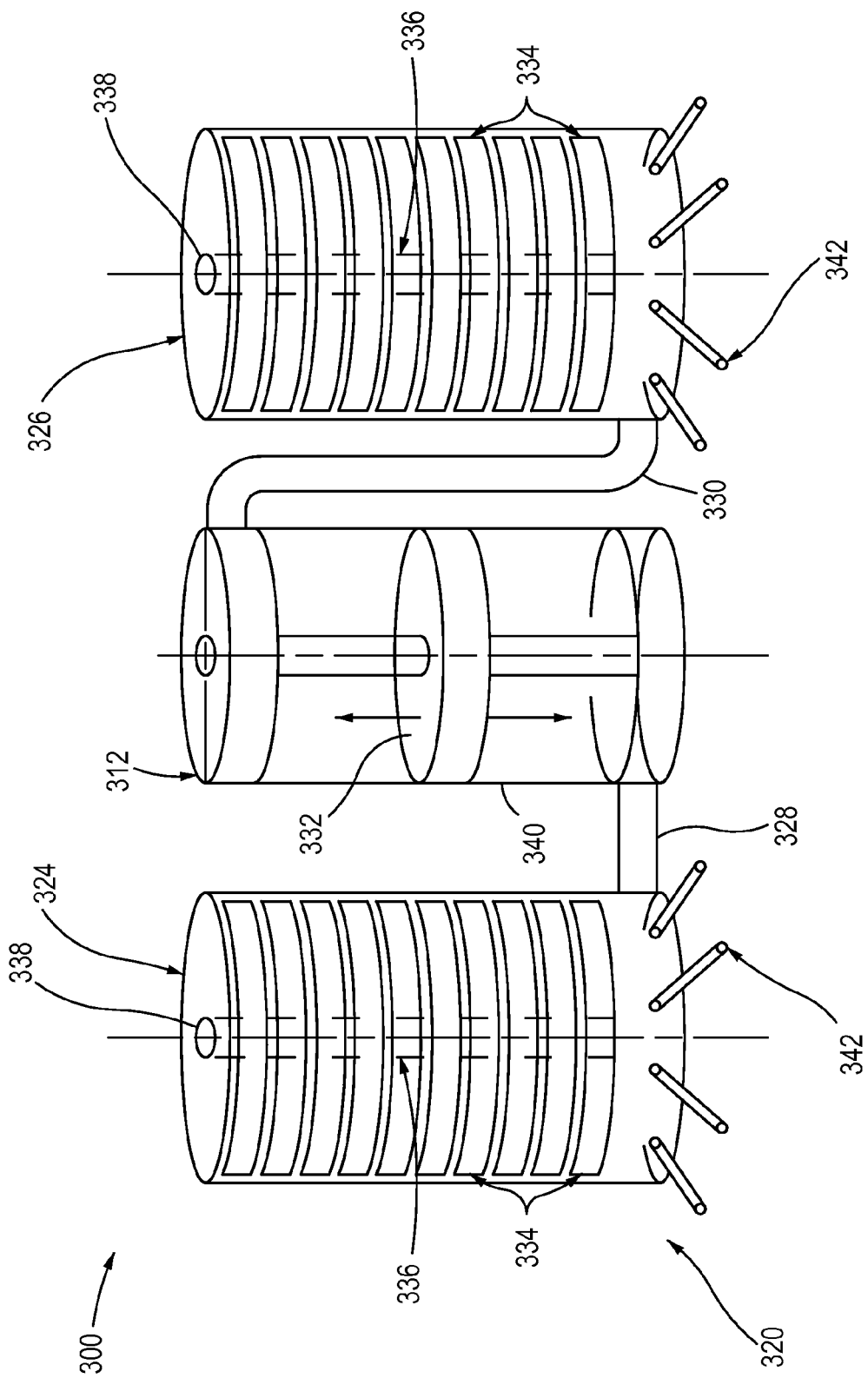
FIG. 3 shows a single stage of one embodiment of an air compression and expansion system.

FIG. 3 illustrates a portion of a compressed air storage system 300 that includes a compressor/expander device 320 and an actuator 312. The compressor/expander device 320 illustrates a single stage of a compressed air storage system. The compressor/expander device 320 includes a first pressure vessel 324 and a second pressure vessel 326. The first and second pressure vessels 324, 326 are each coupled fluidly to the actuator 312 by a conduit or housing 328 and 330, respectively. The actuator 312 can include a water pump that includes a hydraulically driven piston 332. The piston 332 is disposed within a housing or reservoir 340 and can be driven with one or more hydraulic pumps (not shown in FIG. 3) to move toward and away from the conduit 328 of first pressure vessel 324 to alternately reduce and then increase the internal air volume of the first pressure vessel 324 (with an equivalent, but opposite increase and reduction of air volume in the second pressure vessel 326). Each of the first and second pressure vessels 324, 326 are at least partially filled with a liquid, such as water, that is moved by the actuator 312 to alternately compress and drive air from the volume of each of the first and second pressure vessels 324, 326, when operated in a compression mode, or to be moved by compressed air received in either of the first and second pressure vessels 324, 326 when operated in an expansion mode.

Each pressure vessel 324, 326 can be considered to define a working chamber for compressing and/or expanding a gas. The working chamber has a volume that is defined by the volume of the pressure vessel. The working chamber has a portion of this volume that can contain gas and a portion that contains liquid—the portion of the volume that contains gas is equal to the total volume of the working chamber less the volume of the portion containing liquid. Operation of the water pump to urge liquid from the pump cylinder into the pressure vessel reduces the volume of the portion of the working chamber that can contain gas, thus compressing the gas contained in that portion (e.g. during a compression cycle). Similarly, operation of the water pump to allow liquid to be transferred from the pressure vessel to the water pump increases the volume of the portion of the working chamber that can contain gas, allowing the gas to expand. Alternatively, a working chamber can be considered to be defined by the pressure vessel and the portion of the water pump in fluidic communication with the pressure vessel (i.e. on one side of the working piston), and any conduit or other volume connecting the pressure vessel and the water pump. So defined, the working chamber has a variable volume, which volume can be changed by movement of the working piston. A portion of the variable volume can be occupied by liquid (e.g. water), while the remaining portion can be occupied by gas (e.g. air). The pressure of the gas contained in the working chamber is essentially equal to the pressure of any liquid contained in the working chamber, and to the pressure acting on the corresponding side or face of the working piston.

The compressor/expander device 320 may also include fins, dividers and/or trays 334 that can be positioned within the interior of the first and second pressure vessels 324, 326. The dividers 334 can increase the overall area within a pressure vessel that is in direct or indirect contact with air, which can improve heat transfer. The dividers 334 can provide for an increased heat transfer area with both air that is being compressed and air that is being expanded (either through an air/liquid interface area or air/divider interface), while allowing the exterior structure and overall shape and size of a pressure vessel to be optimized for other considerations, such as pressure limits and/or shipping size limitations.

Figure 4:
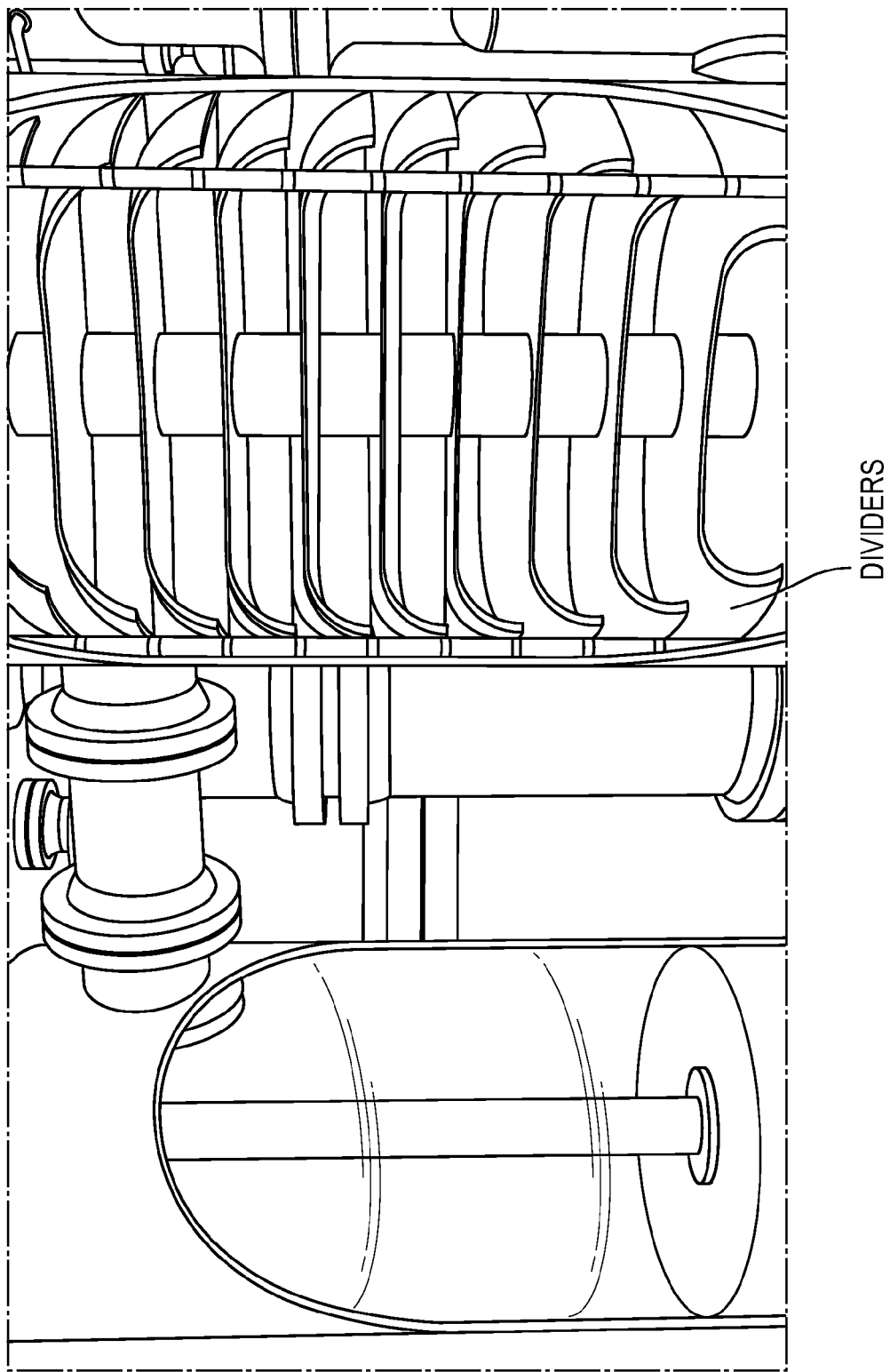
FIG. 4 illustrates an embodiment of a divider that can be used in a pressure vessel.

In this embodiment, the dividers 334 are arranged in a stack configuration within the first and second pressure vessels 324 and 326. Each divider 334 can be configured to retain a pocket of air. In one illustrative embodiment, each of the dividers 334 can include an upper wall, a downwardly extending side wall that may conform in shape and substantially in size to the inner wall of the pressure vessel, and an open bottom. The open bottom of each of the dividers 334 face in a common, substantially downward direction when the pressure vessel is oriented for operation. It is to be appreciated that although the figures show dividers that conform in size and shape to the interior of the pressure vessels 324, 326, and are generally shaped similarly to one another, other configurations are also possible and contemplated, including embodiments that include dividers that are substantially smaller in width than the interior of a pressure vessel and/or that are shaped and sized differently than one another, among other configurations. Various other shapes and configurations of dividers can be used, such as, for example, the dividers that are shown and described in U.S. Provisional App. No. 61/216,942 and the Compressor and/or Expander Device applications incorporated by reference above. FIG. 4 illustrates another alternative embodiment of a divider that can be used. It is also to be appreciated that dividers may include fin structures (arrays of pins or rods, and other porous structures) that increase the area available for heat exchange as well as maximize the proximity of air to the dividers, and that dividers that do not retain a pocket of air are contemplated. In some embodiments, dividers can be structures that support a film of water. In some embodiments, rather than the dividers having an empty space between them, they can have intermediate structures between them, such as arrays of pins or rods, amorphous structures, porous structures, etc.

As shown in FIG. 3, a manifold 336 can extend centrally through the stack of dividers 334 and fluidly couple each of the dividers 334 to an inlet/outlet port 338 of the pressure vessels 324, 326. In other embodiments, the manifold may include multiple tubes and/or may be located peripherally about the stack of dividers or in other positions. Air may enter and/or exit the pressure vessels 324, 326 through the ports 338, and can provide a conduit for fluid communication between pockets of air associated with each divider 334. In other embodiments, such as those in which dividers do not retain a pocket of air, the manifold may not be included.

As discussed above, heat can be transferred from and/or to air that is compressed and/or expanded by liquid (e.g., water) within a pressure vessel. An air/liquid or air/divider interface (e.g., provided in part by dividers discussed above) may move and/or change shape during a compression and/or expansion process in a pressure vessel. This movement and/or shape change may provide a compressor/expander device with a heat transfer surface that can accommodate the changing shape of the internal areas of a pressure vessel through which heat is transferred during compression and/or expansion. In some embodiments, the liquid may allow the volume of air remaining in a pressure vessel after compression to be nearly eliminated or completely eliminated (i.e., zero clearance volume).

A liquid (such as water) can have a relatively high thermal capacity as compared to a gas (such as air) such that a transfer of heat energy from the gas to the liquid significantly decreases the temperature rise of the gas but incurs only a modest increase in the temperature of the liquid. This allows buffering of the system from substantial temperature changes. Heat that is transferred between the gas and liquid or components of the vessel itself may be moved from or to the pressure vessel through one or more heat exchangers that are in contact with the liquid or components of the vessel. One type of heat exchanger that can be used to accomplish this is a heat pipe, as discussed in greater detail below.

Thus, the liquid within a pressure vessel can be used to transfer heat from air that is compressed (or to air that is expanded) and can also act in combination with a heat exchanger to transfer heat to an external environment (or from an external environment). By way of example, as shown in FIG. 3, a heat exchanger that includes a circular array of heat pipes 342 that extend through a wall of the pressure vessels 324 and 326 and can contact both the liquid within the vessels and the external environment. The heat pipes 342 are just one example embodiment of a type of heat exchanger that can be used to transfer heat to or from liquid of a pressure vessel. It should be understood that other types of heat exchangers and other heat pipe configurations can alternatively be used. For example, other heat management devices can be used (alternatively or in addition to) such as, for example, fins, pins, convection-inducing shapes, and/or swirl-inducing shapes, etc.

The embodiment of FIG. 3 is one example of an arrangement of pressure vessels and an actuator that can be used within an air compression and storage system. It should be understood, that other arrangements are also possible and contemplated. By way of example, although the actuator is shown as including a single, double acting piston that is oriented vertically, other embodiments may include housings with actuators that include horizontally oriented pistons and/or multiple hydraulic pistons that operate in parallel to move fluid within pressure vessels. According to some embodiments, actuators may lack pistons altogether and instead comprise pumps that move fluid into and out of the pressure vessels. Multiple pumps and/or pistons can additionally, or alternatively, be used in parallel to move fluid into and out of the pressure vessels, according to some embodiments. Still, according to other embodiments, an actuator, such as a hydraulic piston, may have a direct mechanical connection to the motor/generator of the system, as embodiments of the system are not limited to that shown in the figures.

Figure 5A:
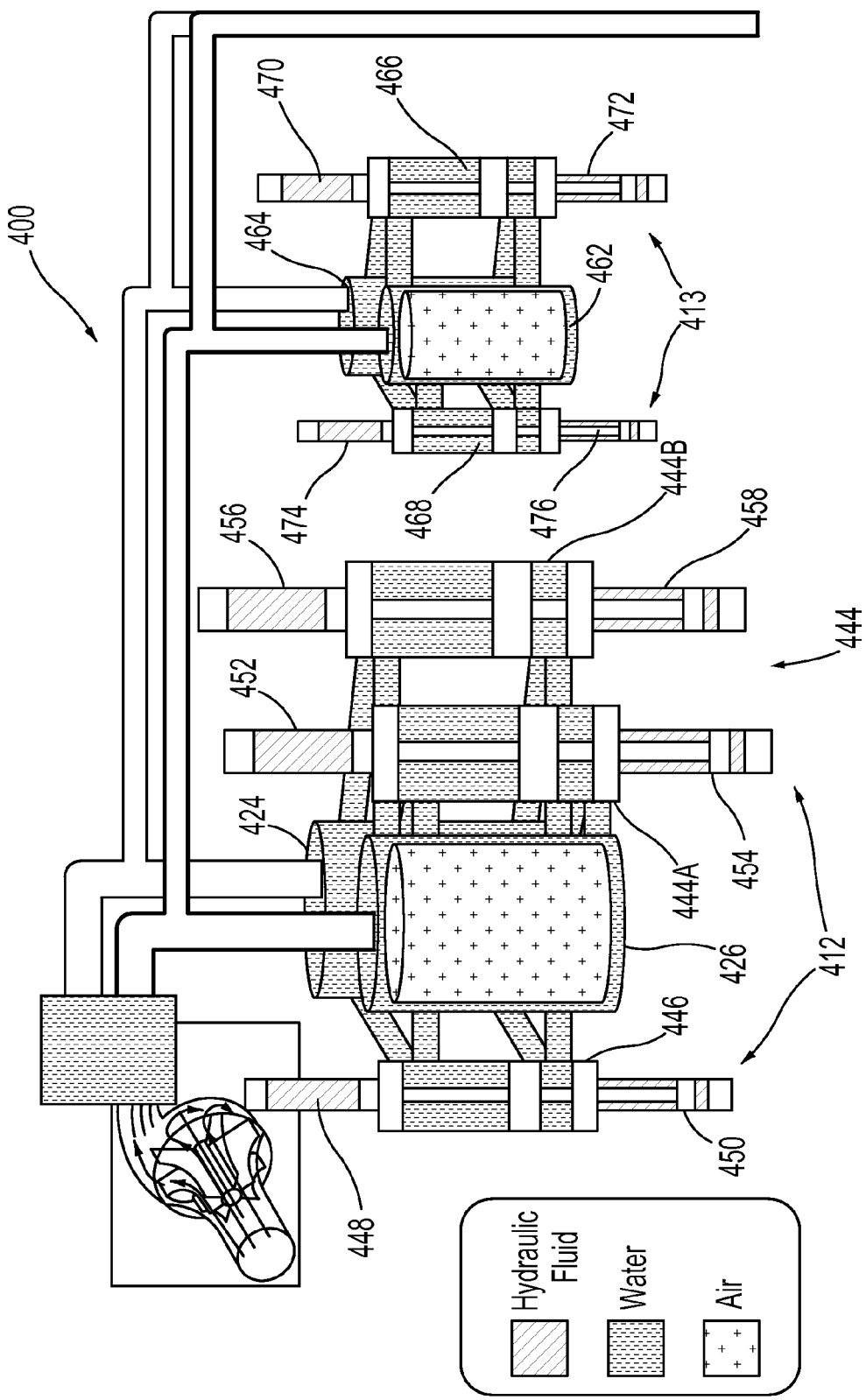
FIG. 5A is a schematic illustration of a portion of another embodiment of an air compression and expansion system.
Figure 5B:
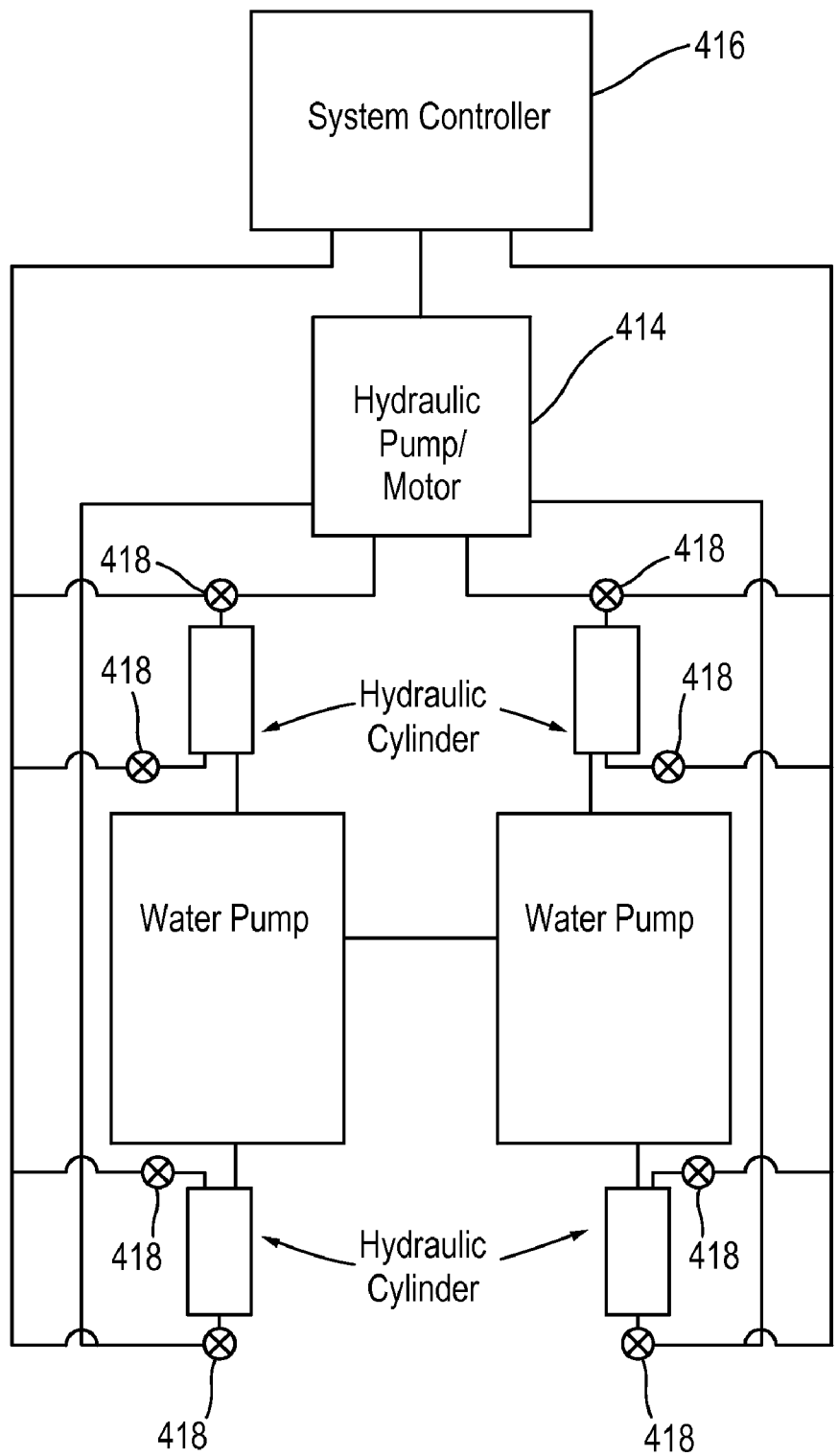
FIG. 5B is a schematic illustration of a portion of the air compression and expansion system of FIG. 5A illustrating a system controller and hydraulic pump.

FIGS. 5A-18 illustrate an example of a two-stage energy compression and expansion system 400. FIG. 5A is a schematic illustration of a portion of the system 400. Stage one includes a pair of pressure vessels 424, 426 connected in fluid communication to an actuator 412. For example, various types of conduit or housing (as shown in FIG. 5A) can be used to fluidically couple various components of the actuator 412 to the pressure vessels. The pressure vessels 424, 426 can each include dividers or tray (not shown in FIG. 5A) as described above for previous embodiments. The actuator 412 includes water pumps driven by hydraulic actuators or cylinders as described below. As shown in FIG. 5A, the actuator 412 includes water pumps 444A, 444B and 446. In this embodiment, water pumps 444A and 444B are constructed in two portions to reduce the height of the pumping equipment, and in this embodiment water pumps 444A and 444B act in concert as a single pump. Each of the water pumps 444A, 444B and 446 include a water piston, or working piston, that is hydraulically driven with a pair of hydraulic cylinders. Water pump 444A is coupled to and driven by hydraulic cylinders 452 and 454; water pump 444B is coupled to and driven by hydraulic cylinders 456 and 458; and water pump 446 is coupled to and driven by hydraulic cylinders 448 and 450. A common drive rod couples the water pistons to their respective hydraulic cylinders. The hydraulic cylinders for stage one can all be controlled by a first high efficiency hydraulic pump 414 as shown in FIG. 5B. A hydraulic pump/motor, such as, for example, an Artemis Digital Displacement hydraulic pump manufactured by Artemis Intelligent Power Ltd. can be used. Other examples of hydraulic pumps that can be used are described in U.S. Pat. No. 7,001,158, entitled "Digital Fluid Pump," and in U.S. Pat. No. 5,259,738, entitled "Fluid-Working Machine," the entire disclosures of which are hereby incorporated by reference.

As shown in FIG. 5B, a system controller or hydraulic controller 416 can be used to operate and control the hydraulic pump/motor 414. The hydraulic pump/motor 414 can be connected to each end of the hydraulic cylinders associated with the various water pumps (or working actuators) of the system. A valve is coupled between each end (i.e. each hydraulic chamber) of the hydraulic cylinders and the hydraulic pump, which can be selectively opened and closed, e.g. under control of the hydraulic controller 416, to fluidically couple or fluidically isolate, respectively, the output of the hydraulic pump 414 and each hydraulic chamber of each hydraulic cylinder to selectively actuate a specific hydraulic cylinder and, more particularly, a particular side (e.g., blind side and/or rod side, as described in more detail below) of the hydraulic piston in the specific hydraulic cylinder. Each valve is designated by 418 in FIG. 5B.

As shown in FIG. 5A, stage two of the system 400 includes a pair of pressure vessels 462 and 464 connected in fluid communication to an actuator 413 that includes water pumps 466 and 468. As with the stage one configuration, each of the pressure vessels 462 and 464 can include dividers and each of the water pumps 466 and 468 include a water piston that is hydraulically driven by (or, in expansion mode, drives) a pair of hydraulic cylinders, also shown in FIG. 5A. Water pump 466 is coupled to and driven by hydraulic cylinders 470 and 472 and water pump 468 is coupled to and driven by hydraulic cylinders 474 and 476. The hydraulic cylinders for stage two can all be driven by, or drive a second high efficiency hydraulic pump/motor (not shown) in a similar fashion as stage one, using the same hydraulic controller 416, or a second hydraulic controller (not shown). It is to be appreciated that the stage two hydraulic cylinders, can be driven by, or drive various configurations of hydraulic pump/motor, and that the system 400 can have, for example, one, two, three, four, or more hydraulic pump/motors.

Each of the first and second pressure vessels 424 and 426 of the first stage are fluidly coupled to the pressure vessels 462 and 464 of the second stage by a conduit that may include one or more valves (not shown in FIG. 5A) to selectively open and close fluid communication between the volumes of the corresponding pressure vessels. The first and second pressure vessels 424 and 426 of stage one can also each include a valve (not shown) that opens to allow the receipt of air from the environment (e.g., at atmospheric pressure) or air that has been optionally pre-compressed from atmospheric pressure to a desired pressure, for example, 1-3 bar. Additional valves can be used between the pressure vessels of stage two and a storage structure or cavern (not shown) in which the compressed air from the system may be stored. Valves can be coupled to and disposed at locations along the conduit connecting the various components or directly to the components.

FIG. 6A schematically illustrates the various components of a portion of actuator 412 including the water pump 446, and its corresponding hydraulic cylinders 448 and 450; and FIG. 6B schematically illustrates the various components of the hydraulic cylinder 448. It should be understood, however, that each of the water pumps and hydraulic cylinders in both the first stage and the second stage of the system 400 can be similarly constructed and function in the same manner as water pump 446 and hydraulic cylinder 448. As shown in FIG. 6A, the water pump 446 includes a cylindrical water reservoir or housing 482 that can contain liquid, such as, for example, water W (though other working liquids could be used), a water piston, or working piston, 474 and a drive rod 476 coupled to the piston 474. The drive rod 476 is also coupled to hydraulic drive pistons 478 and 480 of the hydraulic cylinders 448 and 450, respectively. Thus, the hydraulic cylinders 448 and 450 can be used to operate or drive the piston 474 back and forth within the housing 482, pressurizing and moving the water W contained therein. The water housing 482 is divided into two portions, one on each side of piston 474. Each portion is in fluid communication with a pressure vessel, such as the pressure vessels described above (not shown in FIG. 6A). As described above, each side of working piston 474 bears the same pressure as that of the gas contained in the pressure vessel with which that side of working piston 474 bounds a working chamber containing the air.

FIG. 6B schematically illustrates the hydraulic cylinder 448. As shown in FIG. 6B, the hydraulic cylinder 448 includes a cylindrical housing 484 in which a hydraulic drive piston 478 is movably disposed. As stated above, the drive piston 478 is coupled to the drive rod 476. Within the housing 484 of the hydraulic cylinder 448, hydraulic fluid Hf can be pumped in and out, as will be described in more detail below.

The housing 484 of the hydraulic cylinder 448 defines an interior volume that is divided into two portions at any given time during a stroke of the hydraulic cylinder by the drive piston or hydraulic piston 478. As shown in FIG. 6B, the portion of the interior volume within the housing 484 above the drive piston 478 (or on the opposite side of the piston 478 from the rod 476) is referred to herein as the "blind side" or "bore side" Bs, and the portion of the interior volume within the housing 484 shown below the drive piston 478 (or on the same side as the rod 476) is referred to herein as the rod side Rs. To drive the hydraulic cylinders, hydraulic fluid Hf can be pumped into each hydraulic cylinder on either (or both) sides of the drive piston to achieve varying pressures and flow rates within the system. For example, at various steps in the process of compressing air for energy storage, the pressurized hydraulic fluid Hf can be pumped into the housing 484 only on the blind side Bs, only on the rod side Rs, or on both sides, depending on the desired output pressure, flow rate and/or direction of force desired at the various steps of a compression or expansion cycle.

For example, referring to the water pump 446 and its associated hydraulic cylinders 448 and 450, to move the working piston 474 within the housing 482 to change the volume of the working chamber bounded in part by the working piston, one or both of the hydraulic cylinders 448 and 450 can be actuated at a given time period to provide the desired force to move the piston. For example, to move the piston 474 upward, hydraulic fluid can be pumped into the blind side, or both the blind side and the rod side of the hydraulic cylinder 450, or hydraulic fluid can be pumped into the rod side of the hydraulic cylinder 448, or a combination thereof. To move the piston 474 downward, hydraulic fluid can be pumped into the blind side of hydraulic cylinder 448, both the blind side and the rod side of the hydraulic cylinder 448, or the rod side of the hydraulic cylinder 450, or a combination thereof. Each of these modes has a different total area of hydraulic piston bearing the pressure of the hydraulic fluid, and thus will exert a different force on the working piston 474. It is to be appreciated that varying the pressure of the hydraulic fluid can act in concert with the varying combinations of reservoir pressurization to provide a wide range of force to move the piston.

The system 400 can be configured to operate within a desired energy efficiency range of the hydraulic pump(s). The operating pressure range of the hydraulic pump(s) and the ratio of surface areas of the water pistons to the hydraulic drive pistons (also referred to herein as "piston ratio") can be used to determine an optimal operating sequence for the compression process. In addition, by varying which hydraulic pump(s) is actuated to move a water piston at a particular point in the cycle, the pressure in the system can be further varied. The pump has a preferred range of pressure and flow, within which it can be continuously operated as the air piston strokes.

As shown, for example, in FIGS. 6C-6F, the water piston 474 has an operating surface 490 that has a surface area $SA_w$ that is the same on both sides of the water piston (i.e. the annular area bounded by the outer perimeter of the water piston 474 and the outer perimeter of the rod 476), and the hydraulic drive piston 478 has an operating surface 492 on the blind side with surface area $SA_b$ (i.e. the circular surface area bounded only by the outer perimeter of the hydraulic drive piston) and an operating surface 494 on the rod side with a surface area $SA_r$ (i.e. the annular area bounded by the outer perimeter of the hydraulic drive piston and the outer perimeter of the rod). The operating surface area of a piston is the surface area of the piston on which force is exerted by hydraulic fluid pressure. Thus, when a hydraulic cylinder is actuated by communicating pressurized hydraulic fluid to the blind side, the effective surface area of the hydraulic piston is greater than when the same pressure is communicated to the rod side (i.e., $SA_b > SA_r$). Thus, for a given hydraulic fluid pressure, more force is applied to the rod 476 (albeit in different directions) when the hydraulic fluid pressure is applied to the blind side than when it is applied to the rod side. It is also possible to generate yet a different amount of force for a given hydraulic pressure by applying the hydraulic fluid pressure to both sides of a piston. In this mode of operation, referred to as a regenerative mode, the net piston area is equal to the difference between the blind side area $SA_b$ and the rod side area $SA_r$. This net area corresponds to the cross-sectional area of the rod, and is referred to as $SA_{(b-r)}$.

In some embodiments, a combination of surface areas associated with hydraulic drive piston 478 and hydraulic drive piston 480 are pressurized to achieve a desired output force on rod 476, which may correspond to a second pressure of water W. The effective or net operating surface area $A_{net}$ being pressurized for a given gear is then equal to the sum of the surface areas associated with the various portions of the hydraulic cylinders 448 and 450 being pressurized with hydraulic fluid. The sum of the surface areas can also be referred to as the surface area of the hydraulic piston(s) $SA_h$. It is to be appreciated that other embodiments include those in which the hydraulic fluid pressure communicated to the various surface areas in actuator 412 may be different from each other.

The ratio of the surface area of the working piston or water piston $SA_w$ to the surface area of the hydraulic piston(s) $SA_h$ dictates the hydraulic pressure needed to achieve a desired water pressure, and thus gas pressure, at a given point in the cycle. By varying the surface area ratio for a given water pump/hydraulic cylinder set, varying levels of water pressure can be achieved at different points within the compression cycle for the same levels of hydraulic pressure. The pressure of the hydraulic fluid needed to achieve a particular water pressure (and/or air pressure) can be calculated as follows.

$F_h$ (force of hydraulic fluid)=$P_h$ (hydraulic pressure)×$SA_h$ ($SA_r$ or $SA_b$ or $SA_{(b-r)}$)

$F_w$ (force applied to water)=$P_w$ (water pressure)×$SA_w$ $F_h = F_w$ $P_w \times SA_w = P_h \times SA_h$ $P_w = P_h \times (SA_h/SA_w)$ and $P_h = P_w \times (SA_w/SA_h)$ A maximum and minimum operating pressure for each hydraulic pump can be established, e.g. as the limits of a range of operating pressure within which the hydraulic pump operates at or above a desired energy efficiency. This pressure range can be used to determine the piston ratio (e.g., ($SA_h/SA_w$)) needed at various points during a compression cycle to operate the system so as to approach or achieve operation within the maximum efficiency range of the hydraulic pump.

For example, for a hydraulic pump having a maximum efficient operating pressure of 300 bar and a desired maximum output pressure of the air (and therefore the water) is 30 bar, the piston ratio (i.e., ($SA_w/SA_h$)) required at the end of the pressurization cycle, when the water and air pressure reaches 30 bar, is 10:1. Correspondingly, if the hydraulic pump has a minimum efficient operating pressure of 120 bar, and the air enters the system at 3 bar, then the piston ratio (i.e., ($SA_w/SA_h$)) required at the start of the pressurization cycle, when the water and air pressure is 3 bar, is 40:1. The number of water pumps and hydraulic pumps needed, and the piston ratios (and corresponding size of the hydraulic cylinders and water pumps) for the various water pump/hydraulic sets can then be determined such that the system can operate within the desired efficiency range for the entire compression cycle (i.e., compressing the air from 3 bar to 30 bar). There are a variety of different operating sequences that can be used to incrementally increase the pressure in the system and to achieve this output. It is understood that the approach can be applied using hydraulic pumps with maximum operating pressures higher or lower than 300 bar, and minimum operating pressures higher or lower than 120 bar.

At a given time during a compression or expansion cycle, the actuator 412 can be referred to as being in a particular "state" or gear that is associated with the piston area ratios being pressurized within the actuator at that time. As described above, when the system makes a change in the ratio of the pressure of the hydraulic fluid in the hydraulic actuator to the pressure of the water in the water pump(s) actuated by the hydraulic actuator (i.e., the ratio of the pressurized surface area of the water piston to the net operating pressurized surface area(s) of the hydraulic piston(s) actuating the water piston) this is referred to as a "gear shift" or "gear change." There is a variety of different combinations or sequences of gear changes (changes in piston area ratios) that can be incorporated into a particular operating sequence of the system.

In the example of system 400, where each water pump has two identical associated hydraulic cylinders to actuate the water pump, there are sixteen possible states for the two actuators, i.e. every combination of each chamber being pressurized or not pressurized (two states for four chambers gives $2^4$ combinations). For identical hydraulic cylinders (i.e. in which the blind side area of each cylinder is the same and the rod side area of each cylinder is the same), there are four different possible gears (with associated piston area ratios) that can be used to actuate each working or water piston in each direction. For example, to move a water piston upward in one water pump, hydraulic fluid can be pumped into (1) the rod side of the upper hydraulic cylinder (or the rod side of the upper hydraulic cylinder and the blind side of both cylinders, which cancel each other out), (2) the blind side of the lower hydraulic cylinder (or the blind side of the lower cylinder and the rod side of both cylinders, which cancel each other out), (3) both the blind side and the rod side of the lower hydraulic cylinder, or (4) both the rod side of the upper hydraulic cylinder and the blind side of the lower hydraulic cylinder. The state in which none of the chambers is pressurized does not produce any force on the working piston, nor (for identical cylinders) does the state in which all chambers are pressurized. In the embodiment depicted in FIG. 5A, each stage is configured with two water pumps that actuate one after the other, and because each water pump in this embodiment has four possible gears, the compression process has eight possible gears. It is to be appreciated that other embodiments include those in which the hydraulic fluid pressure communicated to the various surface areas in actuator 412 may be different from each other and may create more than four possible gears in each water pump. It is appreciated that given an actuator that can achieve four possible gears, it may be preferable to use fewer gears than four gears, for example three gears. The reasons for such a preference may involve the dynamic response of the fluid and/or mechanical components to the gear shift events. Correspondingly, an embodiment configured with two water pumps may be operated using five, six, or seven of the possible eight gears. Moreover, the compression process may also vary according to the current pressure of the compressed air storage vessel, e.g. when the storage vessel is at relatively low pressure, the preferred compression process may use one, two, three, four, five, six, or seven of the possible eight gears.

In other embodiments, an actuator can be configured to have a different number of possible different gears and gear changes based on, for example, the number of hydraulic cylinders, the size (e.g., diameter) of the housing of a hydraulic cylinder in which a hydraulic piston is movably disposed, the size (e.g., diameter) of the hydraulic pistons disposed within the housing of the hydraulic cylinders, the number and size of drive rods coupled to the hydraulic pistons, and/or the size of the working piston to be actuated. Further examples of actuators are described below with reference to FIGS. 51A-51D, 52A-52C, 53, 54A-54B, 55 and 56.

Thus, the hydraulic pressure time profile can be varied as needed to achieve a particular output air pressure. The efficiency range of the hydraulic pump system can determine the number of gears and gear shifts that may be needed for a desired air pressure range (difference between input or start pressure and output or end pressure). For example, if the hydraulic pump's efficiency range is narrower, then more gears may be needed for a given air pressure range. The size and number of gears can also depend on the particular operating speed (RPM) of the system.

FIGS. 7-14 illustrate an air compression cycle using the system 400 and operating the system within or approaching the maximum (or a desired) efficiency range throughout the stroke or cycle of the system. The optimization process in this example utilizes an operating regime that includes four different gears for each stage in the process to maintain operation within the optimal efficiency range of the hydraulic system. In this example, the four gear modes are accomplished by using two water pumps in sequence, each of which uses two or three gears. The system 400 can be configured, for example, to compress air from 3 bar to 30 bar in stage one, and then from 30 bar to 180 bar in stage two. It should be understood that this is only one example operating sequence that can be used. The water pressure, and therefore the air pressure, in the system can be gradually ramped up during a given cycle. As the system moves through each of the various gear shifts, the pressure of the hydraulic fluid increases from a minimum efficient operating pressure of the hydraulic system (e.g., 120 bar) to the maximum efficient operating pressure of the hydraulic system (e.g., 300 bar). As the maximum desired operating pressure of the hydraulic pump/motor is reached within each gear mode of the cycle, the system shifts to the next gear in the sequence.

Figure 7:
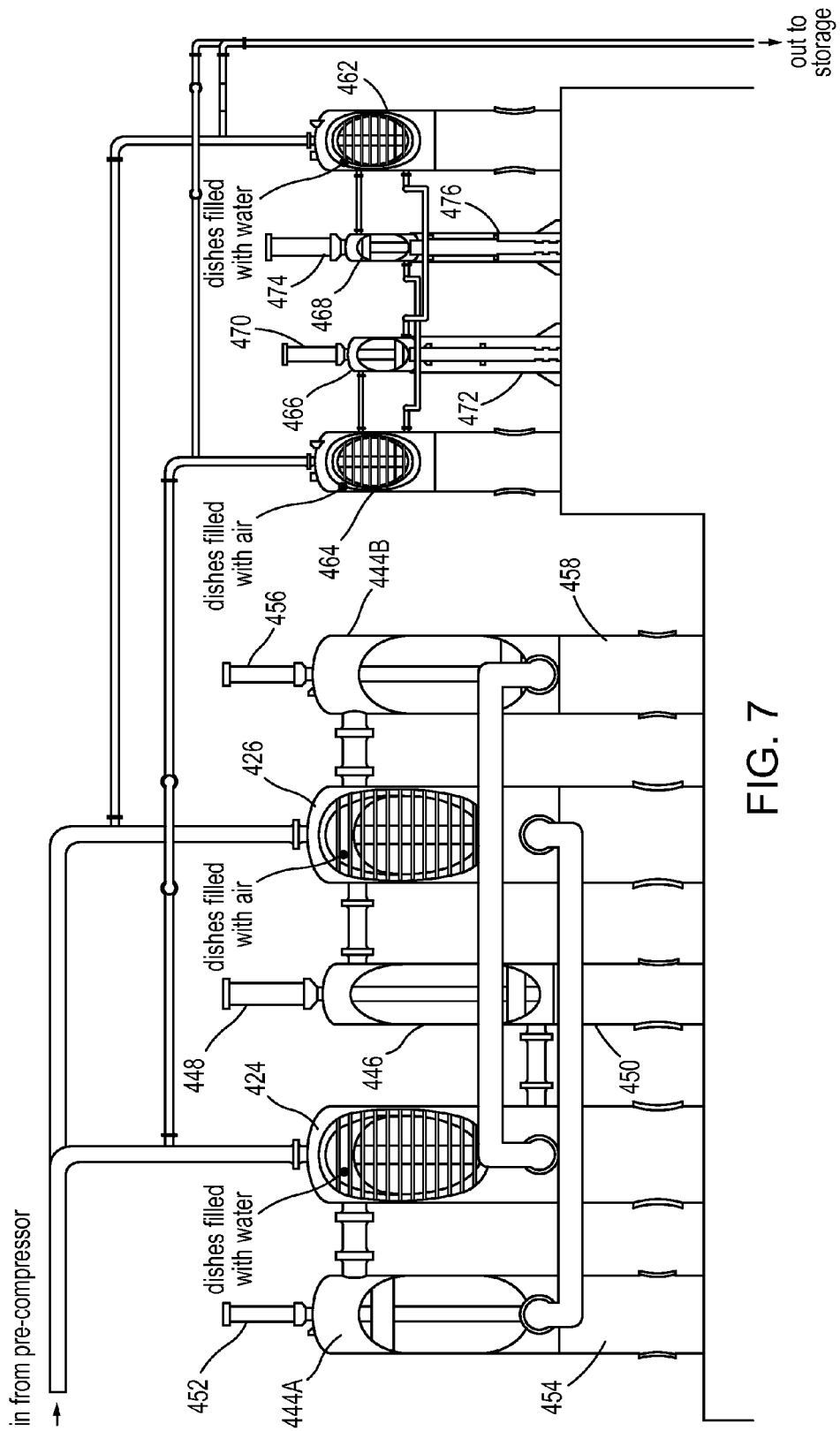
FIGS. 7-14 illustrate a process of compressing air with the system of FIG. 5 according to an embodiment.

FIG. 7 includes reference numbers corresponding to the various components of the system 400 as described above and includes conduit or housing connecting the various water pumps and pressure vessels. Although not visibly shown in FIGS. 7-14, the lower hydraulic cylinders 450, 454, 458 of stage one are each shrouded inside a support housing that is labeled so as to indicate the hydraulic cylinders the housing encases.

FIG. 7 illustrates a starting condition for a compression cycle that includes receiving air directly from the outside environment (i.e. at ambient pressure) or from a pre-compressor (e.g. at 3 bar) into the first pressure vessel 424 of the first stage. FIGS. 8-10 and 12-14 illustrate the flow of water and air and the drive direction for the hydraulic cylinders of both stage one and stage two of the compression cycle of the system. FIGS. 11-14 illustrate a full cycle for compressing air received within the second pressure vessel 426 of the first stage. Thus, FIG. 11 illustrates an end of the cycle to compress air initially received in the first pressure vessel 424 and also a starting point for a cycle that includes compressing air initially received within the second pressure vessel 426. One full cycle of the system 400 (FIGS. 7-11 or FIGS. 11-14) can be, for example, a total of 6 seconds.

As shown in the example of FIG. 7, a compression cycle involves both stage one and stage two, and can begin, for purposes of illustration, in the following state: with the first pressure vessel 424 of stage one and the second pressure vessel 462 of stage two each filled with water, and the second pressure vessel 426 of stage one and the first pressure vessel 464 of stage two each filled with air. A compression stroke will commence by driving water pumps 444A and 444B of stage one and driving water pump 466 of stage two. A valve (not shown) between the stage one first pressure vessel 424 and a pre-compressor (not shown) can be opened to allow intake air to enter the conduit connected to the pressure vessel 424. A valve (not shown) between the stage one second pressure vessel 426 and the stage two second pressure vessel 462 can be opened to allow fluid communication between the two pressure vessels. A valve (not shown) between the stage two first pressure vessel 464 and the storage cavern (not shown) can be closed at the beginning of the compression stroke and can be opened at some time during the compression stroke, for example when the air pressure in pressure vessel 464 is substantially equal to the storage cavern (not shown) air pressure.

Figure 8:
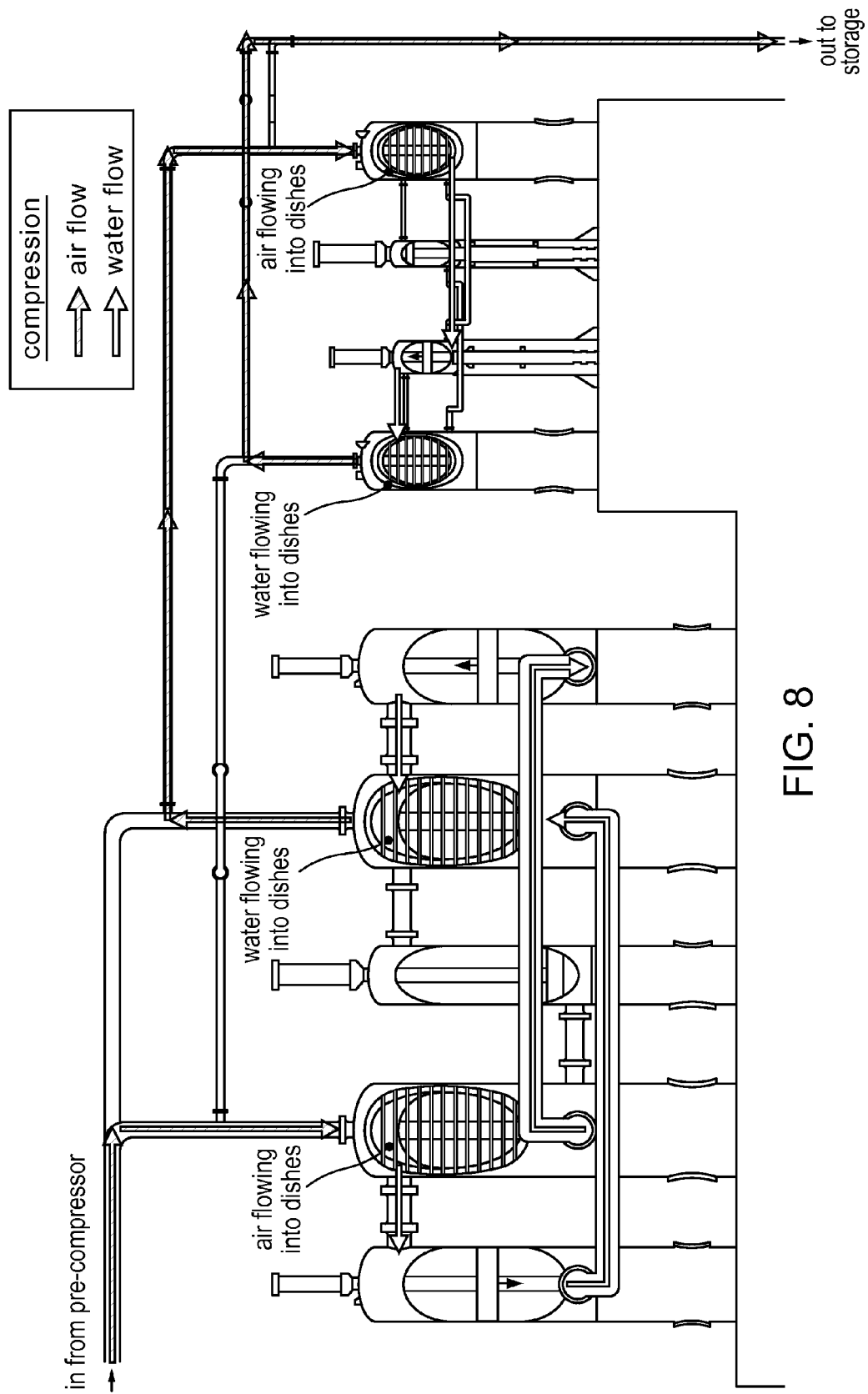

It is important to recognize that the system operates three air manipulation processes in concert: one intake process and two compression processes. Therefore, there are three air volumes to recognize. During all compression strokes, there is one volume of air being drawn into the system at a substantially constant intake pressure, and there are two volumes of air, at two different pressures, compressing simultaneously. For example, while a first volume of air is being taken in at a substantially constant pressure of, for example, 3 bar, a second volume of air is being compressed from, for example, 3 bar to 30 bar, a third volume of air is being compressed from, for example, 30 bar to the discharge pressure (which varies with cavern pressure), for example 180 bar. FIG. 8 depicts the compression stroke approximately half way through the simultaneous actuation of water pumps 444A and 444B, and water pump 466. With reference to FIG. 8, a first volume of air at an intake pressure enters pressure vessel 424, a second volume of air begins compression and transfer from pressure vessel 426 to pressure vessel 462, and a third volume of air begins compression and transfer from pressure vessel 464 to the storage cavern (not shown). Note that FIG. 8 depicts an example and a condition in which the air pressure in pressure vessel 464 has achieved equality with the air pressure in the storage cavern and therefore a valve (not shown) between pressure vessel 464 and the storage cavern has been opened so as to allow air to be transferred from pressure vessel 464 to the storage cavern. It is recognized that in the course of air transfer from pressure vessel 464 to the storage cavern, a concomitant air compression may occur; the pressure increase thereof may be dictated by the relative volumes of pressure vessel 464 and the storage cavern.

Figure 9:
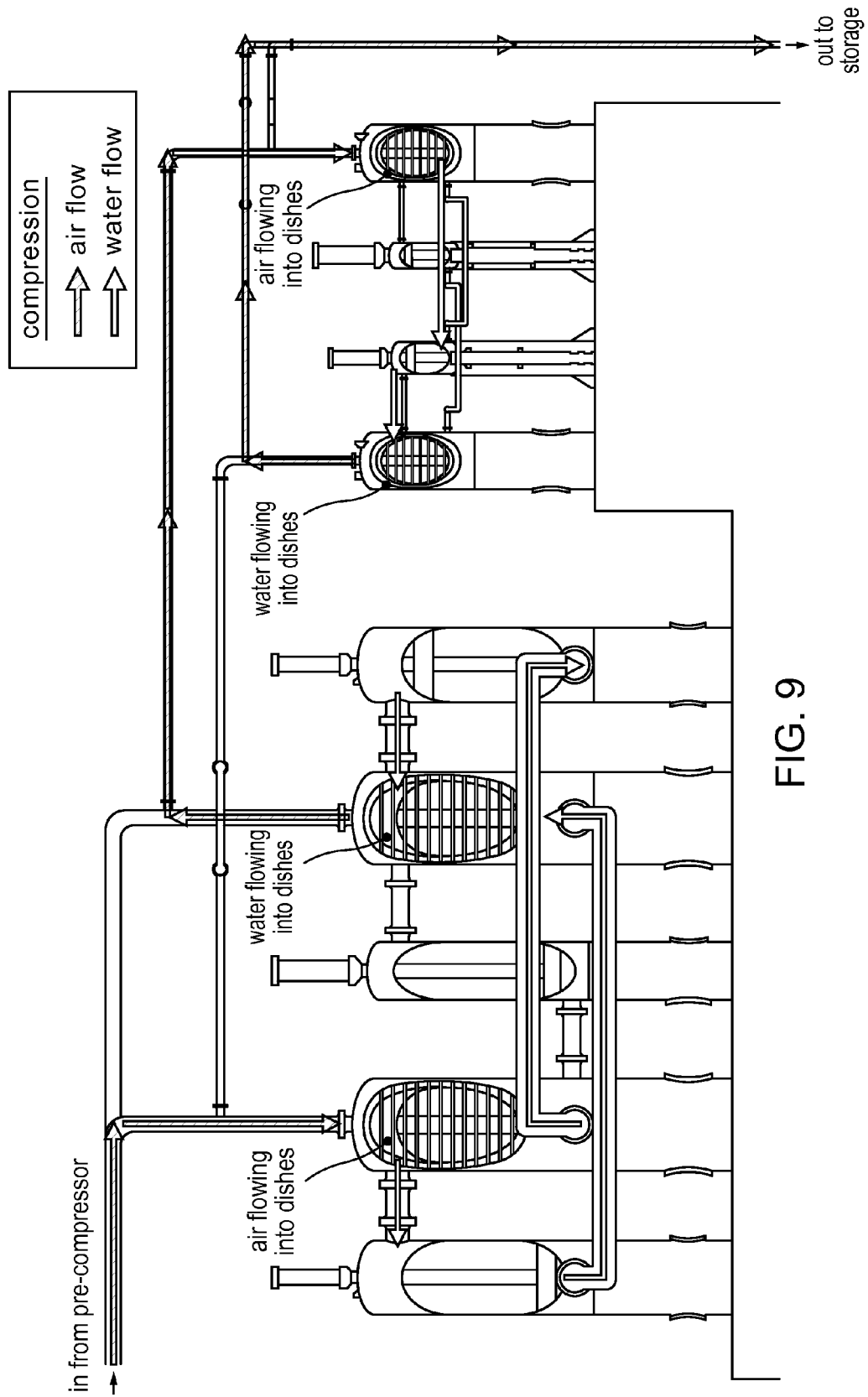

FIGS. 8 and 9 illustrate a beginning portion of the compression cycle. Because the air is at relatively low pressure during the beginning portion of the compression cycle relative to the higher air pressures developed as the air compression proceeds, the beginning of the compression cycle uses the "high end" of the six gear sequence, and proceeds to using the "low end" of the six gear sequence. FIGS. 8 and 9 may include a gear shift from sixth gear to a next "lowest" gear, in this example a "fifth" gear, and may also include a gear shift from fifth gear to yet a next lowest gear, in this example a "fourth" gear. With respect to the air, water, and piston motions depicted in FIG. 8, in stage one, the sixth gear can include actuating the hydraulic valves (not shown) to fluidically couple the pressurized hydraulic fluid output by the hydraulic pump/motor (not shown) to the rod side chamber and blind side chamber of the upper hydraulic cylinder 452 and to the rod side chamber and blind side chamber of the lower hydraulic cylinder 458, and pumping the pressurized hydraulic fluid into those chambers. This will cause the piston in water pump 444A to be moved downward, and the piston in water pump 444B to be moved upward, by the respective actuators. In stage two, sixth gear can include actuating the hydraulic valves (not shown) to fluidically couple the pressurized hydraulic fluid output by the hydraulic pump/motor (not shown) to the rod side chamber and blind side chamber of the lower hydraulic cylinder 472. This will cause the piston in water pump 466 to be moved upward by its actuator.

Before the pistons 444A and 444B, and 466 reach the end of their strokes (as shown in FIG. 9), gear shifts from sixth to fifth, and from fifth to fourth, and from fourth to third may have been initiated. (Note that FIG. 9 depicts both the end of fourth gear and/or the beginning of third gear.) If a gear shift from sixth to fifth is initiated, the valves (not shown) that supply pressurized hydraulic fluid from the hydraulic pump/motor to the rod side chambers of hydraulic cylinders 454 and 456, and 470 are opened. Opening these valves augments the piston rod "push" already coming from hydraulic cylinders 452 and 458, and 472, with a piston rod "pull" from hydraulic cylinders 454 and 456, and 470. It is to be appreciated that the sequence described above corresponds to an embodiment in which $SA_r<SA_{(b-r)}$, and that embodiments in which the surface areas are of a different relative sizes, for example, $SA_r>SA_{(b-r)}$, the pressurization combination that achieves sixth gear versus fifth gear can vary, and thus the preferred pressurization sequence can vary.

It is appreciated, and will be familiar to those skilled in the art, that in addition to valves that allow fluidic communication with a supply of pressurized fluid, all hydraulic cylinder chambers may also be provisioned with valves (not shown) that may allow fluidic communication with a low pressure hydraulic fluid reservoir (not shown), and that when these valves open, the associated hydraulic chamber fluid substantially maintains the low pressure of the hydraulic reservoir, and that hydraulic fluid can flow, which can allow hydraulic piston motion. Gear shift descriptions involving opening or closing valves communicating with pressurized hydraulic fluid, purposely omit, for brevity, detailing the associated closing or opening of valves that communicate between the cylinder chambers and the low pressure hydraulic fluid reservoir.

It is important to recognize that the timing of the gear shifts during compression of stage one are independent of the timing of the gear shifts in stage two. The preferred method of gear shift operation primarily attends to selecting gears that result in pressurized hydraulic fluid pressures that maximize the hydraulic pump operation energy efficiency. The hydraulic fluid pressures that drive each stage of compression against a first air pressure developing in the first stage of compression, and against a second air pressure developing in a second stage of compression, may differ, and that first air pressure differs from the second air pressure. In the preferred embodiment, the pressure of the pressurized hydraulic fluid that drives stage one is controlled independently from the pressure of the pressurized hydraulic fluid that drives stage two, and this may be achieved by provisioning each of stage one and stage two with a dedicated hydraulic pump/motor. It is recognized that in some embodiments, the pressure of the pressurized hydraulic fluid that drives stage one may be the same pressure as the pressure of the pressurized hydraulic fluid that drives stage two, and this may be achieved by provisioning both stages with a single hydraulic pump/motor.

The previous description and the following description is based on a compression process configured as a gear system with six available gears, where the sixth gear has the largest ratio of effective water piston surface area to effective hydraulic fluid surface area; in other words, in sixth gear the flow of a relatively small volume of hydraulic fluid will create a relatively large volume of water flow, and thus a relatively large change in volume available to be occupied by the gas being compressed. It is important to recognize that the first stage of the system is configured with a first set of six gear ratios, and that the second stage of the system is configured with a second set of six gear ratios. The six gears may be implemented using two, three, or more water pumps. It is also important to recognize that the first stage of compression operates at an air pressure range that is lower than the air pressure range operated in the second stage of compression. Correspondingly, the system is configured such that the six gear range used to drive the first stage of compression consists of gear ratios that are higher than the six gear range configured to drive the second stage of compression. It is appreciated, and it is anticipated, that embodiments can have more gears or fewer gears. It is appreciated, and it is anticipated, that embodiments can use more water pumps, or can use fewer water pumps.

With reference to FIGS. 7-9, before the pistons 444A and 444B, and 466 reach the end of their strokes (as shown in FIG. 9), gear shifts from sixth to fifth, and from fifth to fourth, and from fourth to third may have been initiated.

If a gear shift from fifth to fourth is initiated, the valves (not shown) that supply pressurized hydraulic fluid from the hydraulic pump/motor to the rod side chambers of hydraulic cylinders 452 and 458, and 472 are closed. Closing these valves increases the piston rod "push" already coming from hydraulic cylinders 452 and 458, and 472, by leaving only the blind side chambers of hydraulic cylinders 452 and 458, and 472 in fluidic communication with the pressurized hydraulic fluid. The increased piston rod "push" combines with the ongoing piston rod "pull" from hydraulic cylinders 454 and 456, and 470 to achieve a fourth gear piston rod force that can be greater than the fifth gear piston rod force. The fourth gear piston rod force must be sufficient to achieve the water pump position depicted in FIG. 9.

Figure 10:
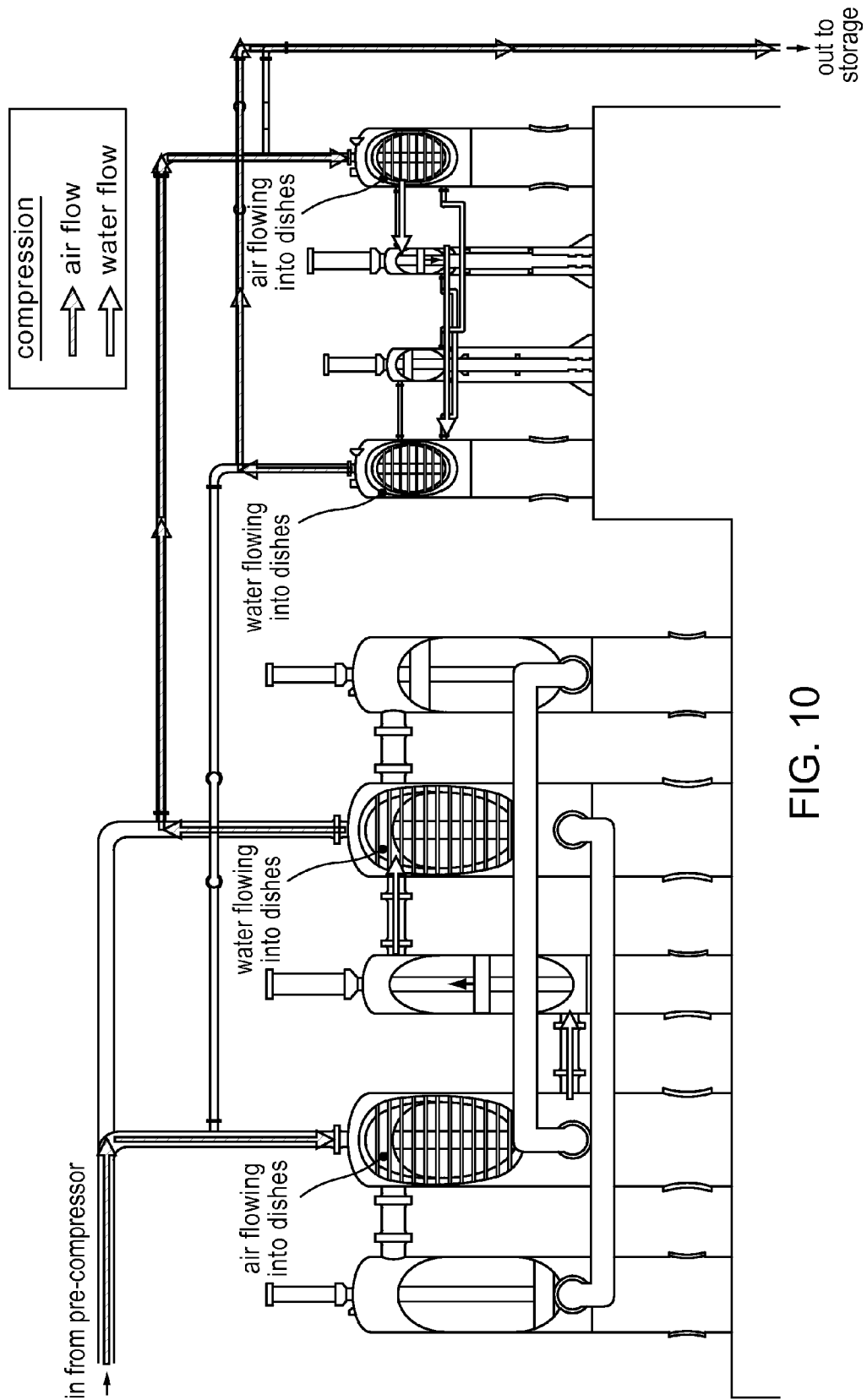
Figure 11:
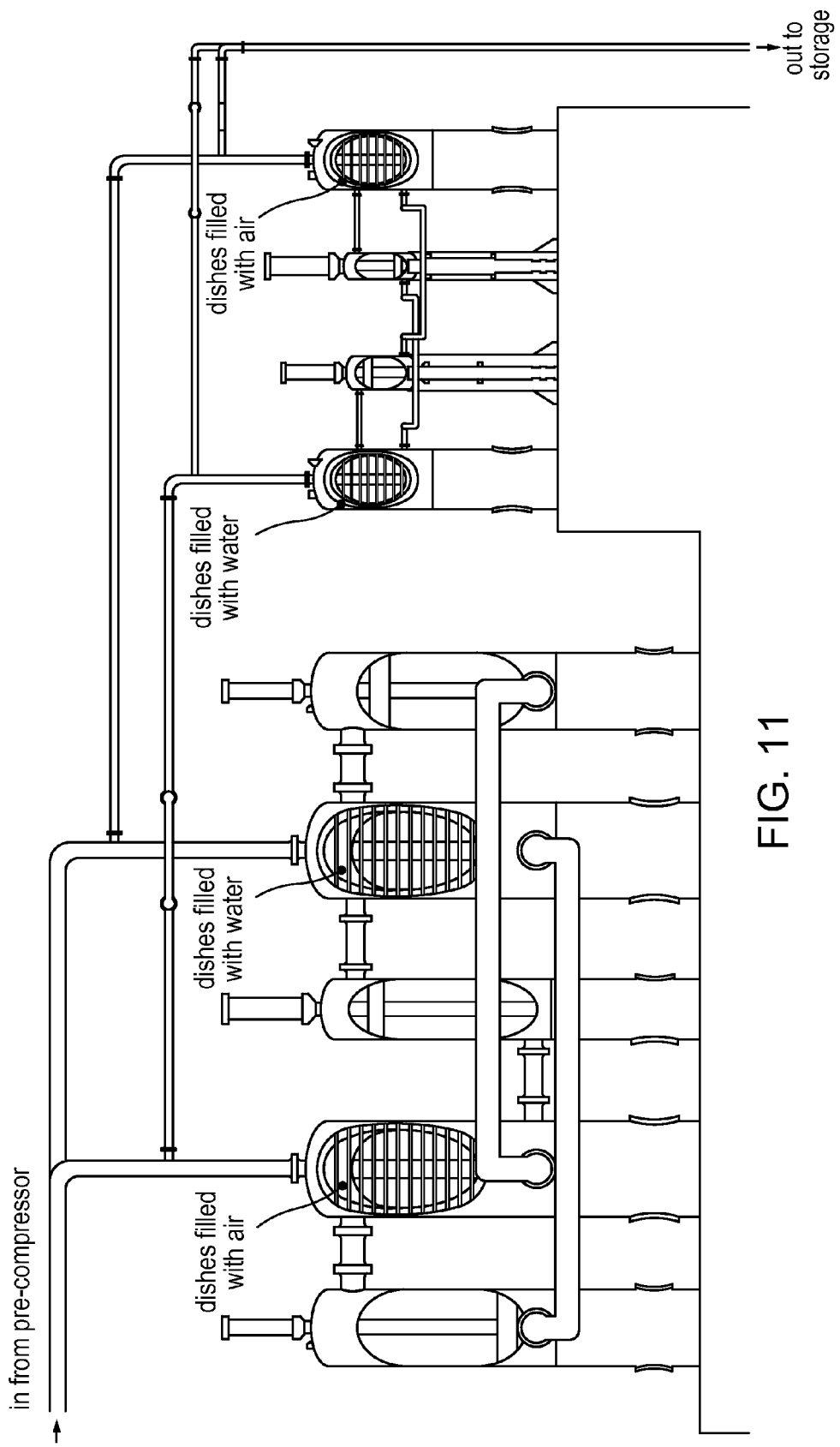

FIG. 10 depicts the action of the second water pumps of both stage one and stage two. Regarding the action of the second water pumps, FIG. 9 depicts third gear. Before the pistons 446, and 468 reach the end of their strokes (as shown in FIG. 11), gear shifts from third to second, and second to first may have been initiated. To configure the second water pumps in third gear, the valves (not shown) that supply pressurized hydraulic fluid from the hydraulic pump/motor to the rod side chambers and the blind side chambers of hydraulic cylinders 450 and 474 are opened, configuring cylinders 450 and 474 so as to "push" in regenerative mode.

If a gear shift third to second is initiated, the valves (not shown) that supply pressurized hydraulic fluid from the hydraulic pump/motor to the rod side chambers of hydraulic cylinders 448 and 476 are opened. Opening these valves results in augmenting the piston rod "push" already applied by hydraulic cylinders 450 and 474, with a piston rod "pull" from hydraulic cylinders 448 and 476. It is to be appreciated that the sequence described above corresponds to an embodiment in which $SA_r < SA_{(b-r)}$, and that embodiments in which the surface areas are of a different relative sizes, for example, $SA_r > SA_{(b-r)}$, the pressurization combination that achieves sixth gear versus fifth gear can vary, and thus the preferred pressurization sequence can vary.

If a gear shift from second to first is initiated, the valves (not shown) that supply pressurized hydraulic fluid from the hydraulic pump/motor to the rod side chambers of hydraulic cylinders 450 and 474 are closed. Closing these valves increases the piston rod "push" already coming from hydraulic cylinders 450 and 474, by leaving only the blind side chambers of hydraulic cylinders 450 and 474 in fluidic communication with the pressurized hydraulic fluid. The increased piston rod "push" combines with the ongoing piston rod "pull" from hydraulic cylinders 448 and 476 to achieve a first gear piston rod force that can be greater than the second gear piston rod force. The first gear piston rod force must be sufficient to achieve the water pump position depicted in FIG. 11.

As illustrated by the flow arrows for water and air in FIGS. 8-9, as the system cycles through a first portion of a stroke, the water in the stage one first pressure vessel 424 will move and be drawn into the water pumps 444A and 444B as indicated by the water flow arrows. As the water flows out of pressure vessel 424, volume is created inside the pressure vessel 424 for air to enter as indicated by the air flow arrows. For example, a relatively negative pressure can be created within the pressure vessel 424, which will draw ambient air or pre-compressed intake air into the first pressure vessel 424 and into pockets within each of the dividers within the pressure vessel 424. It is understood that other embodiments may use dividers that do not include pockets. This results in air/liquid and air/divider interfaces through which heat may be transferred. When the pistons in the water pumps 444A and 444B reach the end of their stroke (as shown in FIG. 9), a second portion of a stroke, as depicted in FIG. 10, draws additional water from pressure vessel 424 into the water pump 448, and draws additional intake air into pressure vessel 424. FIG. 11 depicts the end of water removal from pressure vessel 424, which is also the end of the air intake stroke that draws air into pressure vessel 424.

As illustrated by the flow arrows for water and air in FIGS. 8-9, as the system cycles through a first portion of compression, the water in the stage two second pressure vessel 462 will move and be drawn into water pump 466. As the water flows out of pressure vessel 462, volume is created inside the pressure vessel 462 for air from pressure vessel 426 to enter as indicated by the air flow arrows in FIGS. 8 and 9, urged by a relatively negative pressure that can be created within the pressure vessel 462. When the piston in the water pump 466 reaches the end of its stroke (as shown in FIG. 9), a second portion of a stroke, as depicted in FIG. 10, draws additional water from pressure vessel 462 into the water pump 468, which draws additional air into pressure vessel 462. FIG. 11 depicts the end of water removal from pressure vessel 462, which is also the end of the air compression and transfer stroke that draws air into pressure vessel 462.

As illustrated by the flow arrows for water and air in FIGS. 8-9, as the system cycles through a first portion of compression, water from water pump 466 will move into pressure vessel 464. As the water flows into pressure vessel 464, volume inside the pressure vessel 464 is reduced, increasing the air pressure in pressure vessel 464. For example, when the air pressure inside pressure vessel 464 substantially equals the air pressure in the air storage cavern (not shown), a valve (not shown) may open between pressure vessel 464 and the storage cavern that establishes communication between pressure vessel 464 and the storage cavern. Water may continue to move from water pump 466 into pressure vessel 464, which may transfer air from pressure vessel 464 into the air storage cavern as indicated by the air flow arrows in FIGS. 8 and 9; urged by a relatively positive pressure that can be created within the pressure vessel 464. When the piston in the water pump 466 reaches the end of its stroke (as shown in FIG. 9), a second portion of a stroke, as depicted in FIG. 10, moves additional water from water pump 468 into pressure vessel 464, which moves additional air into the storage cavern (not shown). FIG. 11 depicts the end of water movement into pressure vessel 464. It is appreciated that the valve that can establish communication between pressure vessel 464 and the storage cavern may open during the actuation of water pump 466 or during the actuation of water pump 468 as needed, for example, depending on when during the stroke the air pressure in pressure vessel 464 equals the air pressure in the storage cavern.

Figure 12:
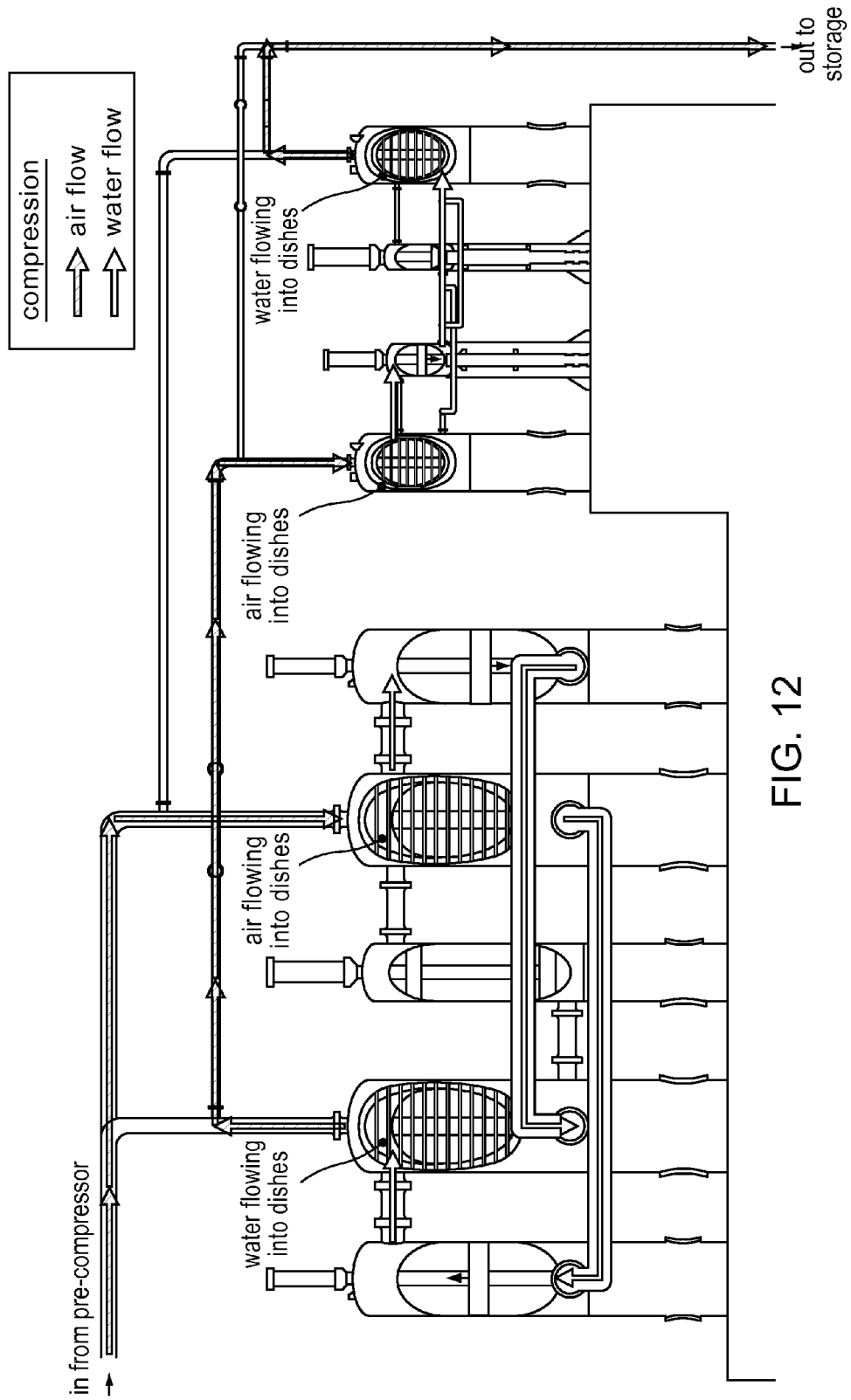
Figure 13:
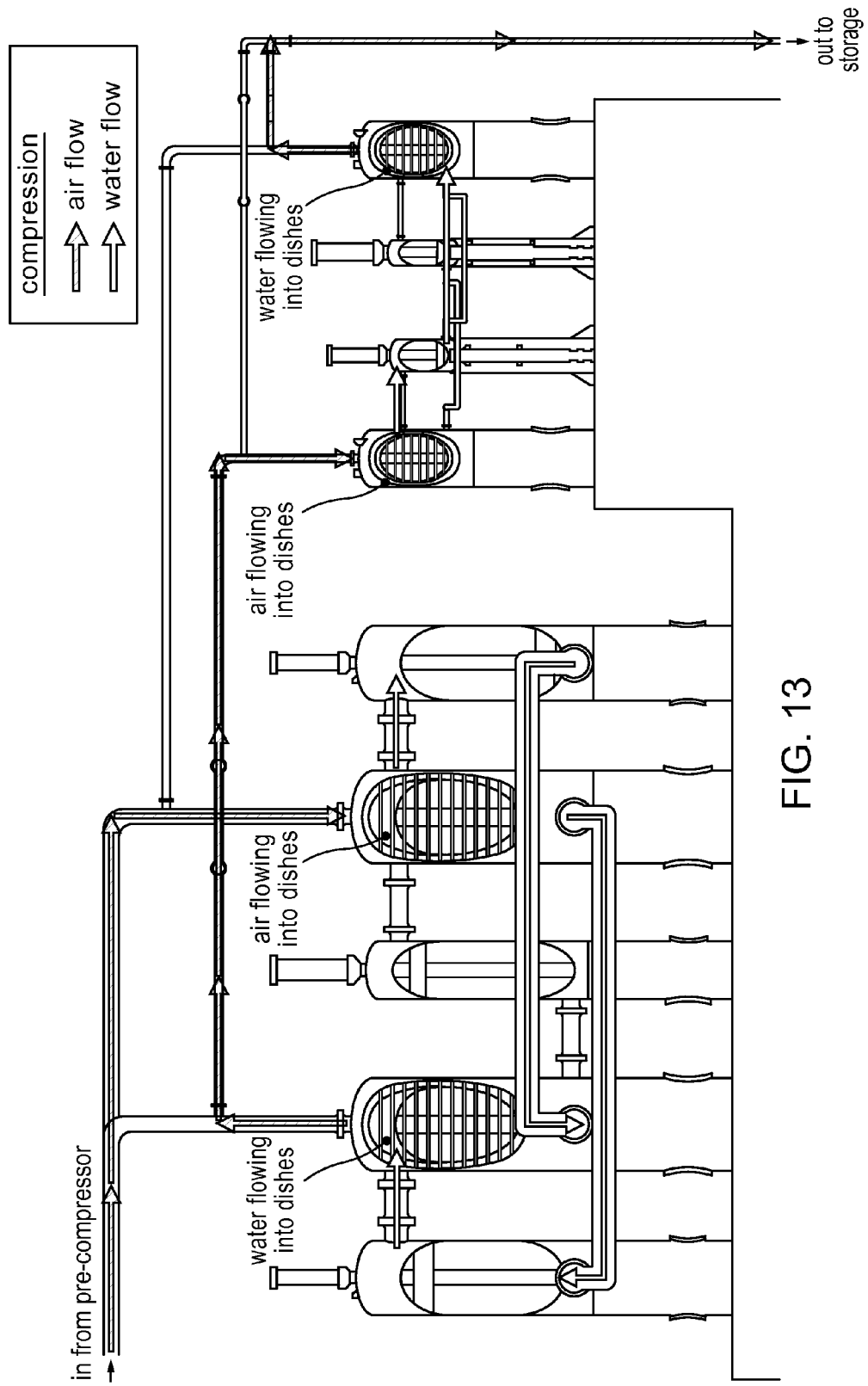
Figure 14:
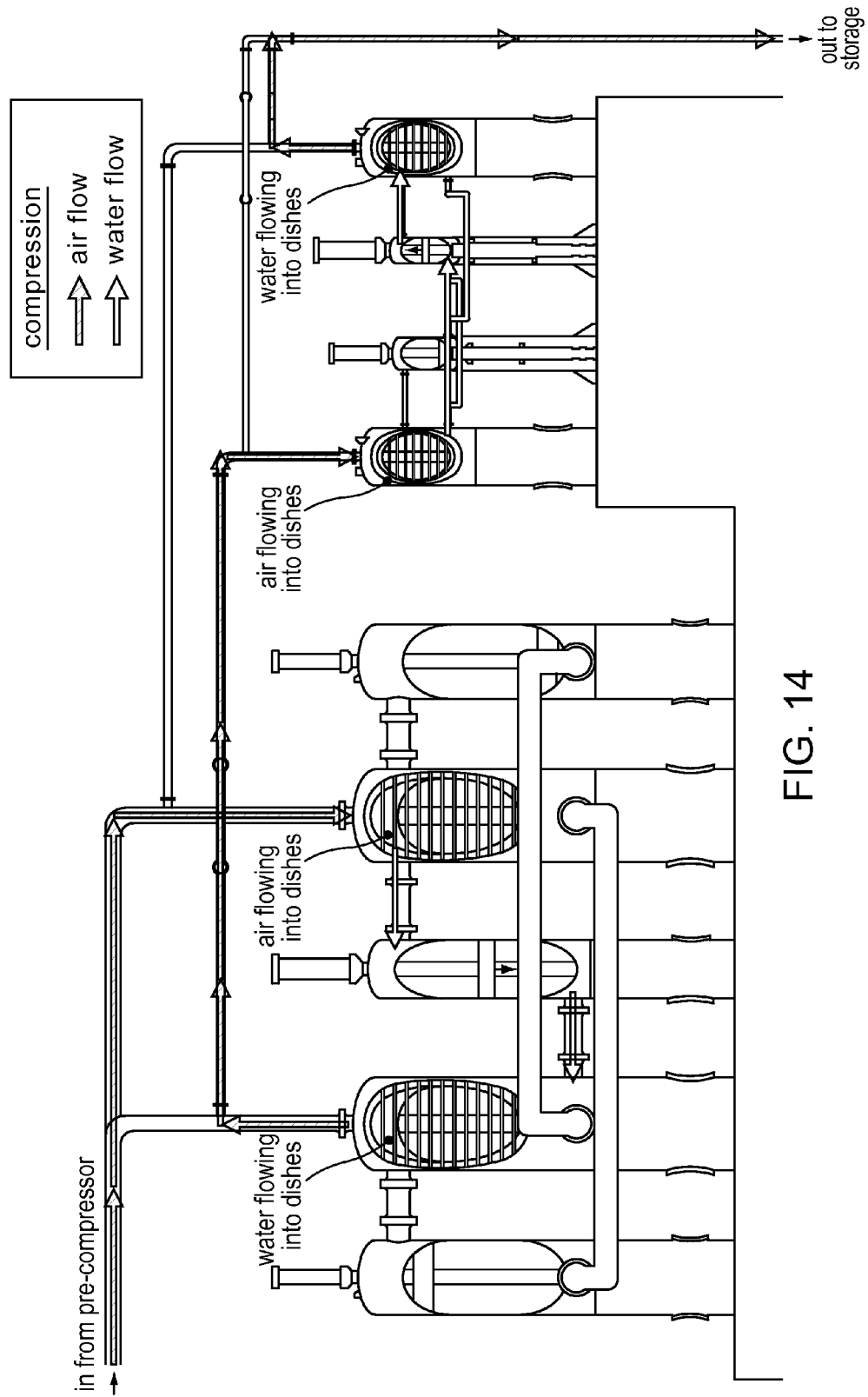

FIGS. 12 to 14 illustrate a similar process as described above, except that intake air is received in pressure vessel 426 (stage one), air is transferred from pressure vessel 424 (stage one) to pressure vessel 464 (stage 2), and air is transferred from pressure vessel 462 (stage 2) to the storage cavern (not shown). These processes operate in a similar manner as described above and are therefore not described in detail.

FIGS. 15-22 illustrate an expansion process using system 400. Air that has been stored within the storage structure can be expanded through system 400 and be used to convert the stored energy into other forms that may be desirable, for example, it may be used to generate electricity. The various components of the system 400 can operate in a similar manner but in an opposite direction. Thus, air can be expanded through stage two and then stage one, in each stage the expanding air driving the pistons in the water pumps, which in turn drive the hydraulic pump/motor and the electric motor/generator to generate electricity. After the final expansion of the air inside a pressure vessel, if it is still above ambient pressure additional energy can be generated by expansion of the air by, for example, transferring the air to another energy conversion device, such as an air turbine. In other embodiments, after the final expansion inside a pressure vessel, the air may be released to the ambient environment, and may be released at substantially ambient air pressure.

Figure 15:
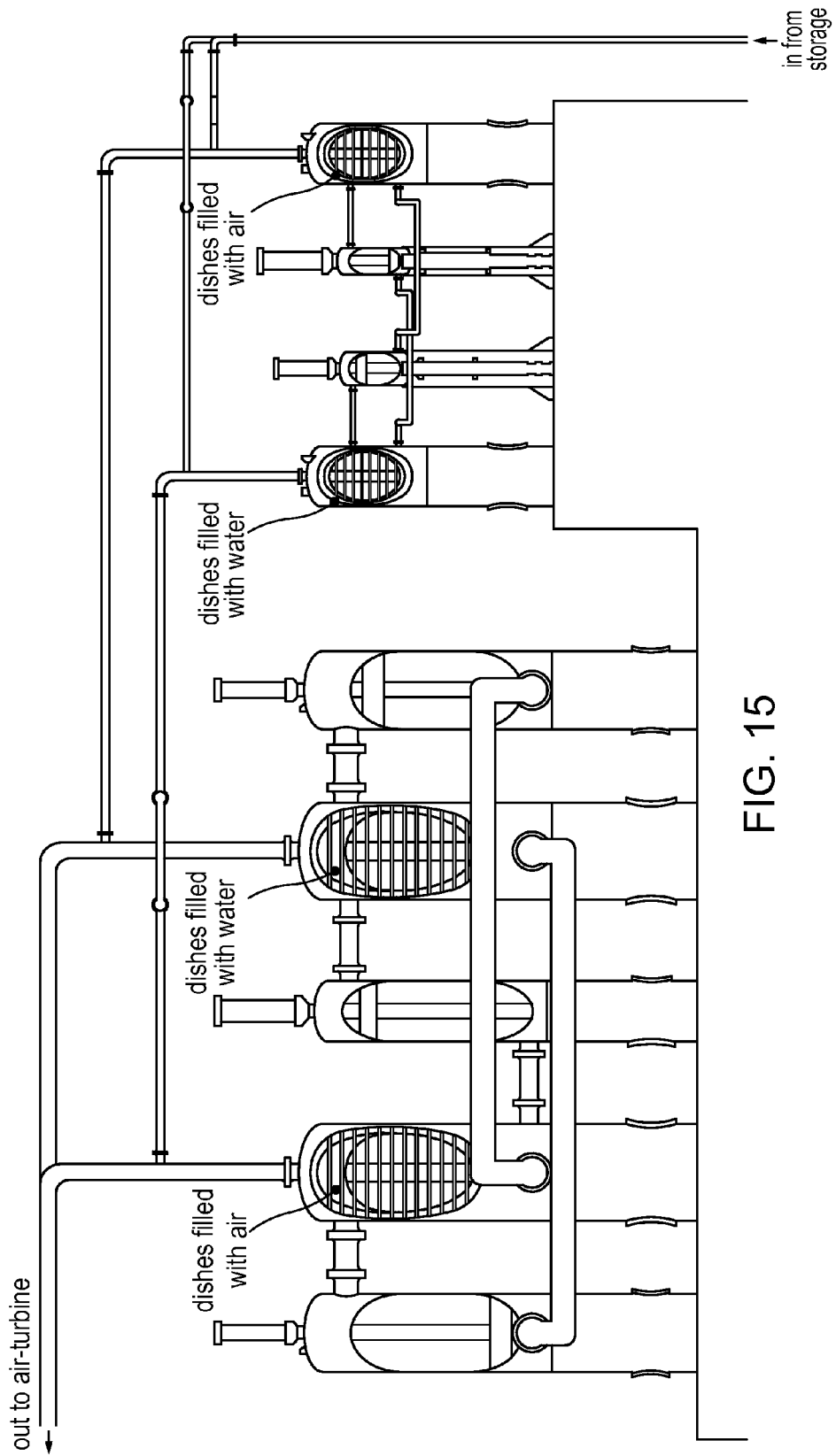
FIGS. 15-22 illustrate a process of expanding air with the system of FIG. 5, according to an embodiment.
Figure 16:
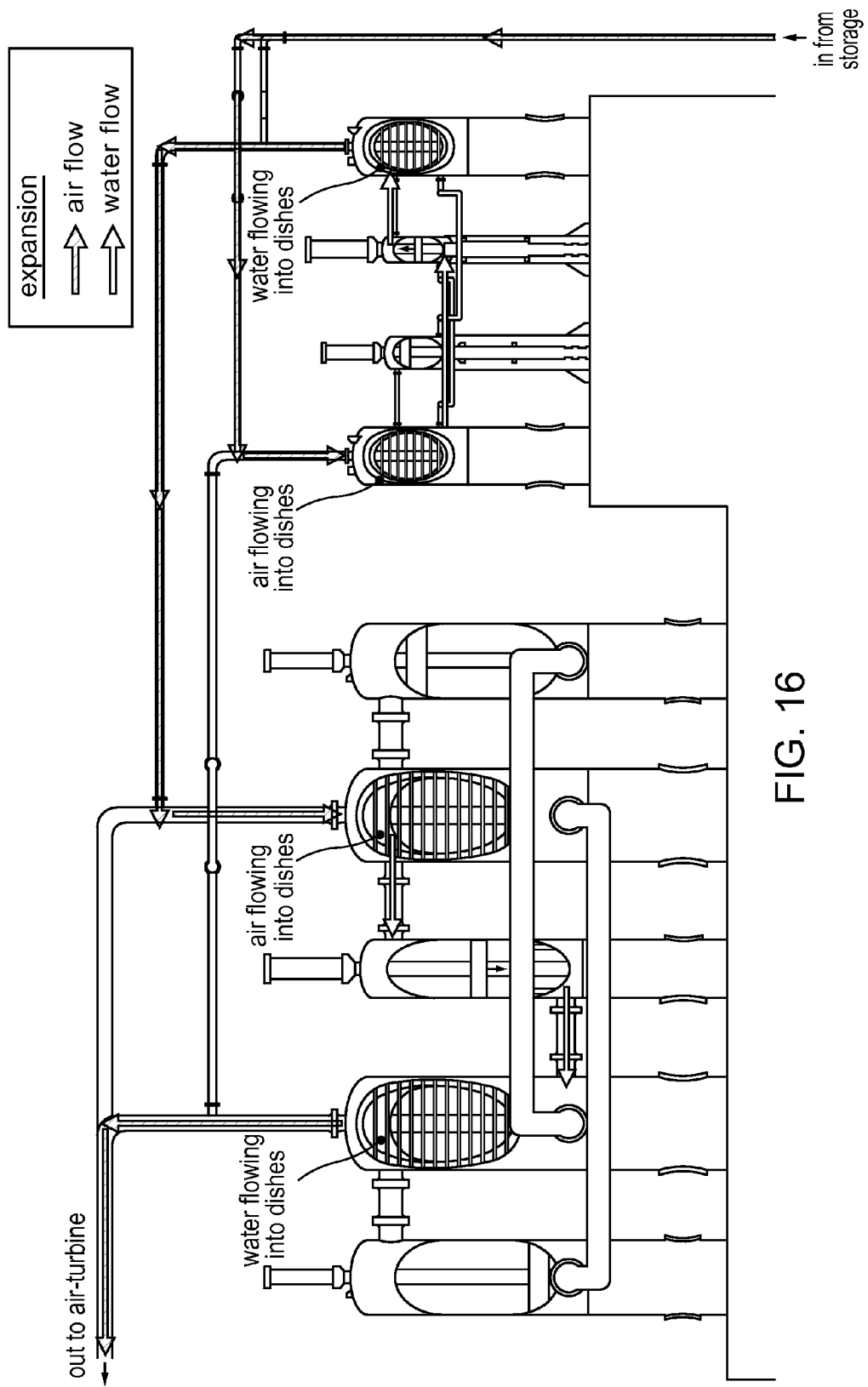
Figure 17:
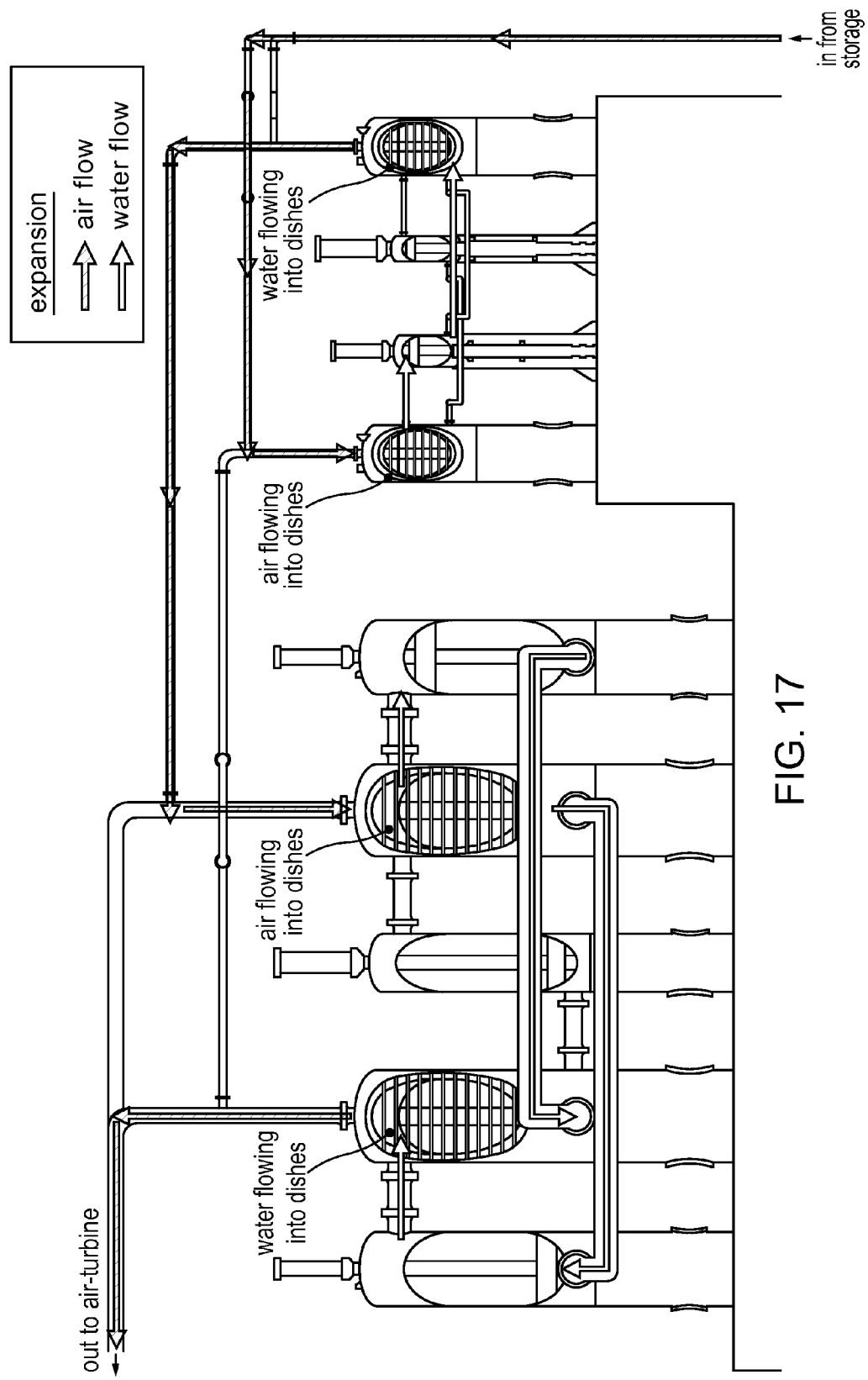
Figure 18:
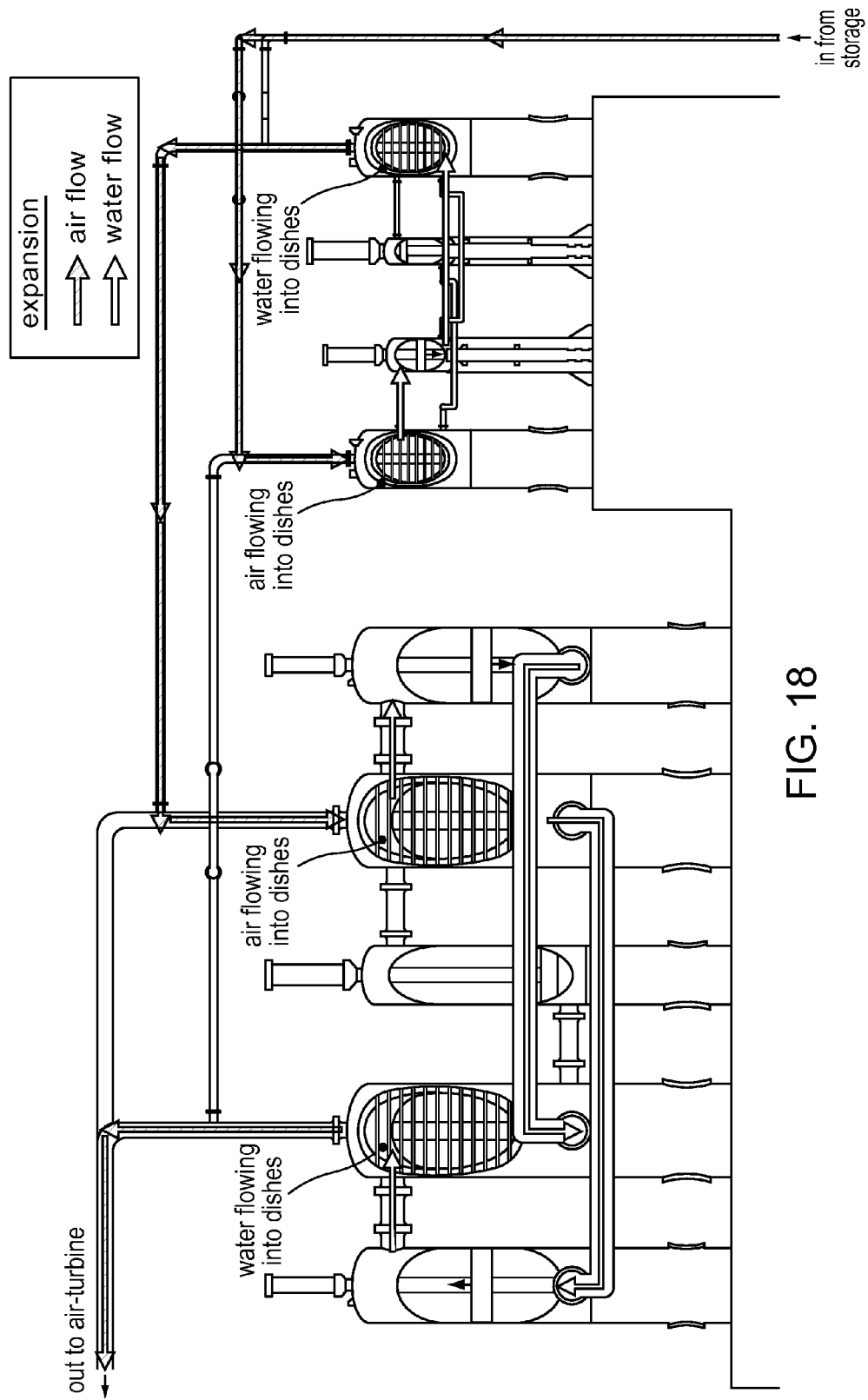
Figure 19:
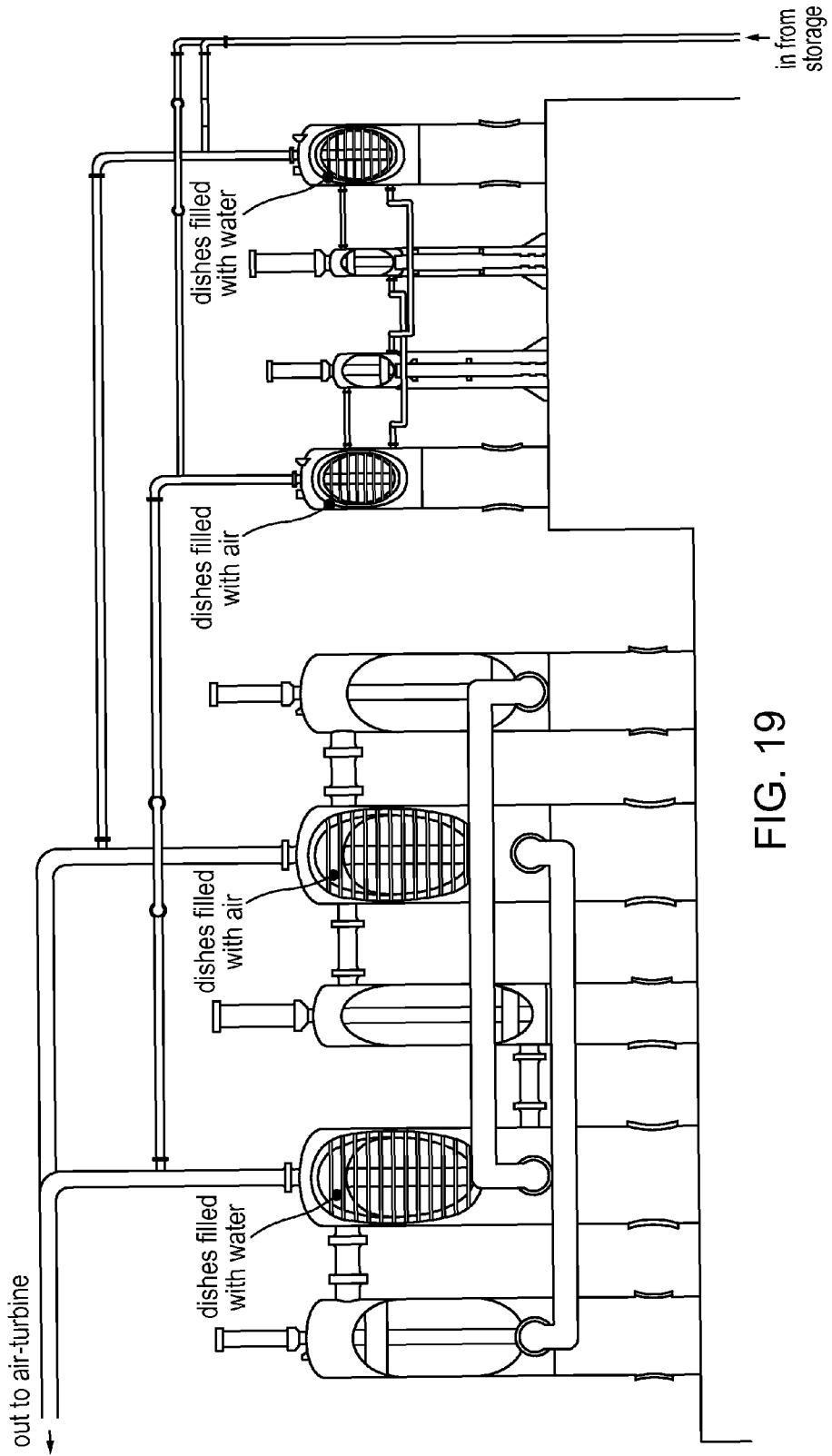
Figure 20:
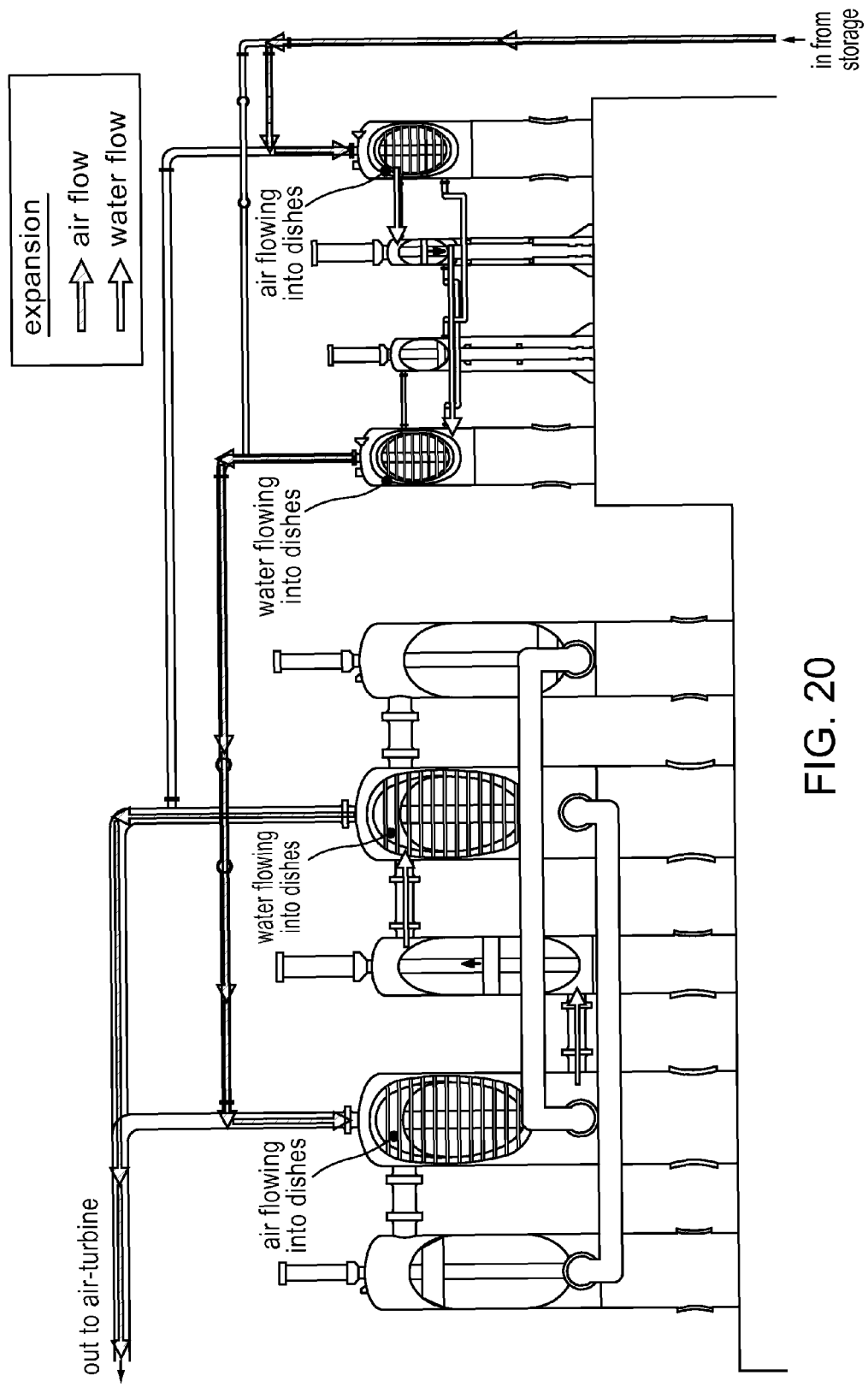
Figure 21:
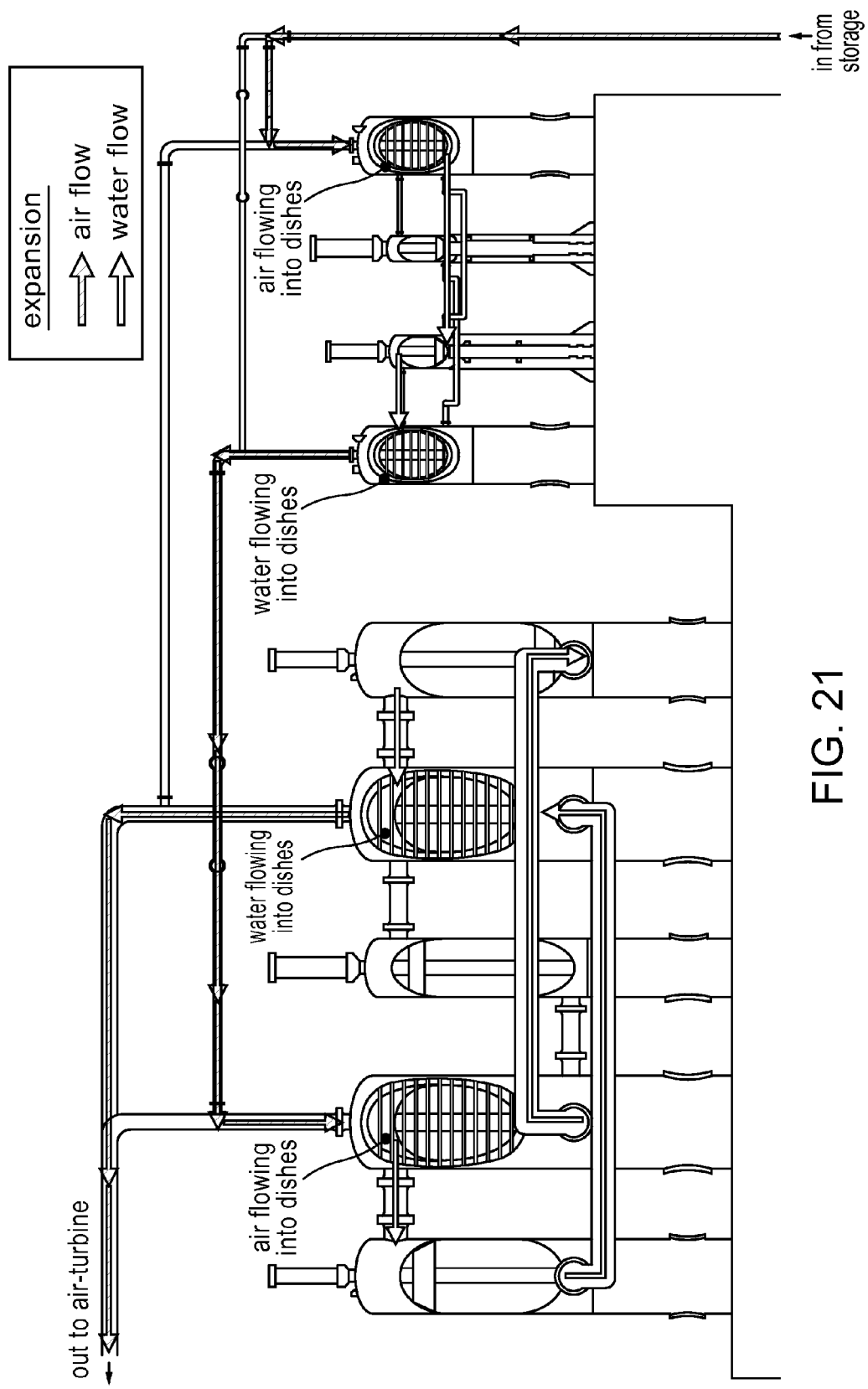
Figure 22:
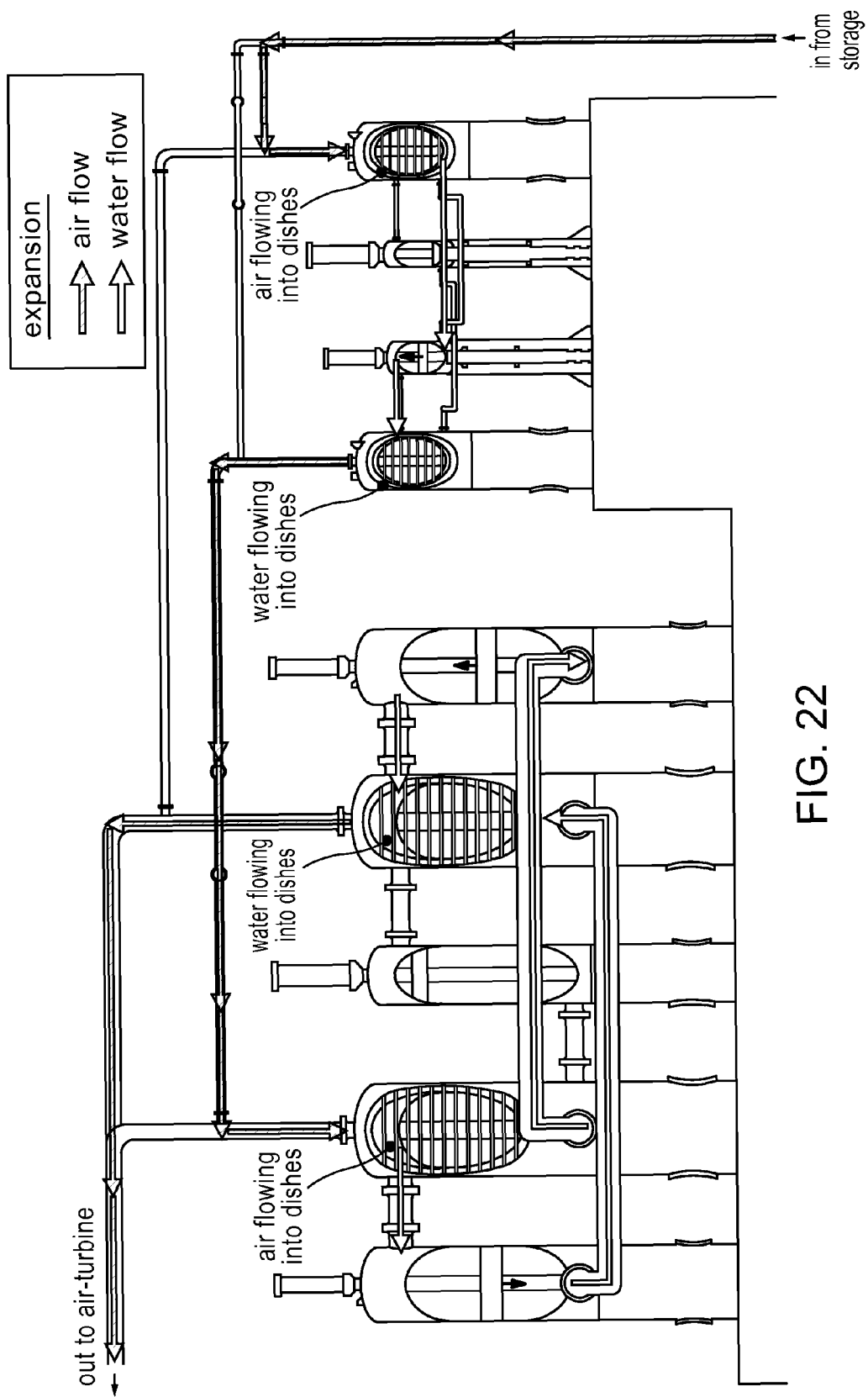

FIG. 15 illustrates a starting condition for an expansion cycle that includes receiving compressed air from the storage cavern within the second pressure vessel 464 of the second stage. FIGS. 16-18 and 20-22 illustrate the flow of water and air and the drive direction for the hydraulic cylinders at both stage one and stage two for the expansion cycles of the system. Similar to FIG. 11, FIG. 19 illustrates both an end of the cycle to expand air initially received in the second pressure vessel 464 and also a starting point for another cycle that includes expanding air initially received within the first pressure vessel 462 of stage two. One full cycle of the system 400 (FIGS. 15-19 or FIGS. 19-22) can be, for example, a total of 6 seconds. The system can cycle in the same manner as described above for compression, but in an opposite direction of flow for water and air.

Figure 23:
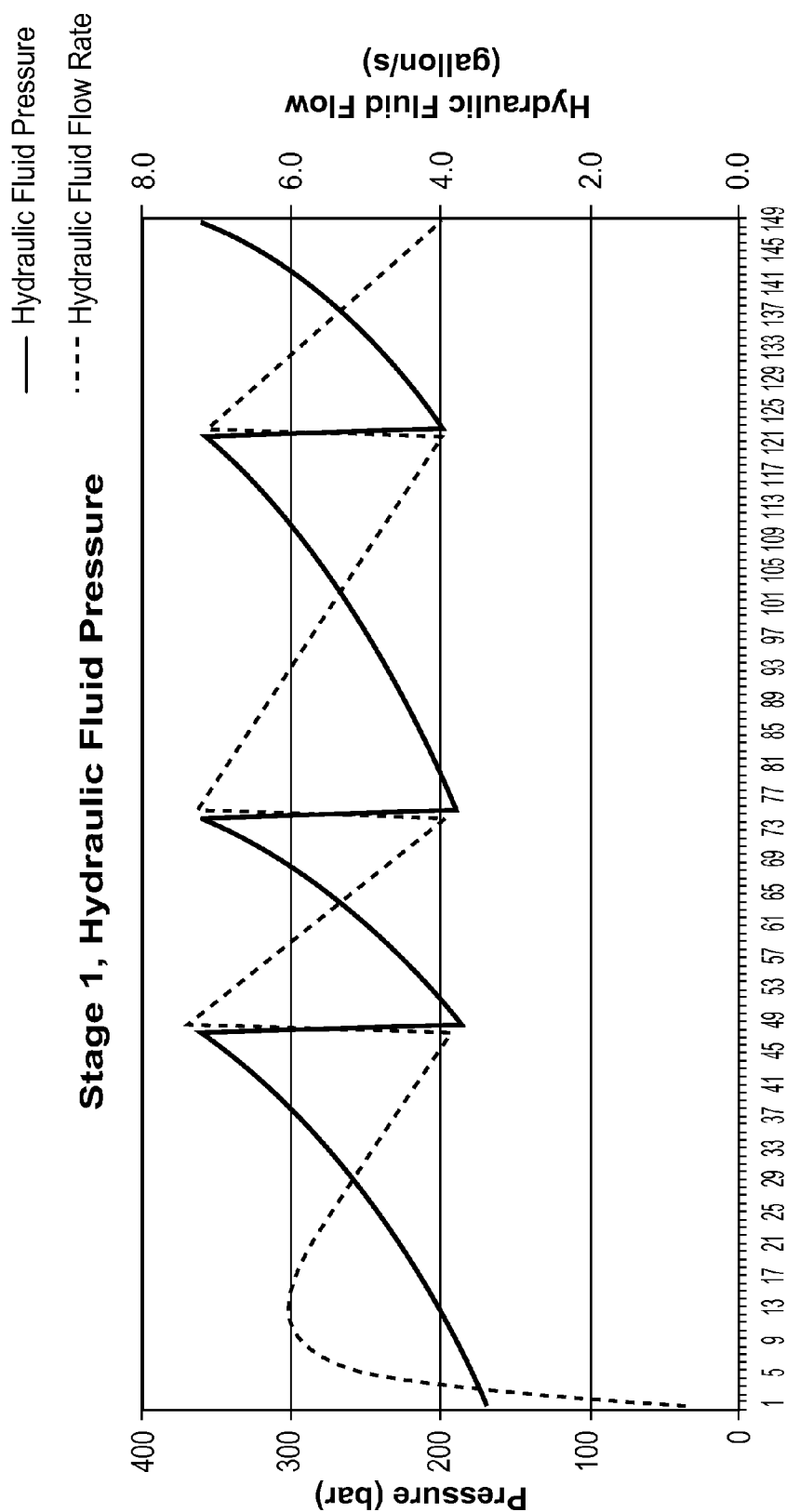
FIGS. 23-50 are each an example graph illustrating various parameters associated with the operation and output of a compression and expansion system according to various embodiments.
Figure 24:
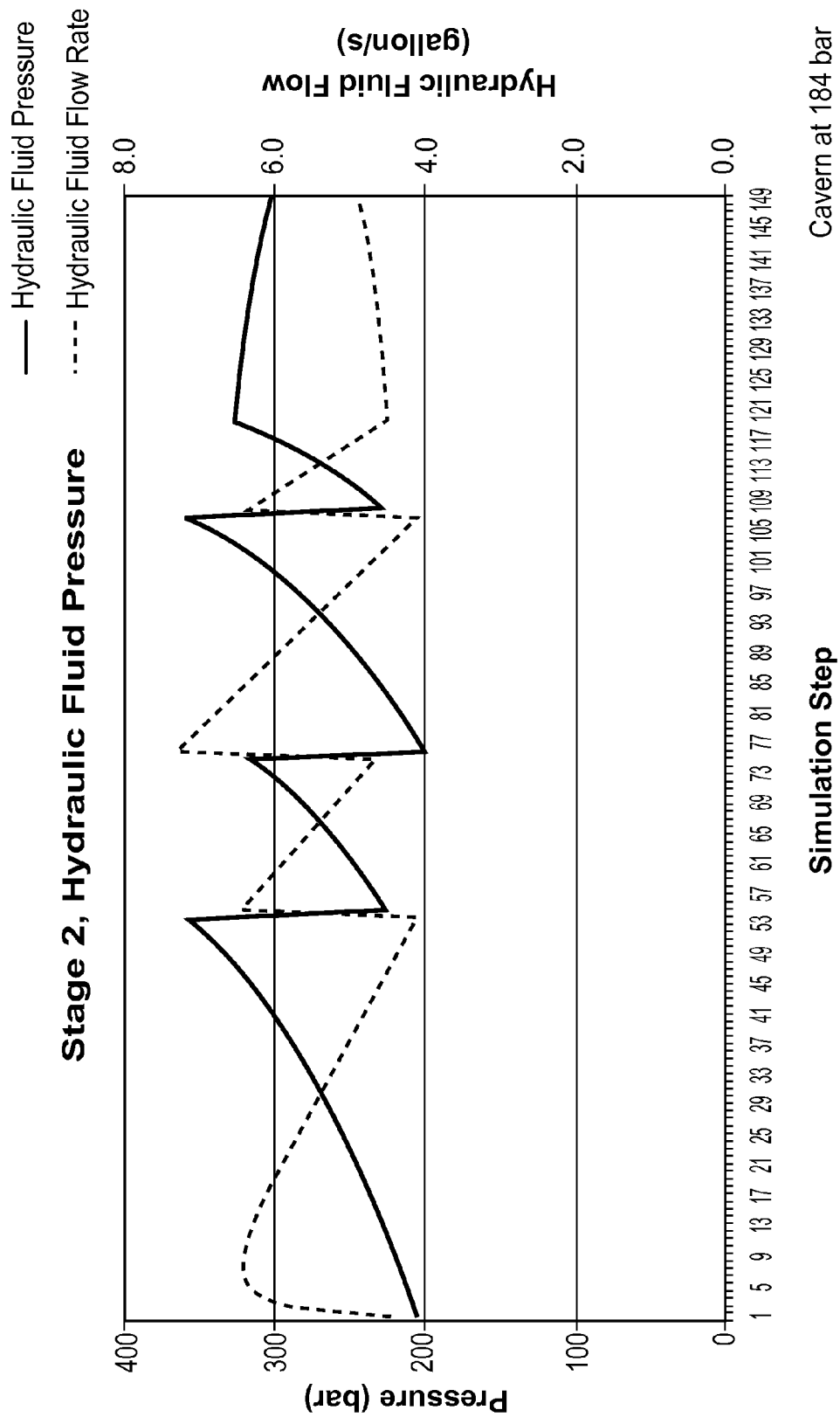

FIGS. 23-24 are example graphs illustrating the hydraulic fluid pressures and hydraulic fluid flow rates for one cycle (e.g., 6 seconds) of a system, such as system 400 configured to operate with a four gear sequence as described above, and configured to maintain compressed air within the storage cavern at 184 bar. FIG. 23 illustrates the hydraulic fluid pressures and fluid flow rates for stage one of the system and FIG. 24 illustrates the hydraulic fluid pressures and fluid flow rates for stage two of the system. The pressure and flow rate are shown for each of the four gear steps. These example charts illustrate gear shifts when the hydraulic fluid pressure reaches 360 bar. Immediately after each gear shift, the pressure drops to approximately 200 bar. It is understood that these pressures are examples only, and that other high and low pressure values may be selected. The values for high pressure and low pressure are selected according to the operating characteristics of the hydraulic pump/motor 414. Hydraulic pumps operate relatively efficiently when they operate within a pressure range dictated by the hydraulic pump. To effectively apply the system and method, the pressures at which gear shifts occur, are selected with respect to the pressures at which the hydraulic pump operates efficiently. Typically, a hydraulic pump's energy efficiency is most sensitive to its output pressure, which is why the system and methods carefully attend to fluid pressure, but other pump characteristics must also be simultaneously attended to; particularly the pump's maximum flow rate in terms of fluid volume per unit time. It should be noted that some hydraulic pumps may have other constraints, for example, minimum flow rates.

It should be noted that gear shift points may also be constrained by other embodiment details such as the maximum extension position of a hydraulic cylinder. It should also be noted that a hydraulic pump's operating characteristics usually interact, and changes in pressure usually also create changes in flow rate. FIGS. 23 and 24 show one example of a hydraulic fluid pumping scenario that corresponds to a hydraulic pump having a maximum hydraulic fluid flow rate of approximately 7.6 gallons per second (gps). In this example, four of the possible six gears are used. In this example, several of the gear shifts involve pressure changing from 360 bar to about 200 bar, and in this example the pressure change is accompanied by a substantially simultaneous drop in fluid flow rate, to approximately 4.0 gps. The product of hydraulic fluid pressure and hydraulic fluid flow rate is power, and this example shows a pressure and flow scenario that maintains an approximately constant power value during operation of the pump system. Constant power is one method for selecting the relationship between output pressure and output flow rate. It is understood that other embodiments may choose to vary pressure and flow in a fashion that results in a power that is something other than constant.

Figure 25:
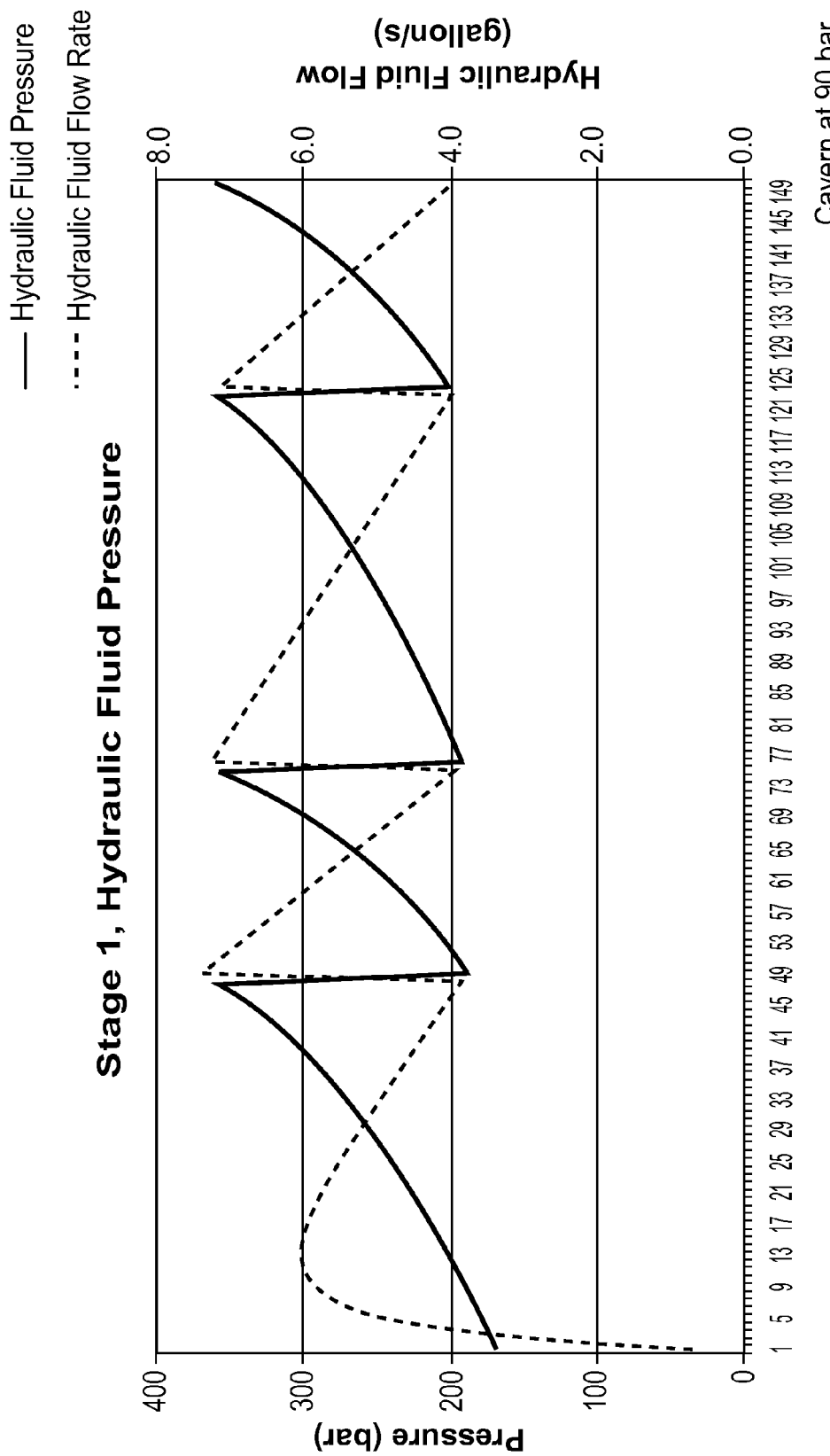
Figure 26:
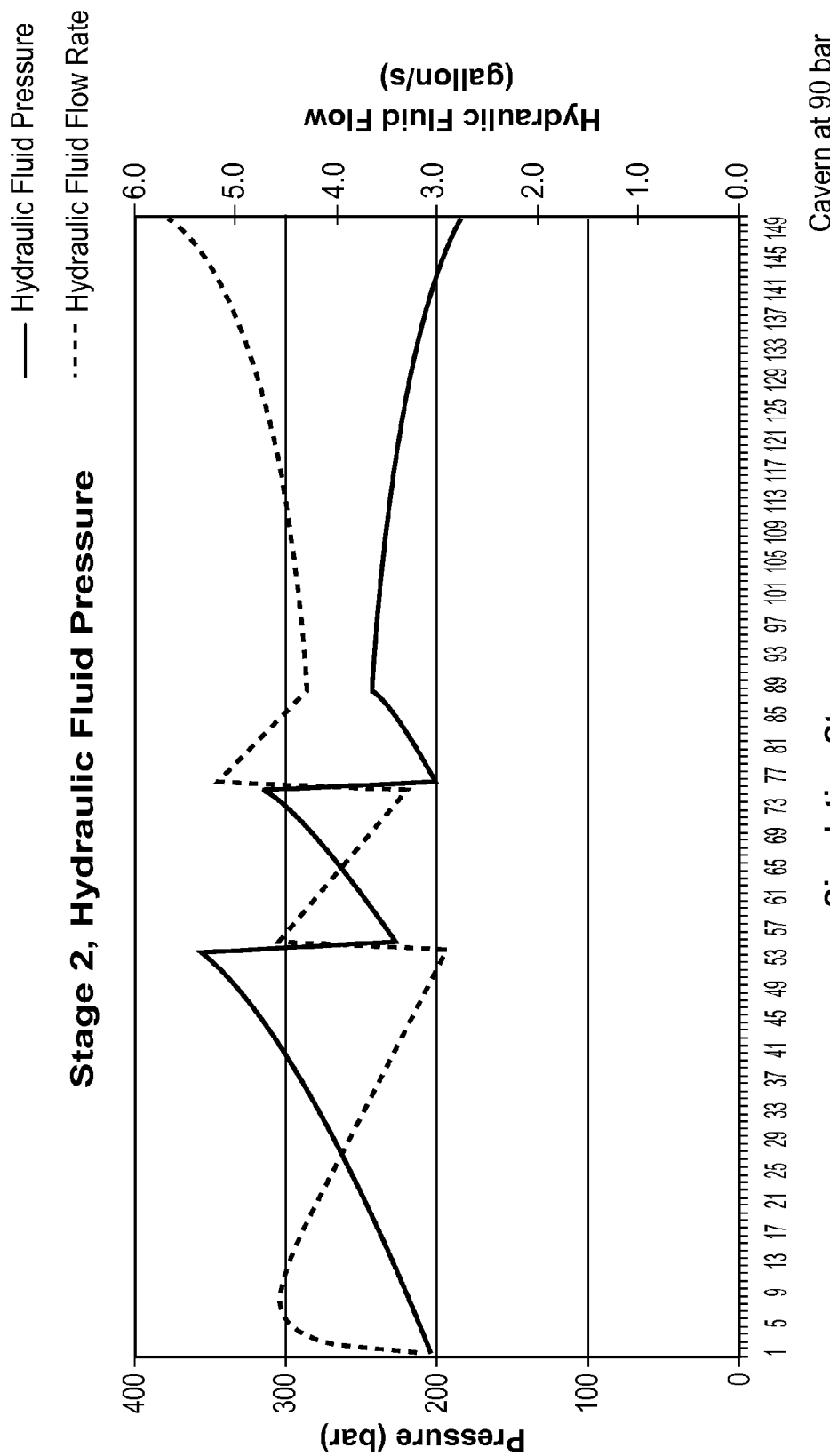

FIGS. 25-26 are example graphs illustrating the hydraulic fluid pressures and hydraulic fluid flow rates for one cycle of a system, such as system 400. The configuration of the system is such that the stage one operates using a four gear sequence as described above. FIG. 26 depicts a scenario in which stage two compresses air, and when the compressed air pressure substantially equals the air pressure in the storage cavern, the compressed air is pumped into a storage cavern currently at 90 bar. FIG. 25 illustrates the pressures and fluid flow rates for stage one of the system, and FIG. 26 illustrates the pressures and fluid flow rates for stage two of the system, and depicts how, in this scenario, the preferred gear shift sequence uses three of the possible six gears. The pressure and flow rate are shown for each of the four stage one gear steps, and for each of the three stage two gear steps. These example charts illustrate gear shifts occurring at points dictated by constraints other than hydraulic pump maximum pressure. For example, FIG. 26 shows a gear shift that occurs at a pressure of about 310 bar, which is less than the 360 bar maximum. This gear shift occurred because the first water pump reached the end of its stroke before the maximum hydraulic fluid pressure of 360 bar was called for. Further, the hydraulic fluid pressure during the operation of the second water pump remains below about 250 bar throughout the stroke of the second water pump. This is because the hydraulic fluid pressure called for to operate against the cavern's current pressure, using the highest gear available in the second water pump, is lower than the maximum hydraulic pump pressure. Importantly, the hydraulic fluid pressure remains within the hydraulic pump's efficient output pressure range, which in this example is between 120 bar and 360 bar. It is understood that the method may be applied using pressure ranges different from 120 bar to 360 bar.

Figure 27:
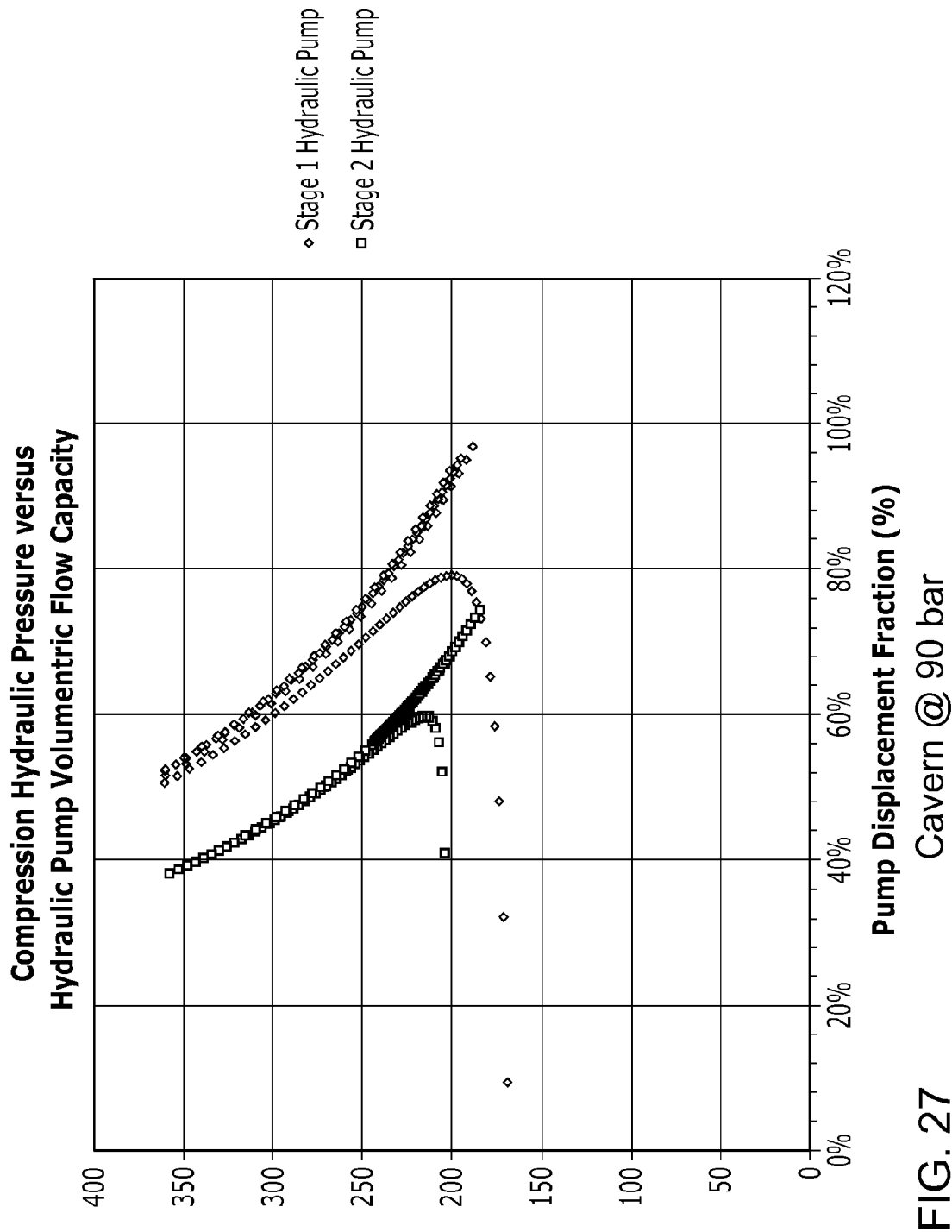
Figure 28:
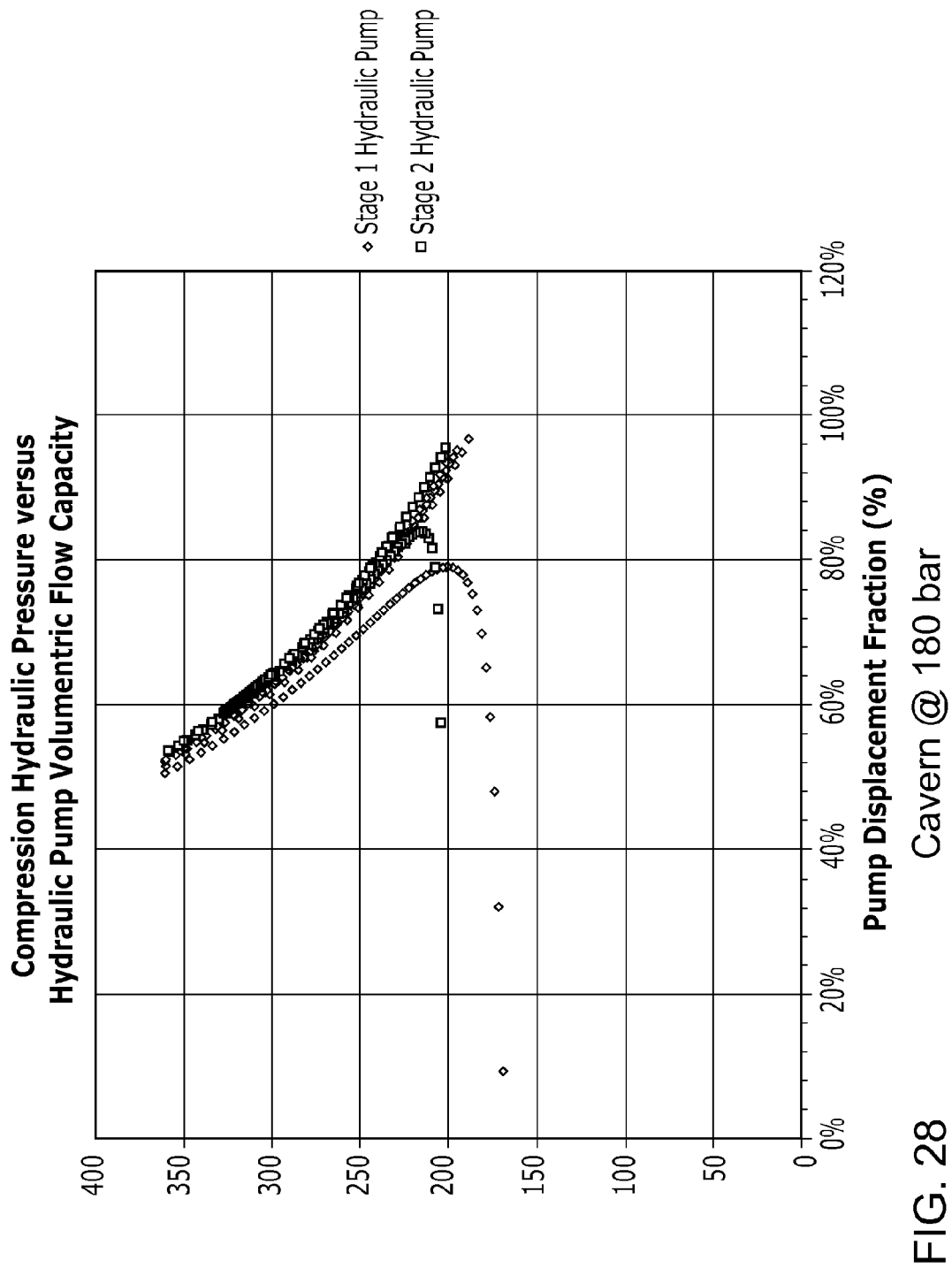

FIGS. 27 and 28 are example graphs illustrating hydraulic pressure versus hydraulic pump volumetric flow capacity, for stage one and stage two for a system compressing air into a storage cavern at 90 bar and 180 bar, respectively.

Figure 29:
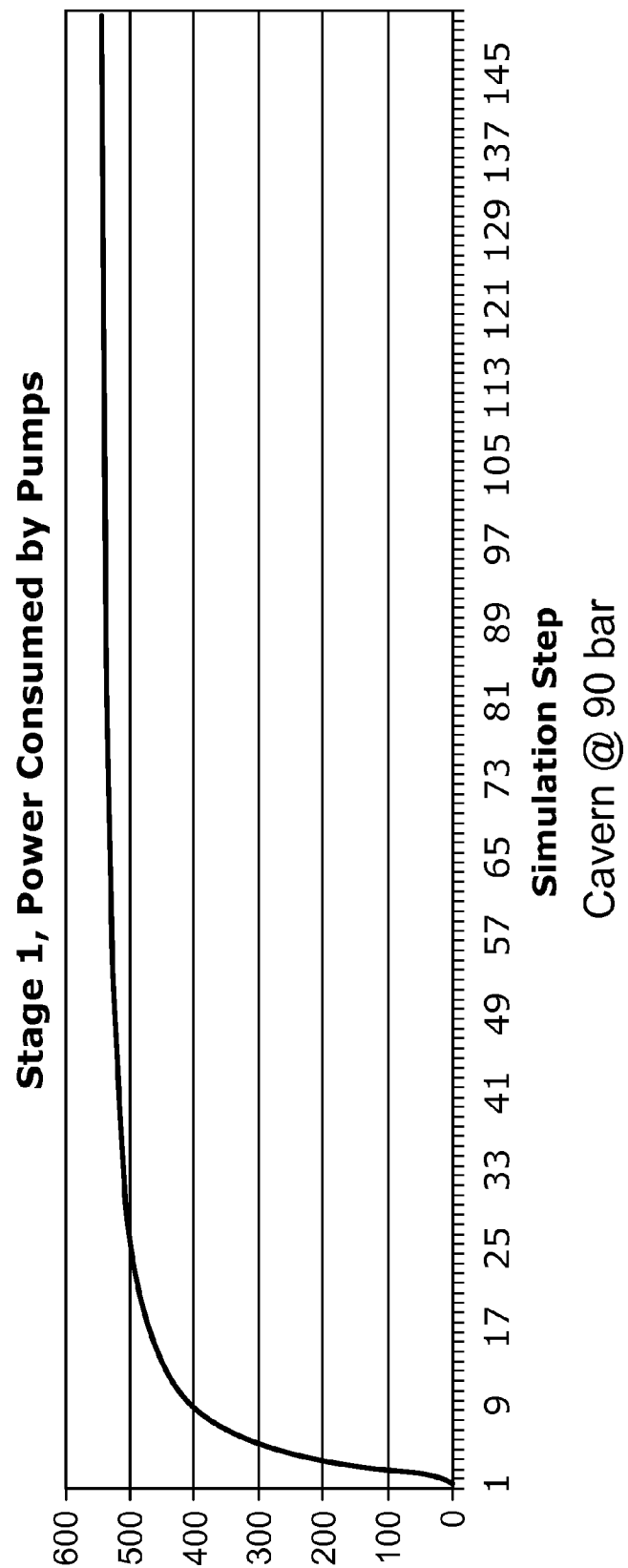
Figure 30:
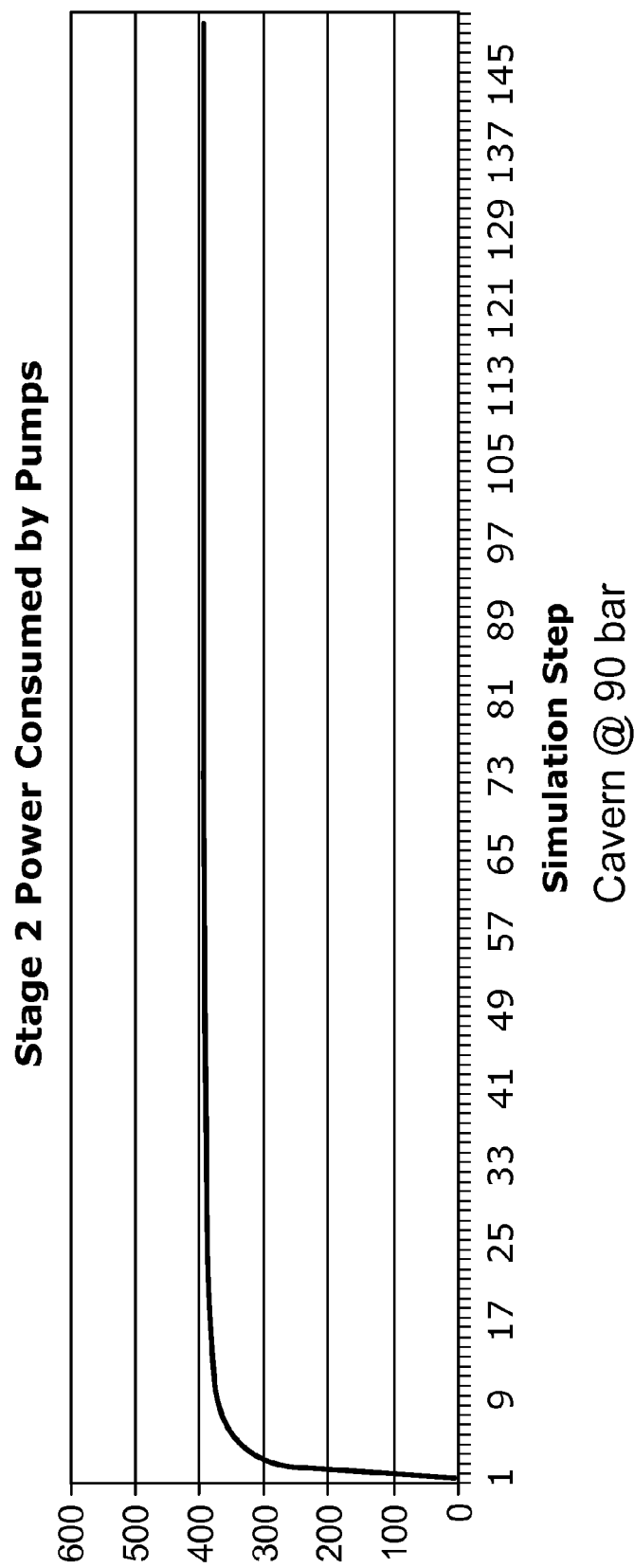
Figure 31:
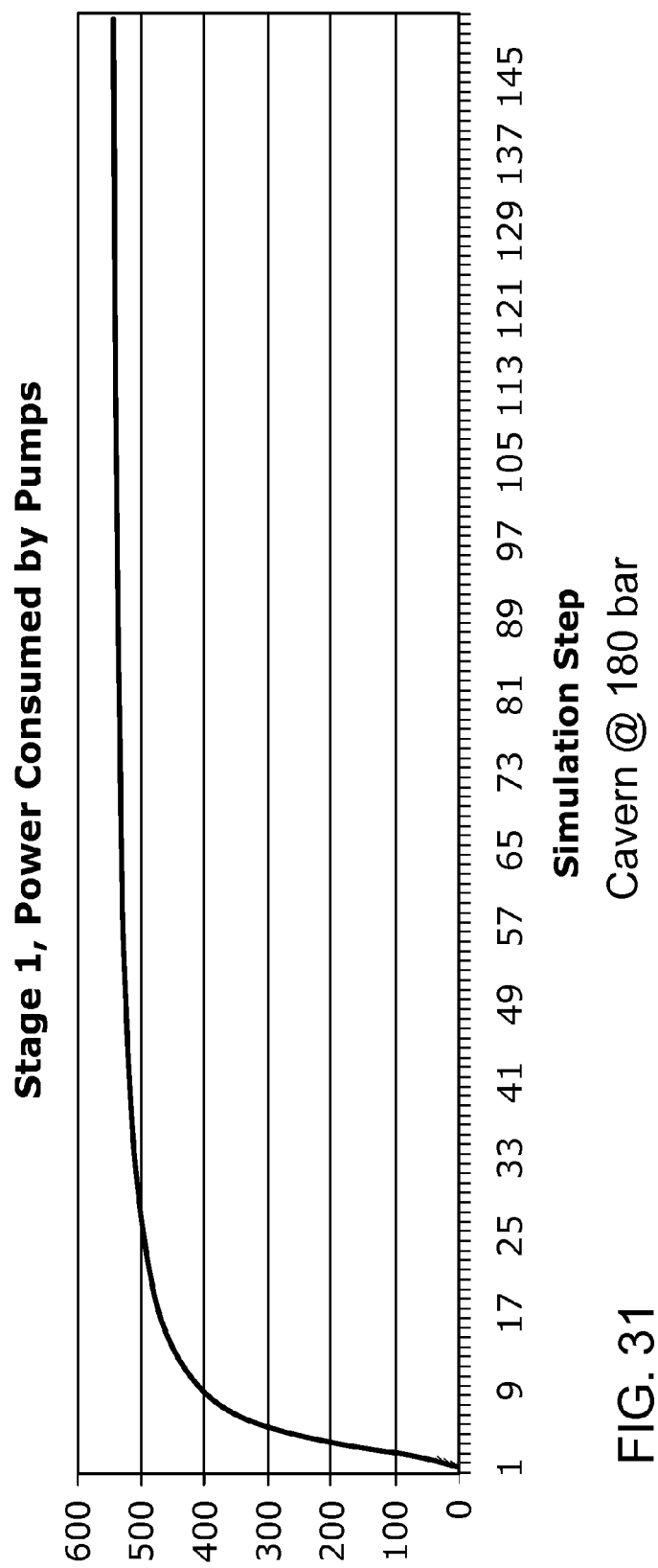
Figure 32:
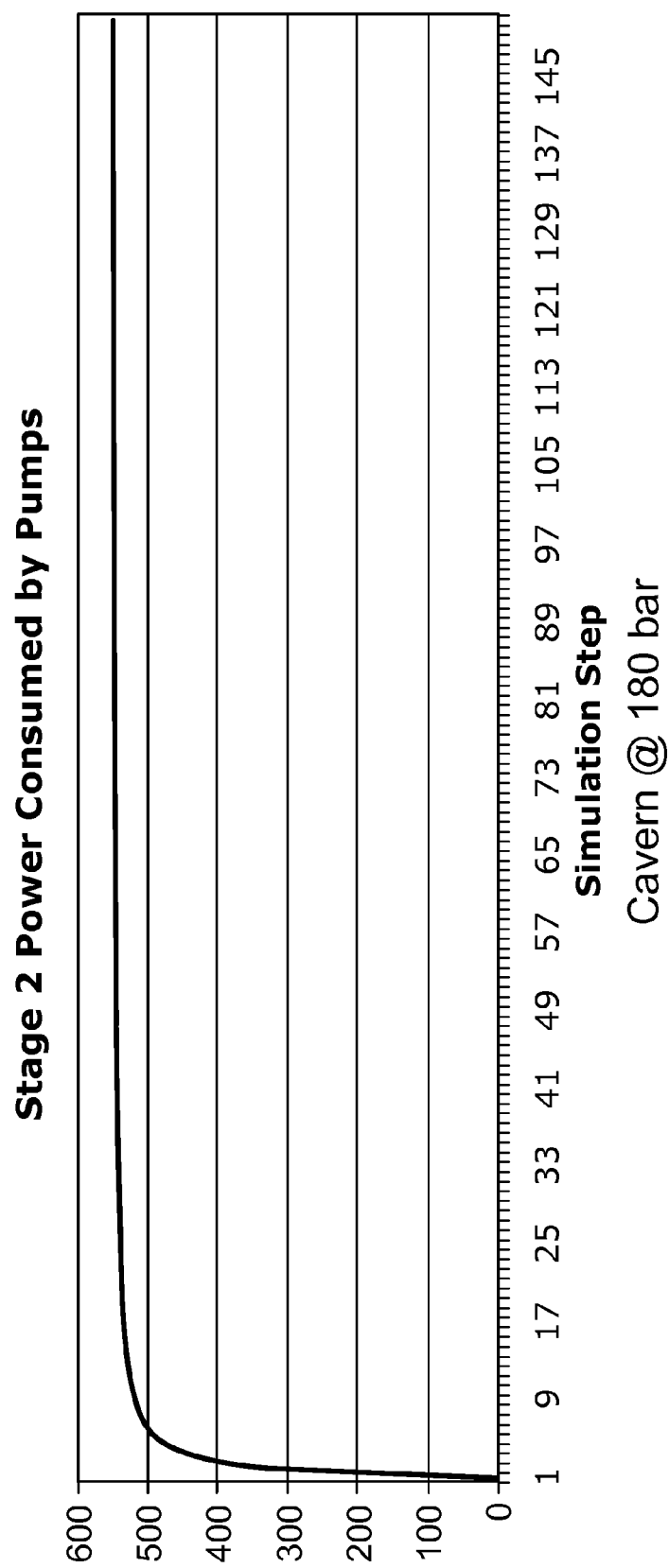

FIGS. 29 and 30 are example graphs illustrating the power consumption of the hydraulic pumps used in a system, such as system 400 compressing air into a storage cavern currently at 90 bar. FIG. 29 illustrates the power consumption for stage one, and FIG. 30 illustrates the power consumption for stage two. FIGS. 31 and 32 are example graphs illustrating the power consumption of the hydraulic pumps used in a system, such as system 400 compressing air into a storage cavern currently at 180 bar. FIG. 31 illustrates the power consumption for stage one, and FIG. 32 illustrates the power consumption for stage two. As noted above, this example is one in which the power consumed by the pump (which is proportional to the hydraulic power produced by the pump) is maintained at an approximately constant level during operation of the system.

Figure 34:
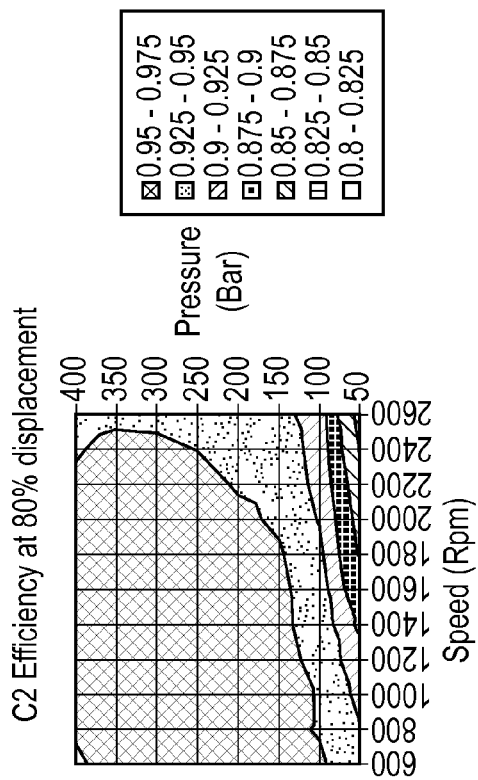
Figure 33:
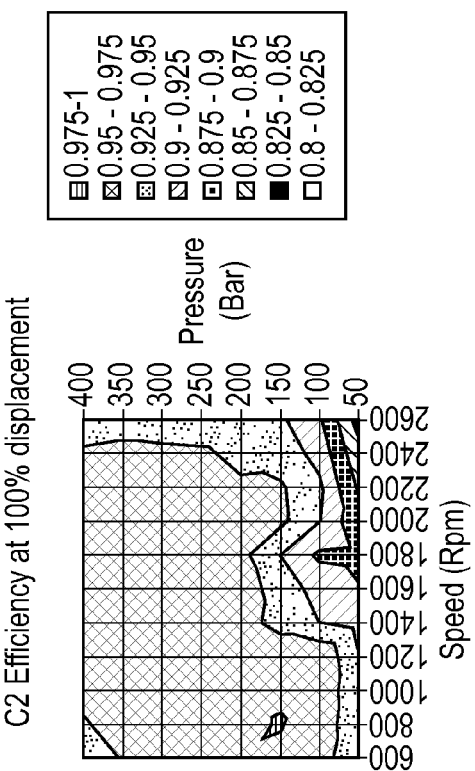
Figure 36:
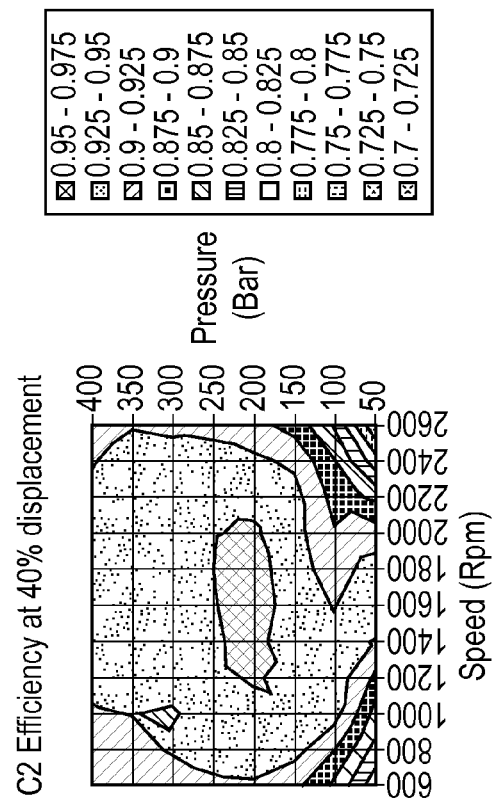
Figure 35:
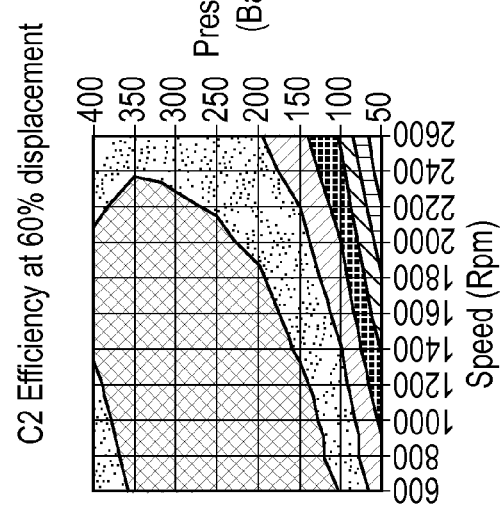
Figure 37:
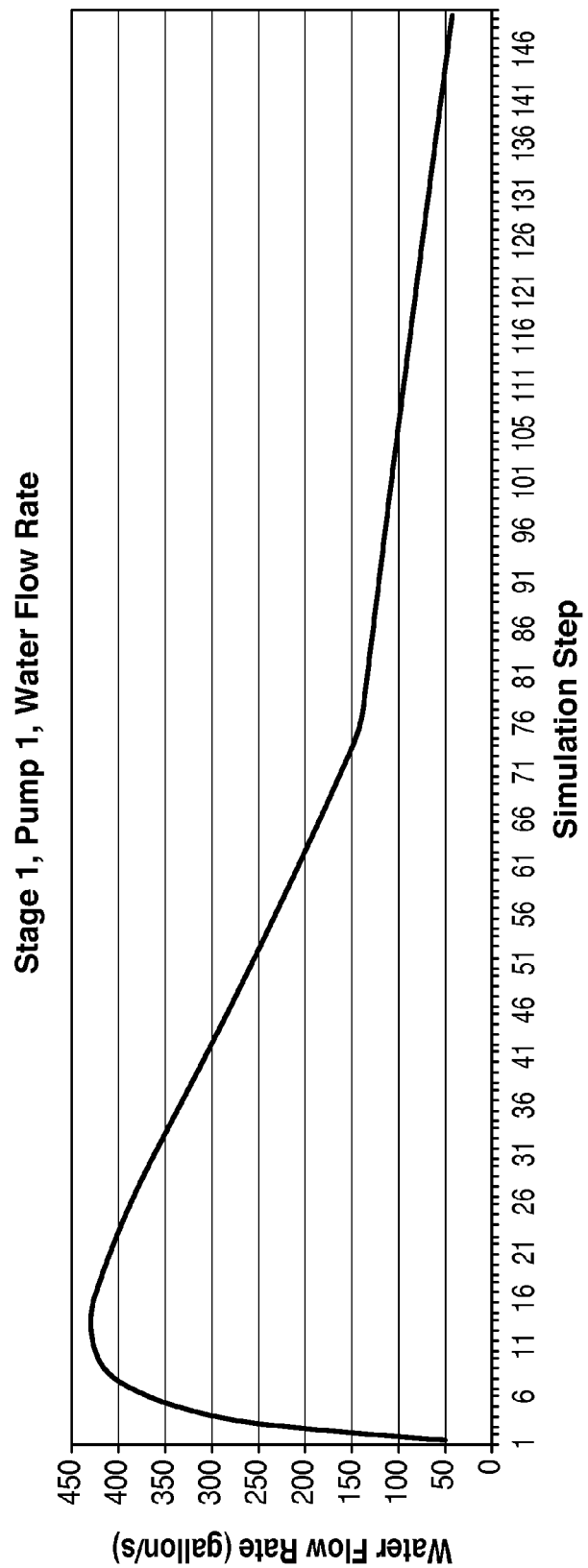
Figure 38:
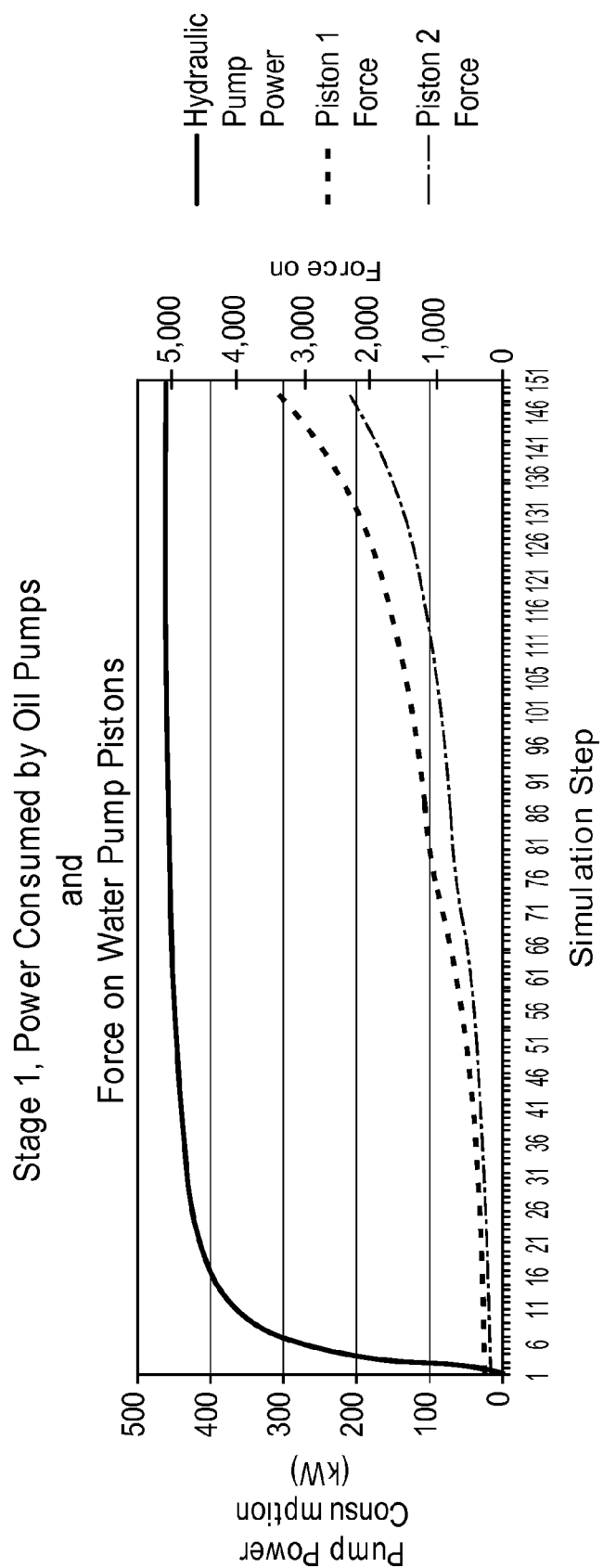
Figure 39:
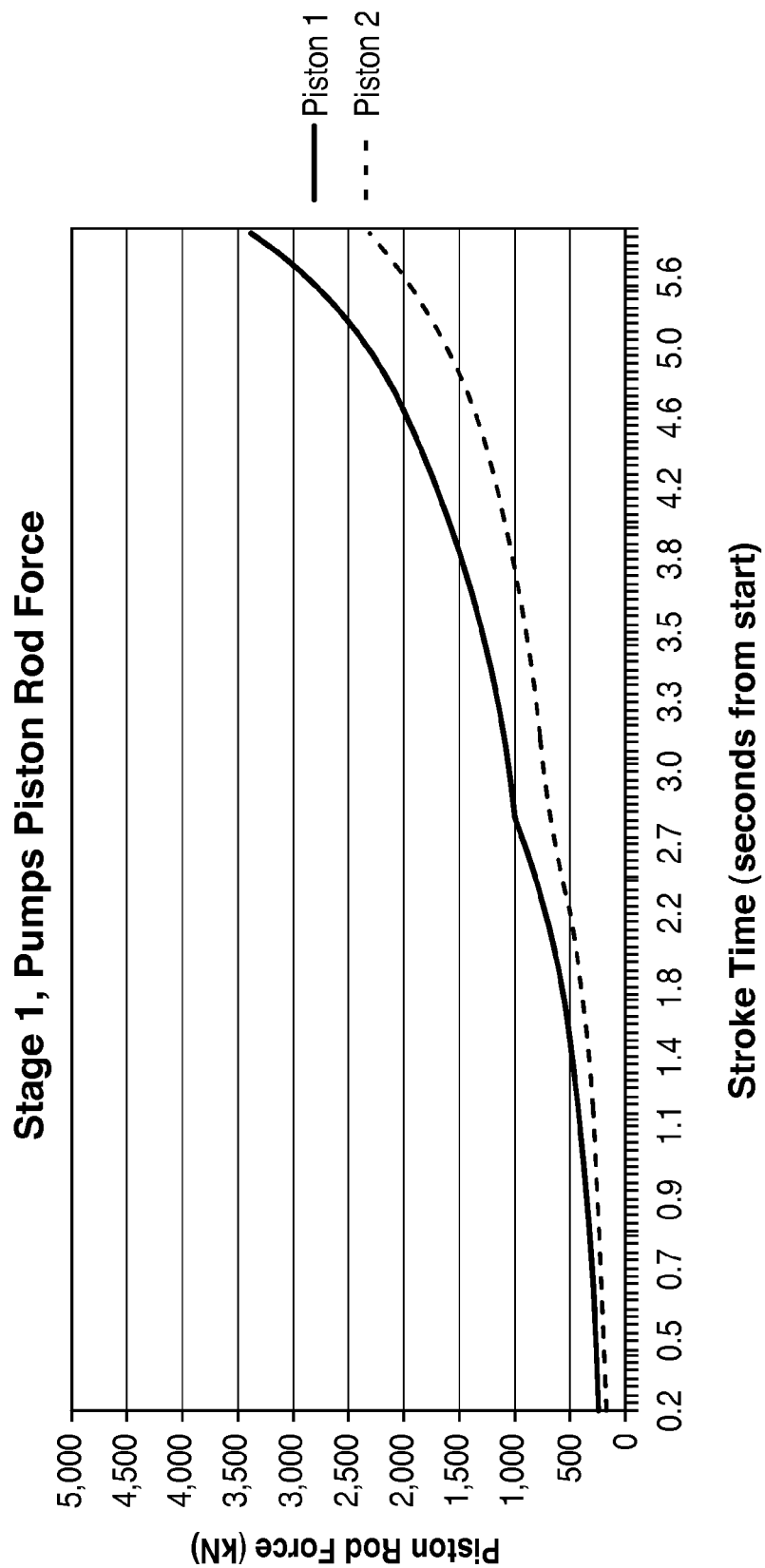
Figure 40:
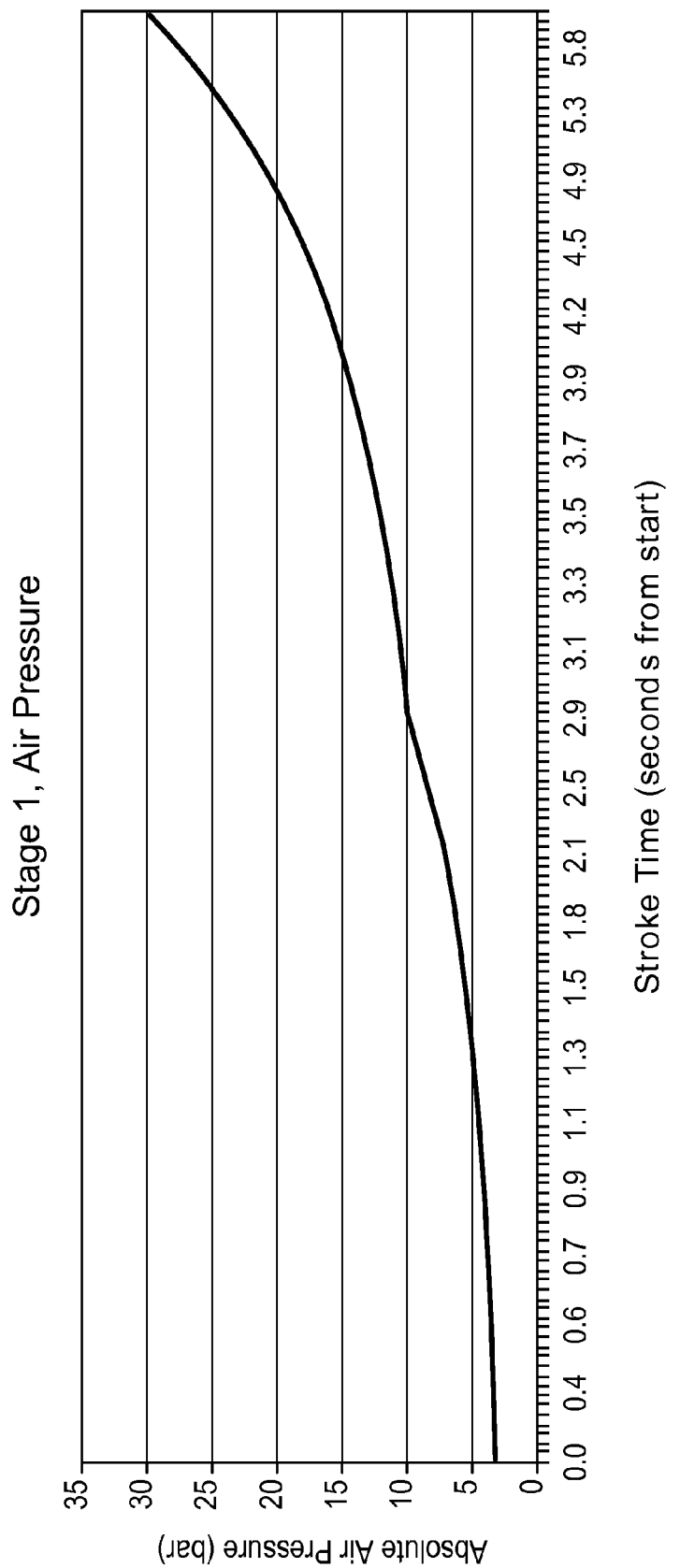
Figure 41:
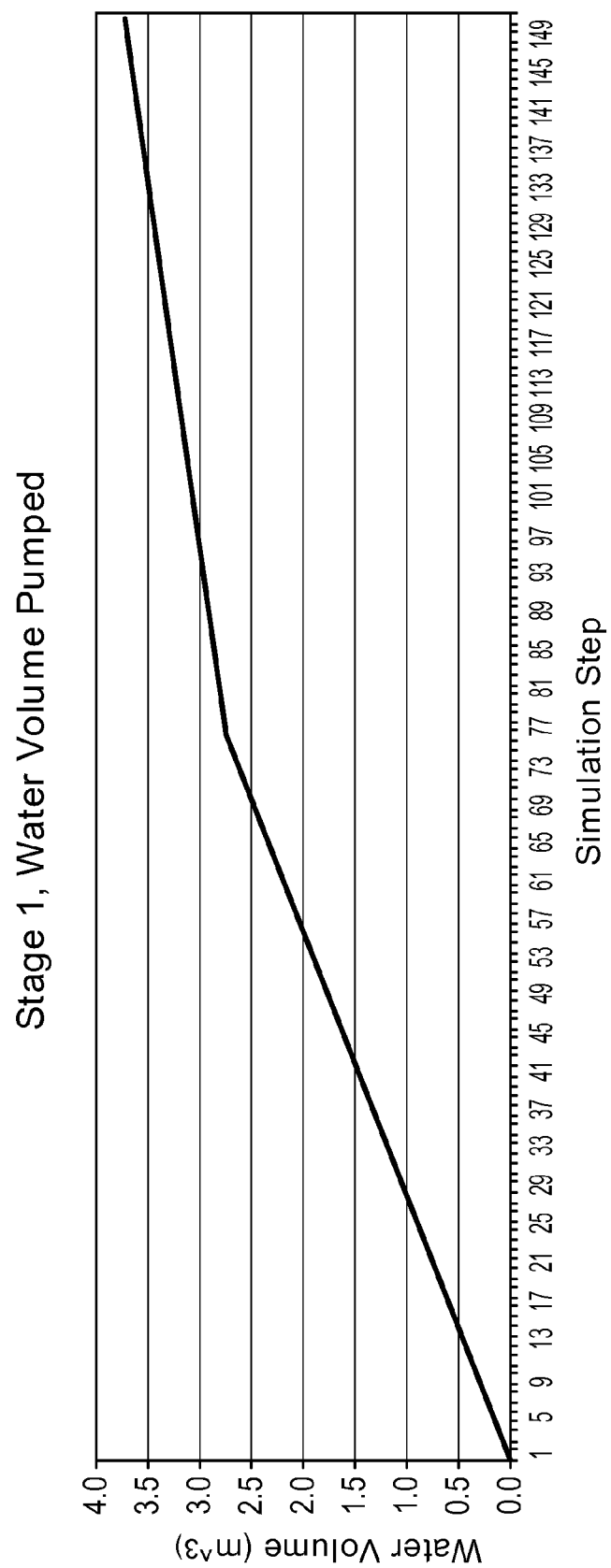
Figure 42:
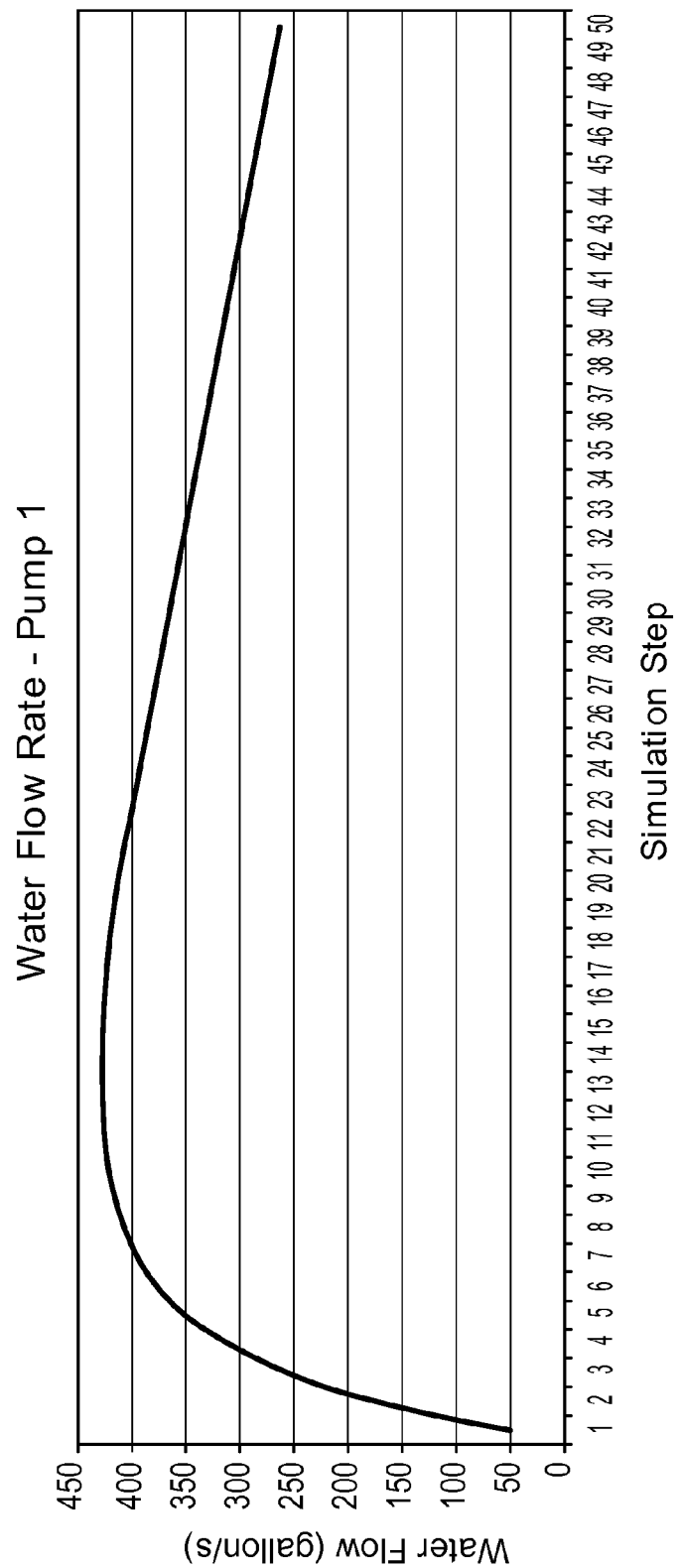
Figure 43:
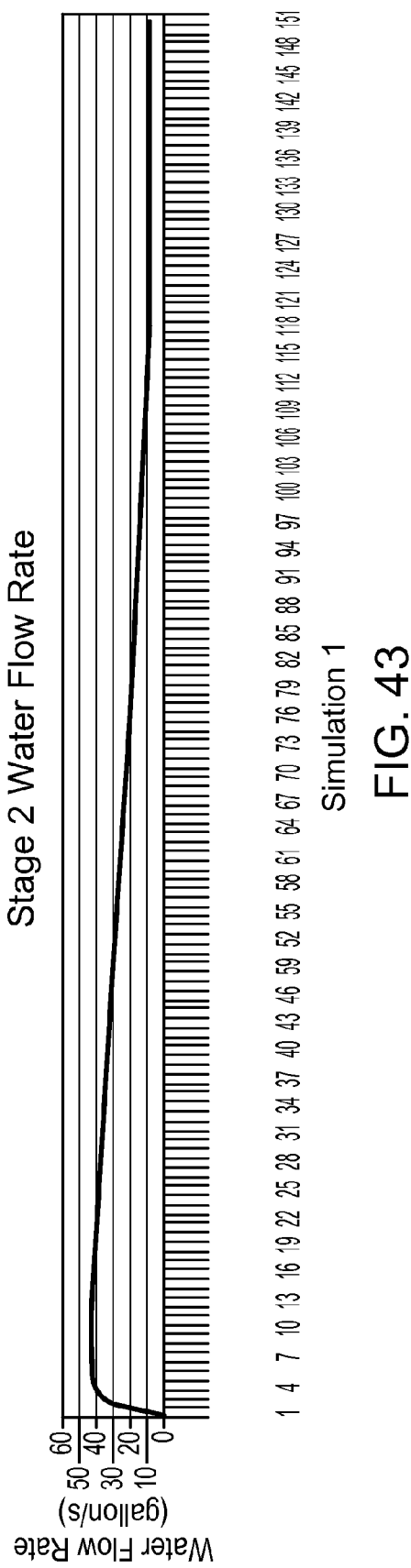
Figure 44:
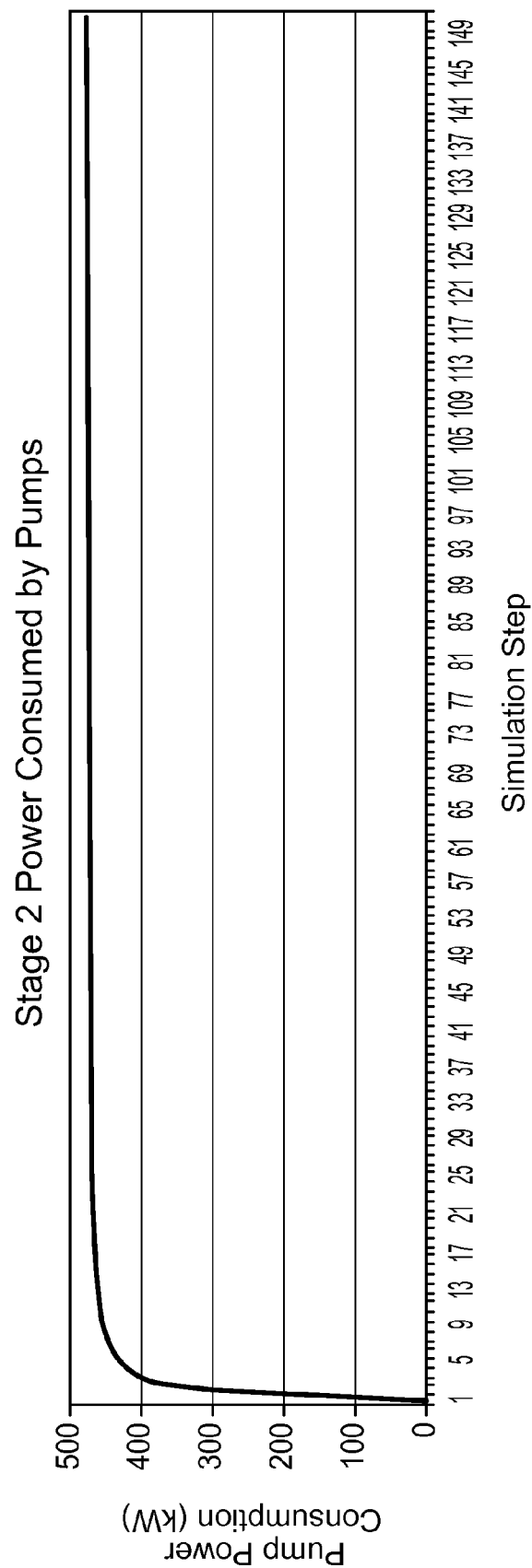
Figure 45:
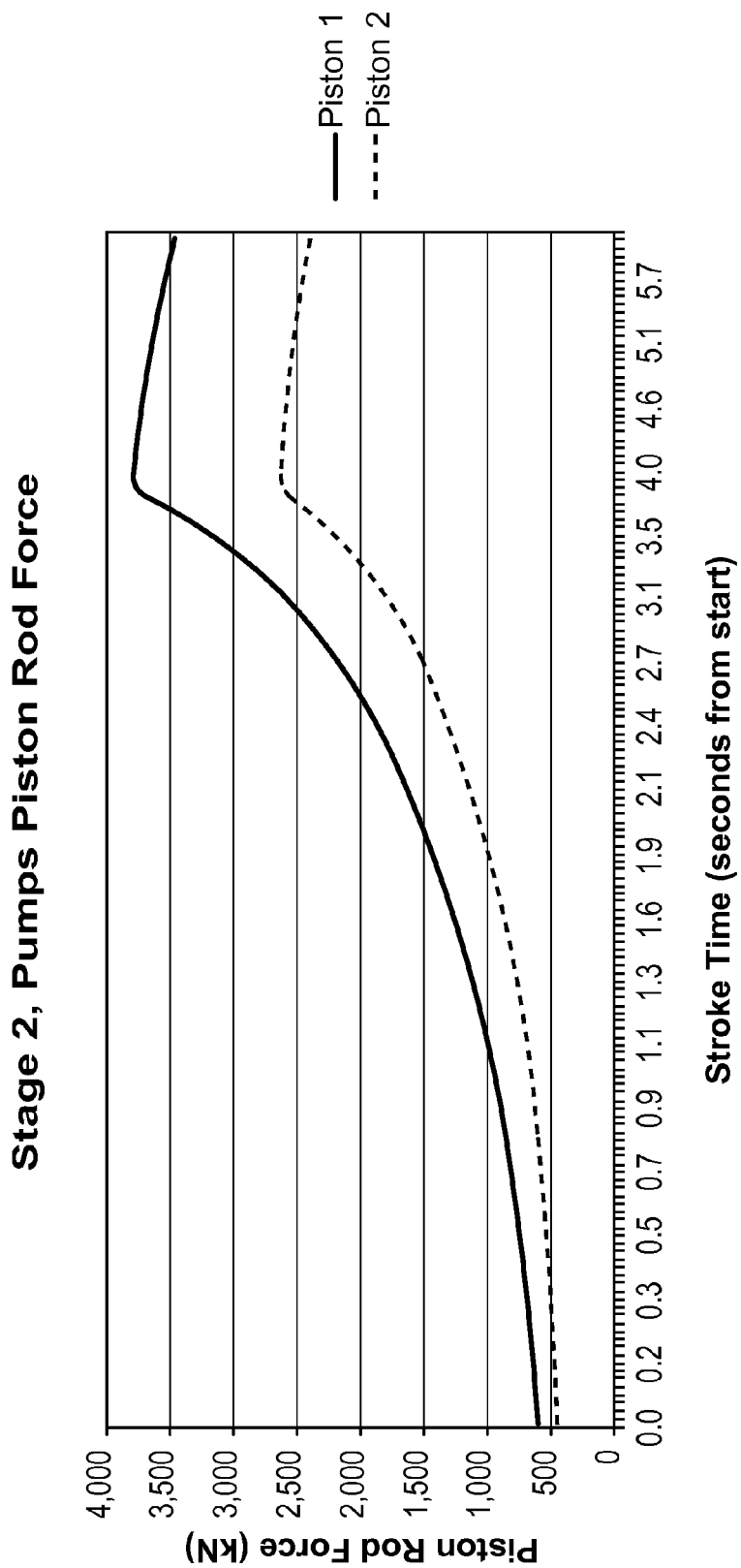
Figure 46:
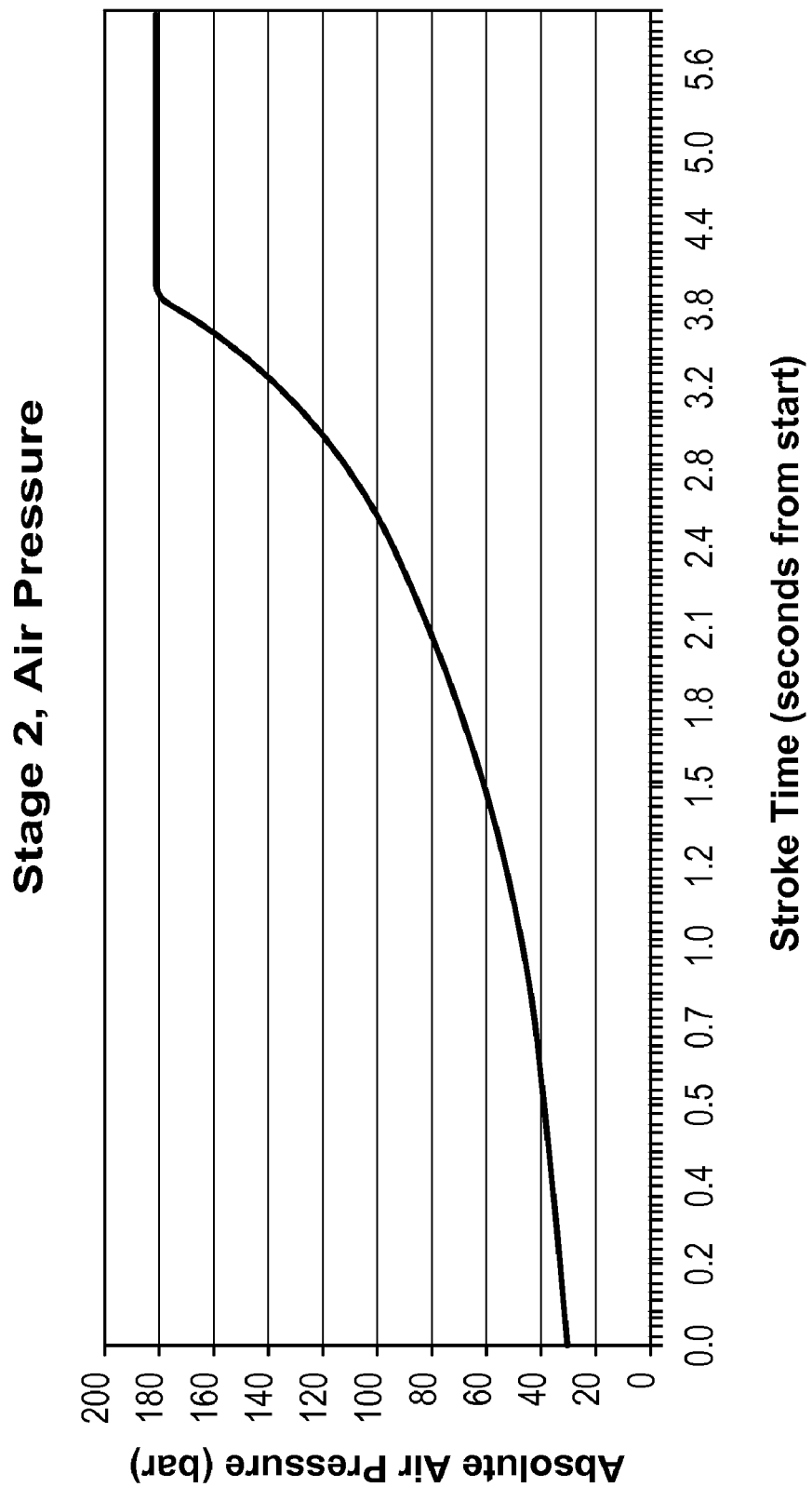
Figure 47:
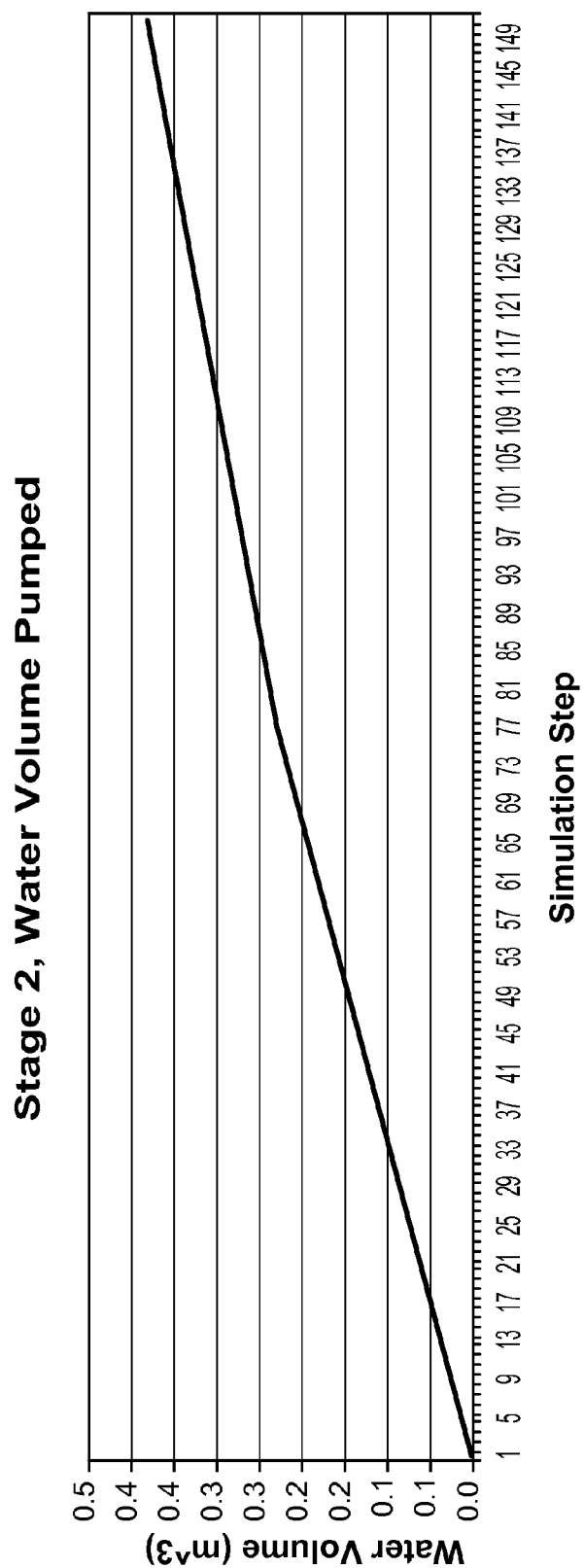

FIGS. 33-36 are example maps of the efficiency levels of the hydraulic pumps/motors used in a system, such as system 400, when operated as hydraulic pumps at various pressures and speeds. The map is demarked into zones that depict the energy efficiency available for the hydraulic pumps. The systems and methods of operating the systems described herein can be configured to operate the hydraulic pump within the highest efficiency zone throughout the entire compression cycle. The efficiencies are determined based on a percentage of maximum volumetric displacement of the pump (which, for the pump used in the examples described above, can be selectively varied). For example, FIG. 33 illustrates efficiency based on 100% displacement for a flow rate of 7.6 gal./sec. FIG. 34 illustrates an efficiency based on 80% displacement, which means that the system is operating with a flow rate at 80% of the 7.6 gal./sec. (i.e., 6.0 gal./sec.). FIGS. 35 and 36 are similarly determined based on a 100% displacement at 7.6 gal./sec.

Figure 48:
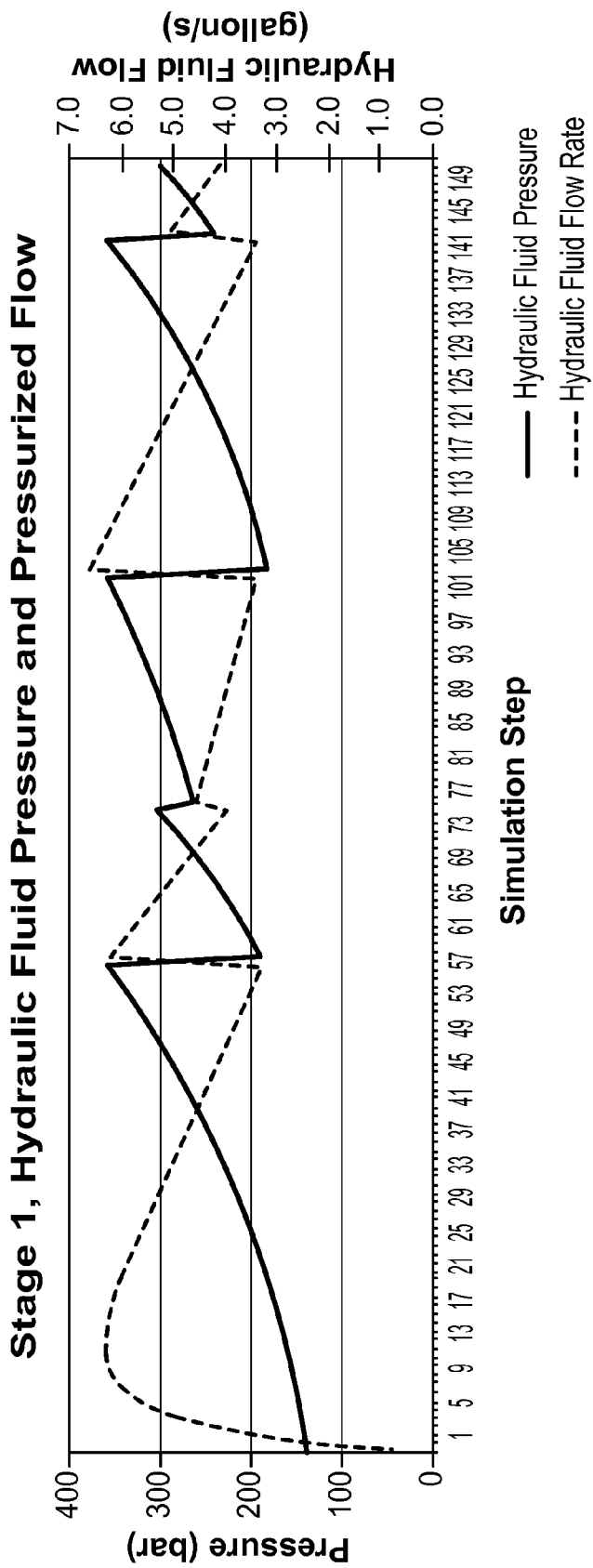
Figure 49:
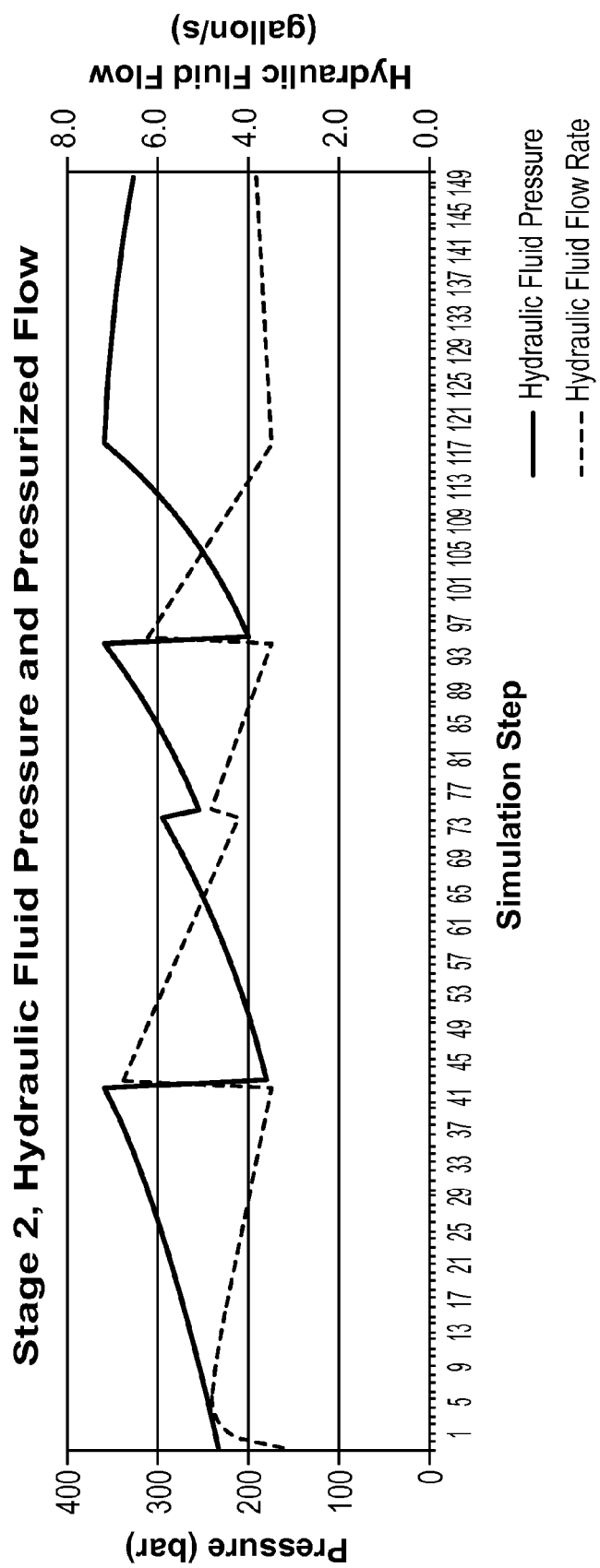
Figure 50:
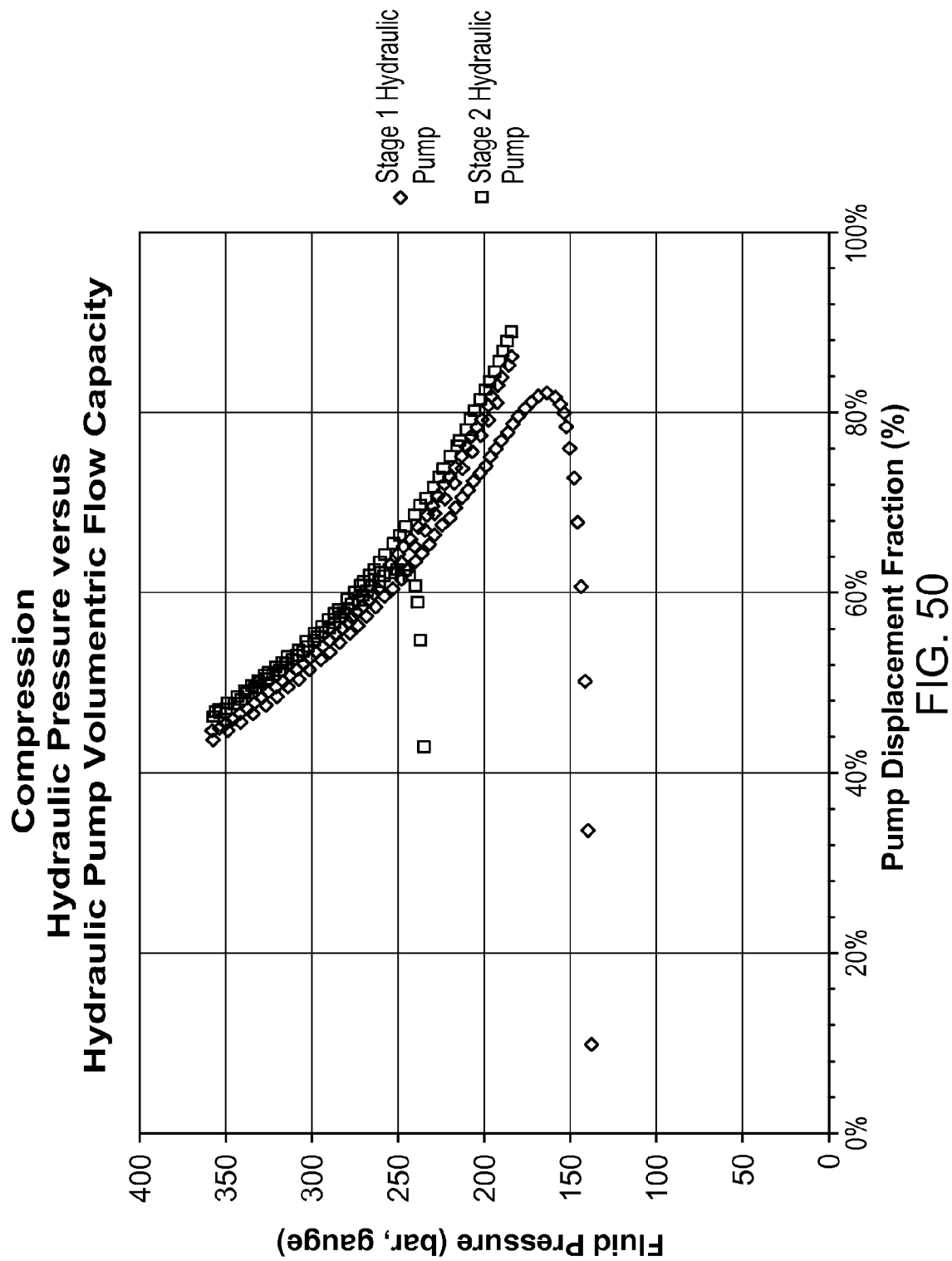

FIGS. 37-50 are example graphs illustrating various parameters of a system, such as system 400, operating with a storage cavern pressure at 180 bar. FIGS. 37-42 illustrate various parameters associated with stage one, and FIGS. 43-47 illustrate various parameters associated with stage two. FIGS. 48 and 49 illustrate an example of how the associated pressures and flow rates during gear shifts throughout a cycle for an embodiment of a stage one and stage two change when using a different configuration of hydraulic cylinder piston surfaces areas. The nature of pressure and flow changes are seen by comparing FIGS. 48-49 with FIGS. 23-26. FIG. 50 illustrates the hydraulic pressure versus volumetric flow capacity of the system that corresponds to the pressure and flows depicted in FIGS. 48-49.

As discussed above, heat can be transferred from air (or other gas) that is compressed in the pressure vessel to reduce the work consumed by the compression process. Heat can be transferred from air to a liquid, and/or air to dividers within the compression vessel, and/or from the liquid out of the pressure vessel. In some embodiments, to increase heat transfer, the system can be operated at a relatively slow speed. For example, in some embodiments, a complete compression or expansion cycle may be slow enough to provide additional time for heat transfer between the air and liquid. Enough heat energy may be transferred, according to some embodiments, to approximate an isothermal compression and/or expansion process, achieving work reduction or extraction and the efficiencies associated therewith. Additionally or alternatively, faster speeds may allow larger power levels to be achieved during expansion, isothermally or with temperature changes, which may be desirable at particular times during the system operation.

The use of a liquid (e.g. water) as a medium through which heat passes during compression and/or expansion may allow for a continuous temperature moderation process and may provide a mechanism by which heat may be moved in and/or out of the compression vessel. That is, during compression the liquid may receive heat from air that is being compressed, and pass this heat to the external environment continuously, or in batches, both while air is being compressed and while air is being received by the pressure vessel for later compression. Similarly, heat addition may occur when a compressor/expander device is operating in an expansion mode both during expansion and as expanded air is passed from a pressure vessel.

As discussed above, the liquid within a pressure vessel can be in contact with the air at one or more air/liquid interfaces and air/divider interfaces, across which heat is transferred from air that is compressed and/or to air that is expanded. The pressure vessel can also include a heat exchanger, such as one or more heat pipes as discussed above, that transfers heat between the liquid and an environment that is external to the device. Heat may be moved from air that is compressed and/or to air that is expanded to achieve isothermal or near isothermal compression and/or expansion processes.

FIGS. 51A-51D, 52A-52C, 53, 54A-54B, 55 and 56 each illustrate embodiments of a hydraulic drive system or actuator that can be used to selectively adjust the ratio of hydraulic fluid pressure to the pressure of fluid on a working piston that bounds a working chamber. For example, an actuator can be used to actuate a working piston within a compression and/or expansion device to compress or expand a gas (e.g., air). The compression and/or expansion device can include a reservoir or housing that can contain a gas, a liquid, and/or both a gas and a liquid. An actuator can include one or more states or gears as described above for previous embodiments, to control the movement of the working piston and to maintain a desired relationship between the pressure of fluid in the working chamber and the pressure of the hydraulic fluid in the actuator.

Figure 51A:
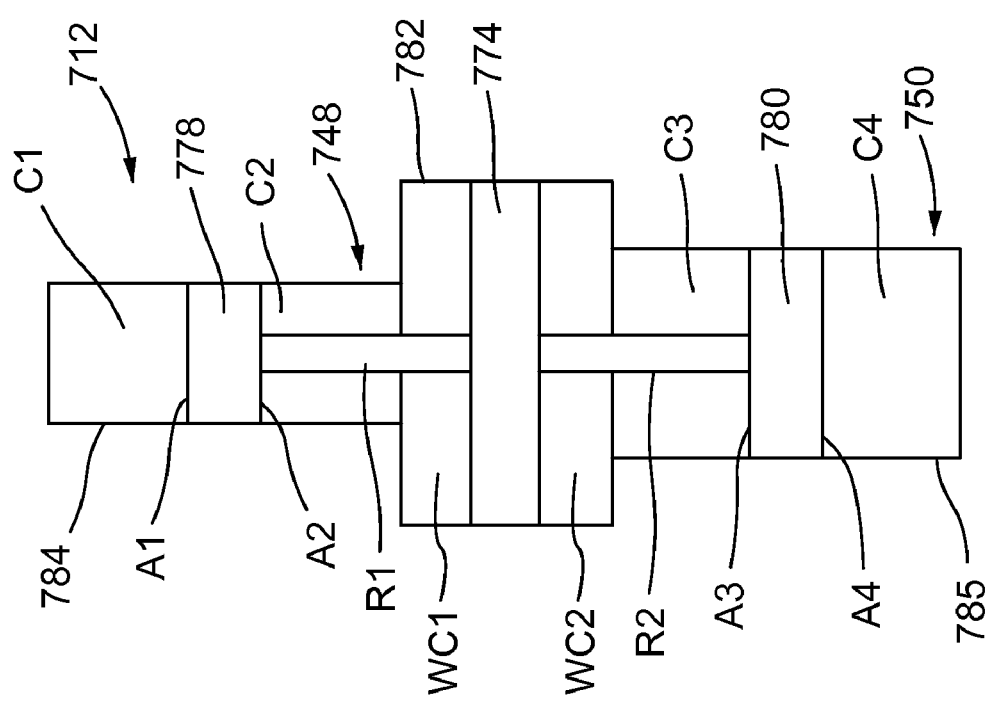
FIG. 51A is a schematic illustration of an actuator according to an embodiment.

In the embodiment shown in FIG. 51A, the actuator includes two hydraulic cylinders, each having a different diameter and a different size (e.g., diameter) hydraulic piston that can actuate (or be actuated by) a working piston (or other driven member) at different hydraulic pressures. Because of the different sized hydraulic pistons, the number of gears and gear shifts can be increased (as compared to the actuator 412 described above that included two hydraulic pistons having the same diameter) due to the various combinations of operating surface areas available to pressurize the hydraulic pistons on either side of the working piston. By having more gears and gear shifts, the hydraulic actuator can operate with a higher degree of pressure selectivity, and thereby possibly operate a pump/motor in a more efficient range of hydraulic pressure for a given range of fluid pressure in the working chamber, or can operate in the same range of hydraulic pressure with a wider range of working chamber pressure, and/or to more closely control the desired output (or input) pressure, flow rate and/or direction of force desired at different stages of operation of a water pump and/or a compression and/or expansion device or system.

FIG. 51A schematically illustrates the various components of a portion of an actuator 712. As shown in FIG. 51A, the actuator 712 includes a hydraulic cylinder 748 and a hydraulic cylinder 750. The hydraulic cylinder 748 includes a housing 784 and a hydraulic piston 778 movably disposed within an interior region defined by the housing 784. The hydraulic cylinder 750 includes a housing 785 and a hydraulic piston 780 movably disposed within an interior region of the housing 785.

The hydraulic piston 778 divides the interior region of housing 784 of the hydraulic cylinder 748 into two portions: a hydraulic fluid chamber C1 above the hydraulic piston 778 and a hydraulic fluid chamber C2 below the hydraulic piston 778. Similarly, the hydraulic piston 790 divides the interior region of housing 785 of the hydraulic cylinder 750 into two portions: a hydraulic fluid chamber C3 above the hydraulic piston 780 and a hydraulic fluid chamber C4 below the hydraulic piston 780. The hydraulic fluid chambers C1 and C2 can be referred to as the blind side and the rod side, respectively, of the hydraulic cylinder 748, and the fluid chambers C3 and C4 can be referred to as the rod side and the blind side, respectively, of the hydraulic cylinder 750.

The hydraulic piston 778 has an operating surface area A1 on the side of the hydraulic piston 778 associated with fluid chamber C1 (the blind side) and an operating surface area A2 on the side associated with the fluid chamber C2 (the rod side). The hydraulic piston 780 has an operating surface area A3 on the side of the hydraulic piston 780 associated with the fluid chamber C3 (the rod side) and an operating surface area A4 on the side associated with fluid chamber C4 (the blind side).

Thus, because of the different sized hydraulic pistons and/or the different sized drive rods R1 and R2, the operating surface areas A1 and A2 of the hydraulic piston 778 are different than the operating surface areas A3 and A4 of the hydraulic piston 780. For example, the rod side operating surface area A2 of hydraulic piston 778 can be smaller than the rod side operating surface area A3 of hydraulic piston 780. It is appreciated that R2 can be made bigger than R1 to a degree that can make A2 equal to A3, or A2 greater than A3. In an example in which hydraulic piston 778 has a smaller diameter than hydraulic piston 780, the blind side operating surface area A1 of hydraulic piston 778 is smaller than the blind side operating surface area A4 of hydraulic piston 780.

The hydraulic piston 778 is coupled to a driven member (in this embodiment a working piston) 774 via a drive rod R1 and the hydraulic piston 780 is coupled to the working piston 774 via a drive rod R2. The working piston 774 is movably disposed within a housing 782 having an interior region that is divided by the working piston 774 into two working chambers, WC1 and WC2, each configured to contain a fluid (e.g., water and/or air). The drive rods R1 and R2 slidably extend though respective openings in the housing 782, each of which can include a seal such that the drive rods R1 and R2 can move within the openings to actuate the working piston 774, but fluid cannot pass between the working chambers WC1, WC2 and the hydraulic fluid chambers C2 and C3, respectively. In this embodiment, a diameter of the drive rod R1 is less than a diameter of the drive rod R2 and a diameter of the hydraulic piston 778 is smaller than a diameter of the hydraulic piston 780.

As described above for other embodiments, the actuator 712 can be operated in one of multiple different gears or states at any given time period during a cycle of the actuator 712 by varying the effective piston ratio (e.g., the net operating surface area of the hydraulic pistons to the surface area of the driven member, e.g. working piston) during a cycle or stroke of the actuator 712. For a given hydraulic fluid pressure, the pressure of a working fluid within the housing 782 can be varied by varying the net operating hydraulically pressurized area of the hydraulic pistons, for convenience the possible area variations can be referred to as "gears". Conversely, for a given working fluid pressure, the hydraulic fluid pressure can be varied, e.g. in an expansion cycle. The quantity and sequence of gears can be varied as desired to achieve a desired relationship between the pressure of the working fluid within the reservoir (which is essentially the same as the pressure of the fluid in the working chamber) and the hydraulic fluid pressure supplied from (or supplied to) the hydraulic pump/motor. Thus, the actuation of the working piston (whether driving gas compression or being driven by gas expansion) can be fine tuned by configuring an optimal gear sequence for a given stroke of the hydraulic actuator 712. As previously described, the number of possible gears for a given actuator can be based on the number of hydraulic cylinders, the size of the pistons, the size of the drive rods and the size of the working piston. In this embodiment, because the pistons 778 and 780 have different diameters and the drive rods R1 and R2 have different diameters, the 16 possible states of the actuator (each of the four chambers can be pressurized or not pressurized) can define 15 possible gears for which the actuator 712 (since the state in which no chambers are pressurized does not produce any net hydraulic piston area). If the drive rods R1 and R2 have the same diameter, the number of possible gears is 14, because when all of the chambers are pressurized, the resulting net operating surface area will be equal to zero, as described in more detail below.

FIGS. 51B and 51C each illustrate different possible gears in which the actuator 712 can operate. These gears are identified for ease of reference as D1-D7 and U1-U7, but this numbering scheme does not necessarily indicate that the states are in order of net surface area. FIG. 51B illustrates gears of the actuator 712 in which the working piston 774 can be driven upward by the actuator 712 (or in which upward movement of the working piston can drive the actuator), and FIG. 51C illustrates gears of the actuator 712 in which the working piston 774 can be driven downward by the actuator 712 (or in which downward movement of the working piston can drive the actuator). As shown in FIGS. 51B and 51C, for a given gear (e.g., D1-D7, U1-U7) of the actuator 712, if a fluid chamber (e.g., C1, C2, C3, C4) is active, i.e. in fluidic communication with the high pressure side of the hydraulic pump/motor (either to receive, and be driven by, pressurized hydraulic fluid provided by the hydraulic pump/motor acting as a pump, or to provide pressurized hydraulic fluid to, and drive, the hydraulic pump/motor acting as a motor), it is shown un-shaded and if a fluid chamber is inactive, i.e. is fluidically isolated from the high pressure side of the hydraulic pump/motor, it is shown shaded (cross-hatched) for that particular gear.

FIG. 51D is a table that includes information that corresponds to the various gears (e.g., D1-D7 and U1-U7) of the actuator 712 in FIGS. 51B and 51C. The table also shows a gear U8 (not shown in FIGS. 51B and 51C) in which all of the chambers C1-C4 are pressurized (described in more detail below). The table of FIG. 51D also shows the associated chambers (C1-C4) of the actuator 712 that are active (in fluidic communication with the high pressure side of the hydraulic pump/motor) for each gear (D1-D7, U1-U8). Specifically, as shown in the table, for a particular gear, P indicates that a chamber (e.g., C1, C2, C3, C4) is pressurized (active), and N indicates that a chamber is not pressurized (inactive). The column labeled DIR indicates which direction a force will be exerted by an active hydraulic fluid chamber (e.g., C1-C4). For example, if only chamber C1 is active (in fluidic communication with the high pressure side of the hydraulic pump/motor), the resulting force on the driven member (e.g. working piston 747) will be in a down direction, and if only chamber C2 is active, the resulting force will be in an up direction. It is understood that "pressurized" means at a first pressure that is relatively high with respect to a second pressure referred to a "not pressurized."

The net operating surface area $A_{net}$ of the actuator 712 for a particular gear is equal to the total of the surface areas (e.g., A1, A2, A3, A4) associated with the chambers (C1-C4) that are active for that gear. For purposes of illustration, the sign convention used in this example refers to a force exerted on the surface areas A1 and A3 as being in a positive (+) direction, and a force exerted on the surface areas A2 and A4 as being in a negative (−) direction. Thus, in this example, considering the driven member to be working piston 774 operating in a compression mode, if the net operating surface area $A_{net}$ is negative, the actuator 712 will cause the working piston 774 to move in the up direction (e.g., gears U1-U8), and if the net operating surface area is positive, the actuator 712 will cause the working piston 774 to move in the down direction. Conversely, if the driven member is working piston 774 operating in an expansion mode, when expanding gas drives working piston 774 in the up direction, gears U1-U8 will be operative so that the active hydraulic chambers associated with those gears to pressurize hydraulic fluid in those chambers and supply that fluid to, and drive in a motor mode, the hydraulic pump/motor.

The different gears can be activated by placing selected hydraulic fluid chambers (e.g., C1, C2, C3, and/or C4) of the actuator 712 into fluidic communication with hydraulic fluid at a working hydraulic pressure (such as supplied by a hydraulic pump/motor operating as a pump, or supplied by the hydraulic fluid chambers to the hydraulic pump/motor operating as a motor), and fluidically isolating the other chambers from the working hydraulic pressure. For example, one or more valves can be coupled to each of the chambers C1-C4 that can be selectively opened (e.g. by a hydraulic controller, as described above and as described below with reference to actuator 812 shown in FIG. 52A) to establish fluidic communication with the high pressure side of the hydraulic pump/motor and to allow hydraulic fluid to be pumped into the chamber. Conversely, the one or more valves can be controlled to isolate the chamber(s) from the high pressure side of the hydraulic pump/motor and to establish fluidic communication with a low pressure reservoir of hydraulic fluid, e.g. to allow hydraulic fluid to be expelled or drained from the chamber as the associated piston moves to reduce the volume of the chamber. One or more gears can be actuated during a single cycle or stroke of the actuator 712 to achieve the desired output pressure of a fluid within the housing 782. In addition, the order of the gears can be varied. Thus, although the gears are labeled D1-D7 and U1-U8 in the figures, the actuator 712 can cycle through one or more gears in a variety of different combinations and orders. For example, in one cycle, the actuator 712 can be configured to cycle through gears D7, D6, D2 and D5, to incrementally increase the pressure of the working fluid within the housing 782 during the cycle.

In one example, as shown in the table of FIG. 51D, and referring to FIG. 51C, to actuate the gear D7, hydraulic fluid at a working pressure is selectively communicated to the chamber C1 and the chamber C2 of the hydraulic cylinder 748 and will exert hydraulic pressure on surface areas A1 and A2 in a down and an up direction, respectively. Because the surface area A1 is greater than the surface area A2, the net operating surface area $A_{net}$ (A1−A2) will be positive, and the resulting hydraulic force will move the hydraulic piston 778 downward, which in turn will move the working piston 774 downward. In another example, to actuate the gear U2, hydraulic fluid at a working pressure is selectively communicated to the chamber C2 and C4, as shown in FIG. 51B, which will exert hydraulic pressure on surface areas A2 and A4 in an up direction, resulting in a net operating surface area $A_{net}$ that is negative ($A_{net}$=−A2+−A4). Thus, the hydraulic force will move the hydraulic piston 778 upward, which in turn will move the working piston 774 upward.

Referring to gear U8 in the table of FIG. 51D (but not shown in FIGS. 51B and 51C), if hydraulic fluid at a working pressure is selectively communicated to all the chambers (C1-C4), hydraulic pressure will be exerted on surface areas A1 and A3 in a down direction (i.e., positive), and surface areas A2 and A4 in an up direction (i.e., negative) and the resulting net operating surface area will be $A_{net}$=A1−A2+A3−A4. Because the diameter of drive rod R1 and the diameter of drive rod R2 are different in this example embodiment, the resulting net operating area $A_{net}$ will not be equal to zero; rather, there is a net operating surface area $A_{net}$, which is equal to the difference in the cross-sectional areas of the two rods. If the diameter of drive rod R1 and the diameter of drive rod R2 are equal, the resulting net operating surface area will be zero, and thus the force on the working piston will be zero.

The bottom row of the table of FIG. 51D illustrates the possible gears associated with the actuator 712 if the blind side and rod side surface areas of the hydraulic piston 778 are the same as the blind side and rod side surface areas of the hydraulic piston 780, respectively (i.e., diameter of piston 778=diameter of piston 780, A4=A1, A2=A3 and R1=R2). Such an embodiment is similar to the actuator 412 described above. As shown in the table, and referring, for example, to gear D1 in FIG. 51C, in such an embodiment, if hydraulic fluid at a working pressure is selectively communicated to fluid chambers C1, C3 and C4, because the pistons 778 and 780 are equal in this example, the hydraulic pressure exerted on surface areas A1 and A4 will cancel each other out, and the resulting net operating surface area $A_{net}$ will be equal to surface area A3. This will cause the hydraulic piston 780 to move downward, which in turn will move the water piston 774 downward. In another example, if hydraulic fluid at a working pressure is selectively communicated to fluid chambers C2 and C3, as shown in gear D3 in FIG. 51C, because the surface area A1 equals the surface area A3, in this example, the resulting force on the water piston will be zero. As shown in the table, in this example (e.g., where piston 778=piston 780, and rod 2=rod 3), gear D6 is the same as gear D3, and gear D2 is the same as gear D5. Thus, the total number of different gears available for such an embodiment is equal to 8; 4 in an up direction and 4 in a down direction.

Figure 52A:
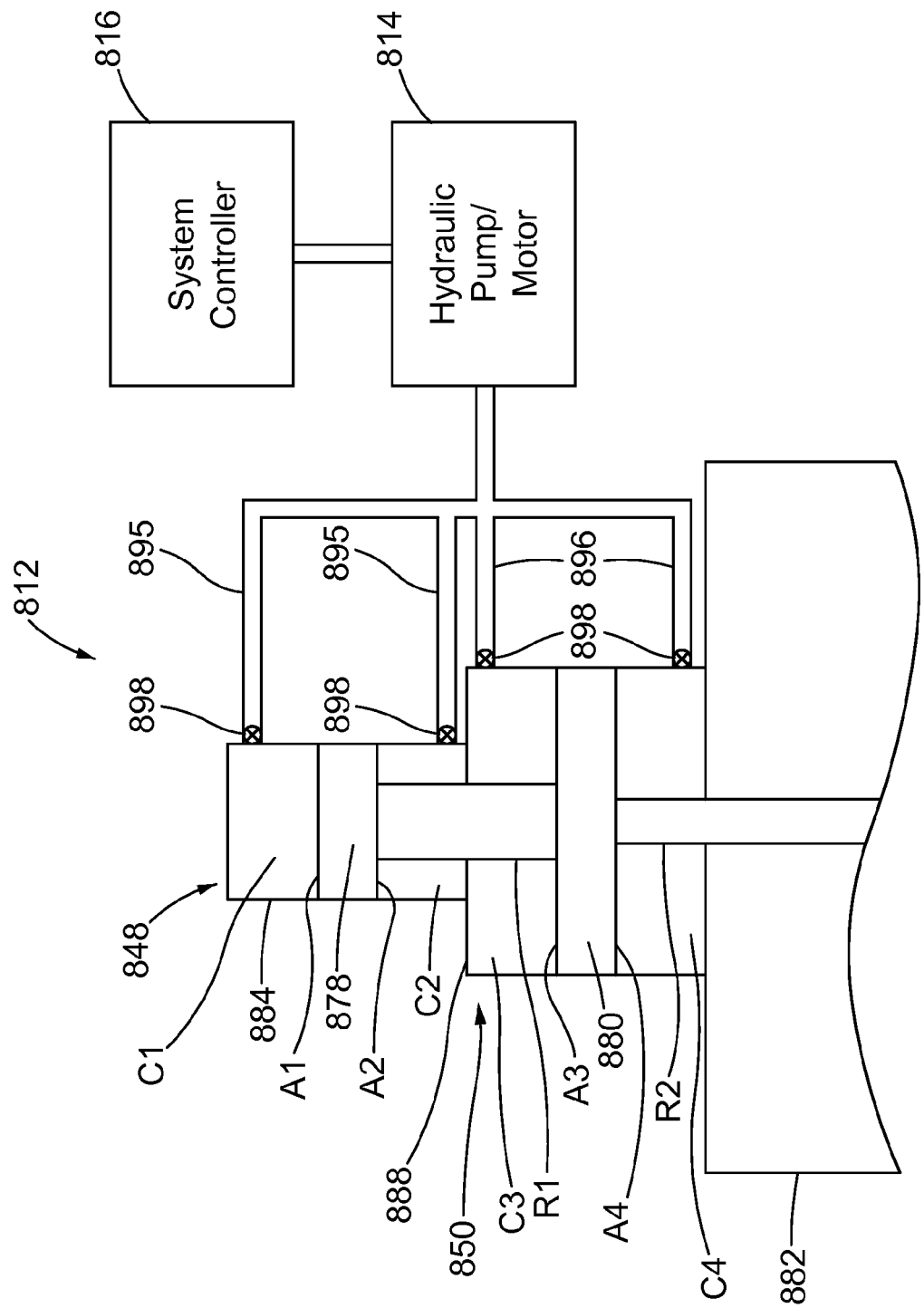
FIG. 52A is a schematic illustration of an actuator according to another embodiment.

FIG. 52A illustrates another embodiment of an actuator that can be used with the devices and systems described herein. This embodiment illustrates an actuator that can include multiple hydraulic cylinders operatively coupled on one end of a working piston and configured to actuate the working piston. FIG. 52A illustrates two different sized hydraulic cylinders, each having different diameter hydraulic pistons. It should be understood, however, that more than two hydraulic cylinders can be used and/or one or more hydraulic cylinders can also be operatively coupled to the opposite end of the working piston.

Specifically, FIG. 52A schematically illustrates the various components of a portion of an actuator 812. As shown in FIG. 52A, the actuator 812 includes a hydraulic cylinder 848 including a housing 884 that defines an interior region and a hydraulic piston 878 movably disposed within the interior region of the housing 884, and a hydraulic cylinder 850 including a housing 885 and a hydraulic piston 880 movably disposed within the interior region of the housing 885. A drive rod R1 is coupled to the hydraulic piston 880 of the hydraulic cylinder 850 and the hydraulic piston 878 of the hydraulic cylinder 848, and a drive rod R2 is coupled to the hydraulic piston 880 of the hydraulic cylinder 850 and can be coupled to a working piston (not shown) disposed within a housing 882 configured to contain a volume of fluid, as described above for previous embodiments. In this example embodiment, the hydraulic piston 878 has a smaller diameter than the hydraulic piston 880 and a diameter of the hydraulic drive rod R1 is greater than a diameter of the hydraulic drive rod R2. It should be understood, however, that the hydraulic piston 878 can alternatively be the same size as, or larger than, the hydraulic piston 880. Similarly, the hydraulic drive rods R1 and R2 can alternatively be the same size, or the hydraulic drive rod R2 can be greater than the hydraulic drive rod R1.

The housing 884 of the hydraulic cylinder 848 defines within its interior region a fluid chamber C1 above the hydraulic piston 878 and a fluid chamber C2 below the hydraulic piston 878. Similarly, the housing 885 of the hydraulic cylinder 850 defines within its interior region a fluid chamber C3 above the hydraulic piston 880 and a fluid chamber C4 below the hydraulic piston 880. In this embodiment, the fluid chambers C1 and C2 can be referred to as a blind side and a rod side, respectively, of the hydraulic cylinder 848, and the fluid chambers C3 and C4 can be referred to as a first rod side and a second rod side, respectively, of the hydraulic cylinder 850.

The hydraulic cylinder 848 is coupled to a hydraulic pump/motor 814 (or other suitable source of pressurized hydraulic fluid) via conduits 895, and the hydraulic cylinder 850 is coupled to the hydraulic pump/motor 814 via conduits 896. The hydraulic pump/motor 814 is coupled to a system controller 816 that can be used to operate and control the hydraulic pump/motor 814 as described for previous embodiments. A valve 898 is coupled between each chamber of the hydraulic cylinders 848 and 850 and the hydraulic pump/motor 814 that can be selectively opened and closed, e.g. under control of the system controller 816, to fluidically couple or fluidically isolate, respectively, the high pressure side of the hydraulic pump/motor 814 to each chamber so that the system or hydraulic controller 816 can selectively actuate (supply pressurized hydraulic fluid to) one or both chambers of one or both of the hydraulic cylinders 848 and 850 in a similar manner as described above for previous embodiments.

The hydraulic piston 878 has an operating surface area A1 on the side associated with fluid chamber C1 (e.g., the blind side) and an operating surface area A2 on the side associated with the fluid chamber C2 (e.g., the rod side). The hydraulic piston 880 has an operating surface area A3 on the side of the hydraulic piston 880 associated with the fluid chamber C3

(e.g., the first rod side) and an operating surface area A4 on the side associated with fluid chamber C4 (e.g., the second rod side).

In this example embodiment, and as shown in FIG. 52A, the operating surface areas A1 and A2 of the hydraulic piston 878 are different than the operating surface areas A3 and A4 of the hydraulic piston 880. For example, the operating surface area A2 of hydraulic piston 878 is smaller than the operating surface areas A3 and A4 of hydraulic piston 880. The operating surface area A4 of hydraulic piston 880 is greater than the operating surface area A3 of hydraulic piston 880, and both are larger than the operating surface areas A1 and A2 of hydraulic piston 878.

FIGS. 52B and 52C each illustrate different possible states or gears (identified as D1-D7, U1-U7) in which the actuator 812 can operate. FIG. 52B illustrates gears of the actuator 812 in which the actuator 812 can move a working piston coupled to the drive rod R2 upward within the housing 882, and FIG. 52C illustrates gears in which the actuator 812 can move the working piston downward within the housing 882. As with the previous embodiment, for a particular gear (e.g., D1-D7, U1-U7) shown in FIGS. 52B and 52C, if a fluid chamber (e.g., C1, C2, C3, C4) is pressurized with hydraulic fluid, it is shown unshaded, and if the fluid chamber is not pressurized with hydraulic fluid it is shown shaded.

The different gears can be activated by selectively fluidically coupling a source of hydraulic fluid at a working hydraulic pressure (e.g. via the hydraulic pump/motor 814 described above) to one or more of the fluid chambers (e.g., C1, C2, C3, and/or C4) of the actuator 812, as described for previous embodiments. For example, a selected one or more of the valves 898 can be selectively opened to pump hydraulic fluid into one or more of the chambers and/or to drain hydraulic fluid out of one or more of the chambers (e.g., at the end of a stroke). One or more of the gears can be actuated during a given cycle of the actuator 812 to achieve a desired output pressure of the fluid within the housing 882. The order of the gears can also be varied. Thus, although the gears are labeled D1-D7 and U1-U7 in FIGS. 52B and 52C, the actuator 812 can cycle through one or more gears in a variety of different combinations and orders as described above for previous embodiments.

A net operating surface area $A_{net}$ of a particular gear is equal to the total of the surface areas (e.g., A1, A2, A3, A4) associated with the chambers (e.g., C1-C4) that are pressurized for a given gear. As described above, in this example embodiment, one or more hydraulic cylinders can also optionally be coupled to an opposite end of the working piston. In such an embodiment, the net operating surface area $A_{net}$ of a particular gear will also include the surface areas associated with pressurized chambers of the hydraulic cylinder(s) operating on the opposite end of the working piston in a similar manner as described above for actuator 712.

Figure 53:
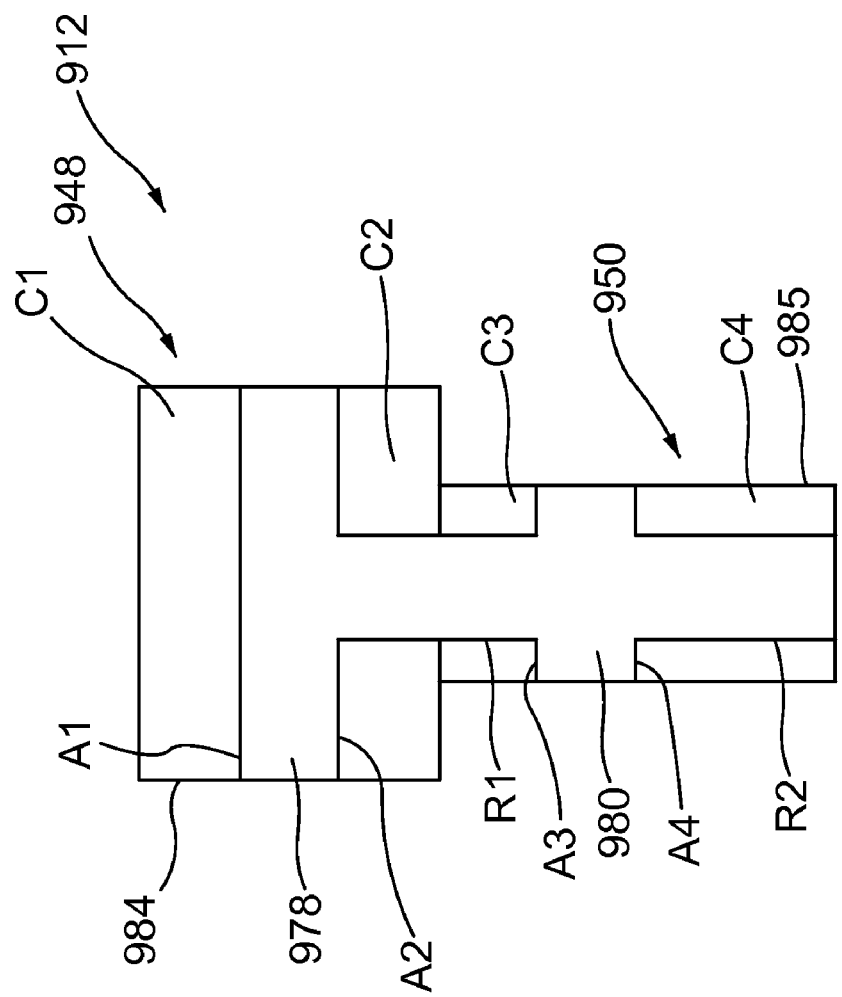
FIG. 53 is a schematic illustration of an actuator according to another embodiment.

FIG. 53 illustrates a variation of the actuator 812 in which the drive rod connecting the actuator to a working piston is coupled to the smaller of two hydraulic pistons and the drive rods have the same diameter. The actuator 912 includes a hydraulic cylinder 948 including a housing 984 that defines an interior region and a hydraulic piston 978 movably disposed within the interior region of the housing 984, and a hydraulic cylinder 950 including a housing 985 and a hydraulic piston 980 movably disposed within the interior region of the housing 985. A drive rod R1 is coupled to the hydraulic piston 978 and the hydraulic piston 980, and a drive rod R2 is coupled to the hydraulic piston 980 and can be coupled to a working piston (not shown) disposed within a housing (not shown) as described above for previous embodiments. In this embodiment, a diameter of the hydraulic piston 978 is greater than a diameter of the hydraulic piston 980, and a diameter of the drive rod R1 is equal to a diameter of the drive rod R2.

The housing 984 of the hydraulic cylinder 948 defines within its interior region a fluid chamber C1 above the hydraulic piston 978 and a fluid chamber C2 below the hydraulic piston 978. The housing 985 of the hydraulic cylinder 950 defines within its interior region a fluid chamber C3 above the hydraulic piston 980 and a fluid chamber C4 below the hydraulic piston 980. The hydraulic piston 978 has an operating surface area A1 on the side associated with fluid chamber C1 and an operating surface area A2 on the side associated with the fluid chamber C2. The hydraulic piston 980 has an operating surface area A3 on the side of the hydraulic piston 980 associated with the fluid chamber C3 and an operating surface area A4 on the side associated with fluid chamber C4.

As with the previous embodiments, the actuator 912 can be operated in multiple different gears to move a working piston (not shown) within a housing (not shown). A net operating surface area $A_{net}$ of a particular gear is equal to the total of the surface areas (e.g., A1, A2, A3, A4) associated with the chambers (e.g., C1-C4) that are pressurized for a given gear as previously described. One or more hydraulic cylinders can also optionally be coupled to an opposite end the working piston. In such an embodiment, the net operating surface area $A_{net}$ of a particular gear will also include the surface areas associated with pressurized chambers of the hydraulic cylinder(s) operating on the opposite end of the working piston in a similar manner as described above for other embodiments.

FIGS. 54A and 54B illustrate yet another embodiment of an actuator that can be used with the devices and systems described herein. In this embodiment, the actuator can move from one gear to another without having to selectively open a valve. An actuator 1012 includes a hydraulic cylinder 1048 including a housing 1084 that defines an interior region and a hydraulic piston 1078 movably disposed within the interior region of the housing 1084, and a hydraulic cylinder 1050 including a housing 1085 and a hydraulic piston 1080 movably disposed within the interior region of the housing 1085. A hydraulic drive rod R1 is coupled to the hydraulic piston 1080 of the hydraulic cylinder 1050 and the hydraulic piston 1078 of the hydraulic cylinder 1048. A hydraulic drive rod R2 is coupled to the hydraulic piston 1080 of the hydraulic cylinder 1050 and is coupled to a working piston 1074 movably disposed within a housing 1082 configured to contain a volume of fluid therein, as described above for previous embodiments. In this embodiment, the housing 1084 of the hydraulic cylinder 1048 is in fluid communication with the housing 1085 of the hydraulic cylinder 1080 such that the hydraulic piston 1078 can move between the interior region of the housing 1084, as shown in FIG. 54B, and the interior region of the housing 1085 as shown in FIG. 54A.

When the hydraulic piston 1078 is disposed within the housing 1085 (as shown in FIG. 54A), a hydraulic fluid chamber C1 is defined collectively by the housing 1084 and the housing 1085 above the hydraulic piston 1078 and above the hydraulic piston 1080, and a hydraulic fluid chamber C2 is defined below the hydraulic piston 1080. When the hydraulic piston 1078 engages the housing 1084 (as shown in FIG. 54B), a hydraulic fluid chamber C3 is defined by the housing 1084 above the hydraulic piston 1078, a hydraulic fluid chamber C2 is defined below the hydraulic piston 1080 and a hydraulic fluid chamber C4 is defined above the hydraulic piston 1080 and below the hydraulic piston 1078. Thus, as the hydraulic piston 1078 moves between the hydraulic cylinders 1048 and 150, the hydraulic fluid chambers can be redefined.

When the hydraulic piston 1078 is disposed with the housing 1085 (as shown in FIG. 54A), the fluid chamber C1 can be referred to as a blind side of collectively the hydraulic cylinder 1048 and the hydraulic cylinder 1050, and the fluid chamber C2 can be referred to as the rod side of the hydraulic cylinder 1050. When the hydraulic piston 1078 engages the housing 1084, the fluid chamber C3 can be referred to as the blind side of the hydraulic cylinder 1048, the fluid chamber C2 is still referred to as the rod side of hydraulic cylinder 1050, and the fluid chamber C4 can be referred to as a rod side of collectively the hydraulic cylinder 1048 and the hydraulic cylinder 1050.

In this embodiment, the hydraulic piston 1078 has a smaller diameter than the hydraulic piston 1080 and a diameter of the hydraulic drive rod R1 is equal to a diameter of the hydraulic drive rod R2. As with other embodiments described herein, the hydraulic pistons 1078 and 1080 can have other sizes relative to each other, and the drive rods R1 and R2 can have other sizes relative to each other. For example, the hydraulic piston 1078 can be larger than the hydraulic piston 1080. In such an embodiment, the set of possible gears can be changed based on the relative sizes of the hydraulic pistons and/or the position of the hydraulic pistons relative to the working piston. The hydraulic piston 1078 has an operating surface area A1 and an operating surface area A2, and the hydraulic piston 1080 has an operating surface area A3 and an operating surface area A4 as shown in FIGS. 54A and 54B.

As with the previous embodiments, the actuator 1012 can be operated in multiple different gears to move the working piston 1074 within the housing 1082. A net operating surface area $A_{net}$ of a particular gear is equal to the total of the surface areas (e.g., A1, A2, A3, A4) associated with the chambers (e.g., C1, C2, C3, C4) that are pressurized for a given gear as previously described. The different gears can be activated by selectively fluidically coupling a source of hydraulic fluid at a working hydraulic pressure (e.g. via a hydraulic pump) to one or more of the fluid chambers (e.g., C1, C2, C3, and/or C4) of the actuator 1012, as described for previous embodiments. For example, as shown in FIGS. 54A and 54B, a conduit 1095 can be coupled to and in fluid communication with the interior region of housing 1084, and conduits 1096 and 1097 can be coupled to and in fluid communication with the housing 1085. Each of the conduits 1095, 1096 and 1097 can be coupled to for example, a hydraulic pump (not shown) to supply pressurized hydraulic fluid. Valves 1098 can be coupled to the conduits 1095, 1096 and 1097 and/or to the respective housings 1084, 1085, and used to selectively open fluid communication to the various fluid chambers of actuator 1012.

In this example, the number of possible gears and gear shifts for the actuator 1012 also varies when the hydraulic piston 1078 engages the housing 1084. Thus, during one cycle or stroke of the actuator 1012, the possible number of gears will change. For example, when the hydraulic piston 1078 is disposed within the housing 1085, there are four possible pressurization states (two chambers, each pressurized or not pressurized), so the number of possible gears is equal to three; one gear defined when hydraulic fluid is pumped into fluid chamber C1, one gear defined when hydraulic fluid is pumped into fluid chamber C2, and one gear defined when hydraulic fluid is pumped into both fluid chamber C1 and C2. In one example gear, if fluid chamber C1 is selectively fluidically coupled to a source of hydraulic fluid at a working hydraulic pressure via one or both of the conduits 1095 and 1096, the net operating surface area $A_{net}$ will be equal to (A1+A3−A2), and the resulting force will be in a direction to the right. If both the fluid chamber C1 and the fluid chamber C2 are selectively fluidically coupled to a source of hydraulic fluid at a working hydraulic pressure, the net operating surface area $A_{net}$ will be equal to (A1+A3−A2−A4), and the resulting force will again be in a direction to the right.

When the hydraulic piston 1078 engages with and/or is disposed within the housing 1084 (as shown in FIG. 54B), the number of possible gears will increase because the number of different fluid chambers increases. The piston 1078 separates chamber C1 into two chambers—C3 and C4. This allows 8 pressurization states (three chambers, each pressurized or not pressurized), so the number of possible gears will be equal to seven (each chamber individually, each combination of two of the chambers, and all the chambers). In one example gear, fluid chamber C3 can be selectively fluidically coupled to a source of hydraulic fluid at a working hydraulic pressure, and the net operating surface area $A_{net}$ will be equal to A1, and the resulting force will be in a direction to the right. In another example, the fluid chamber C3 and the fluid chamber C2 can both be selectively fluidically coupled to a source of hydraulic fluid at a working pressure and the net operating surface area $A_{net}$ will be equal to (A1+A3−A2−A4), and the resulting force will again be in a direction to the right. Thus, in this example, the net operating surface area $A_{net}$ is the same as when fluid chamber C1 (in FIG. 54A) is pressurized with hydraulic fluid as described above.

The number of possible gears can also be increased if a hydraulic cylinder(s) is operatively coupled to the other side of the working piston 1074. Thus, although not shown in FIGS. 54A and 54B, one or more hydraulic cylinders can also be operatively coupled to the working piston 1074. In such an embodiment, the net operating surface area $A_{net}$ can be determined in the same manner as described for previous embodiments.

Figure 55:
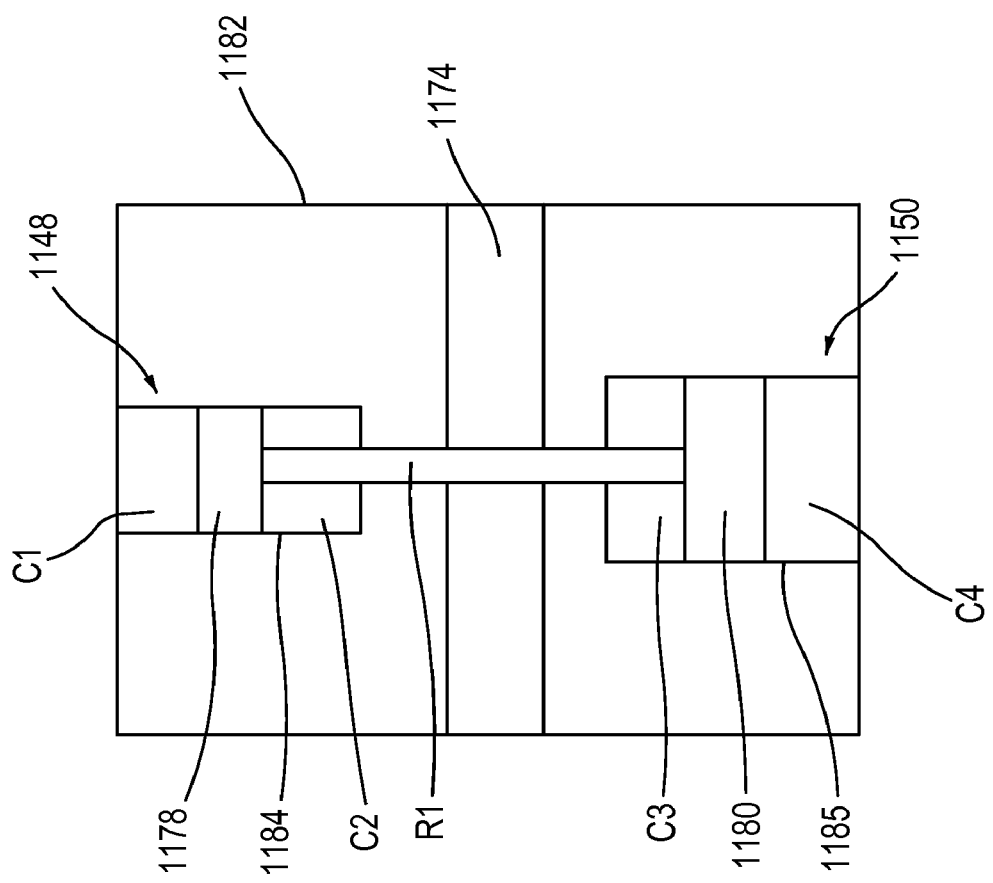
FIG. 55 is a schematic illustration of an actuator according to another embodiment.

FIG. 55 illustrates an embodiment of an actuator in which the hydraulic cylinders are disposed within the reservoir or housing in which the working piston is disposed. Such an embodiment may be desirable, for example, to reduce the space required for the particular device to be actuated. An actuator 1112 includes a hydraulic cylinder 1148 and a hydraulic cylinder 1150 each coupled to a housing 1182 and disposed within an interior region defined by the housing 1182, in which a gas can be compressed and/or from which a fluid can be discharged and/or a into which a liquid can be received. The housing 1182 is configured to contain a volume of fluid within its interior region. The hydraulic cylinder 1148 includes a housing 1184 and a hydraulic piston 1078 movably disposed within an interior region defined by the housing 1184. The hydraulic cylinder 1150 includes a housing 1185 and a hydraulic piston 1080 movably disposed within an interior region of the housing 1185. A working piston 1174 is movably disposed within an interior region of the housing 1182 and is coupled to the hydraulic piston 1178 and the hydraulic piston 1180 via a single drive rod R1, such that the working piston 1174 can move with movement of the hydraulic piston 1178 and the hydraulic piston 1180.

The housing 1084 defines within its interior region a hydraulic fluid chamber C1 and a hydraulic fluid chamber C2, and the housing 1085 defines within its interior region a hydraulic fluid chamber C3 and a hydraulic fluid chamber C4. The determination of gears and net operating surface areas associated with a particular gear can be determined in the same or similar manner as described above for previous embodiments, and is, therefore, not described in detail with reference to this embodiment. The hydraulic pistons 1178 and 1180 can be actuated to move within their respective housings 1184 and 1185 and move the working piston 1174 up and down within the housing 1182.

Figure 56:
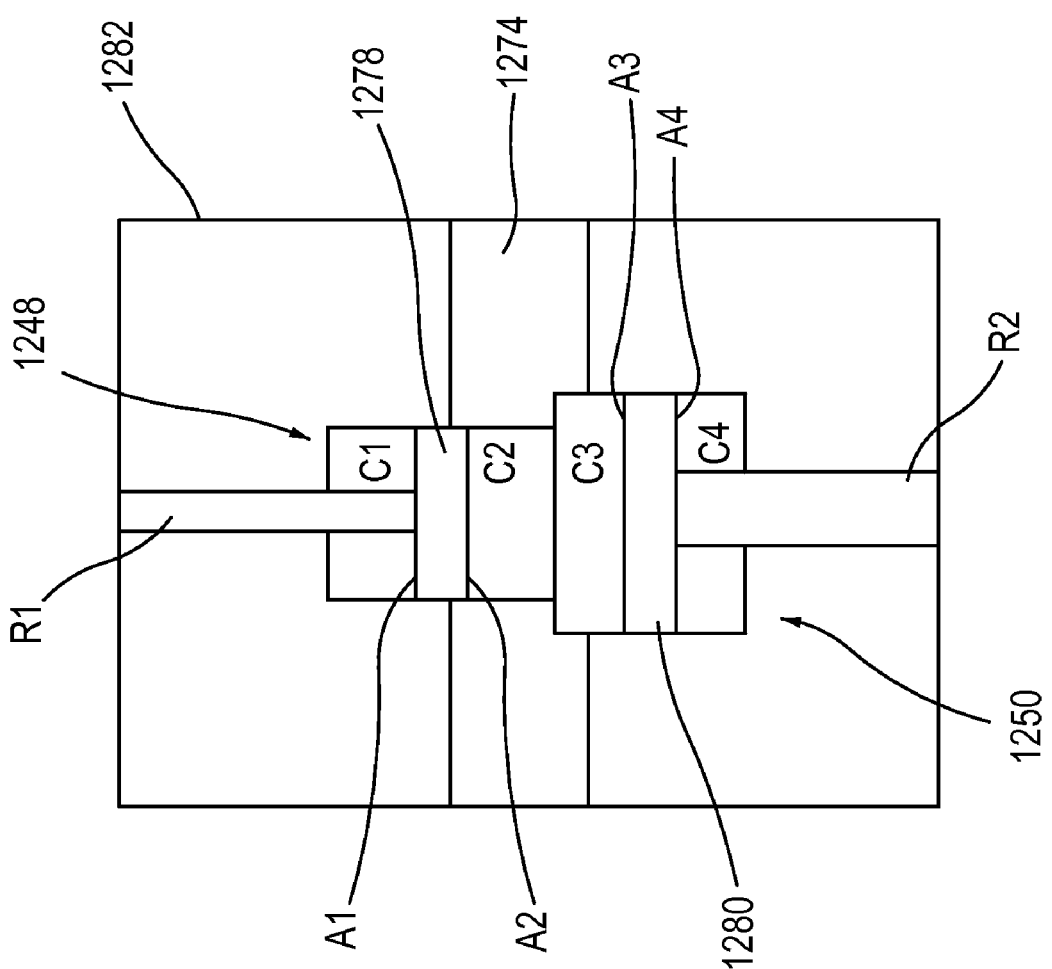
FIG. 56 is a schematic illustration of an actuator according to another embodiment.

FIG. 56 illustrates an embodiment of an actuator in which the housings of the hydraulic cylinders are fixedly coupled to the working piston within the reservoir or housing in which the working piston is disposed, such that the hydraulic pistons remain stationary and the housings and the working piston move relative to the hydraulic pistons. An actuator 1212 includes a hydraulic cylinder 1248 and a hydraulic cylinder 1280 each disposed within an interior region of a housing 1282 configured to contain a volume of fluid therein. The hydraulic cylinder 1248 includes a housing 1284 and a hydraulic piston 1278 movably disposed within an interior region of the housing 1284, and the hydraulic cylinder 1250 includes a housing 1285 and a hydraulic piston 1280 movably disposed within an interior region of the housing 1285. A drive rod R1 is coupled to the hydraulic piston 1278 and to the housing 1282, and a drive rod R2 is coupled to the hydraulic piston 1280 and to the housing 1282. A working piston 1274 is movably disposed within the interior region of the housing 1282. The working piston is coupled to the housing 1284 and the housing 1285 such that the working piston 1274, the housing 1284, and the housing 1285 can move together relative to the hydraulic piston 1278 and the hydraulic piston 1280 when the actuator 1212 is actuated. Thus, rather than the hydraulic pistons 1278 and 1280 moving relative to the housings 1284 and 1285, respectively, when the actuator 1212 is actuated, the housings 1284 and 1285 (along with the working piston) will move relative to their respective pistons 1278 and 1280.

The housing 1284 defines within its interior region a hydraulic fluid chamber C1 and a hydraulic fluid chamber C2, and the housing 1285 defines within its interior region a hydraulic fluid chamber C3 and a hydraulic fluid chamber C4. The gears and net operating surface areas associated with a particular gear can be determined in the same or similar manner as described above for previous embodiments, and is, therefore, not described in detail with reference to this embodiment.

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, the sizes (e.g., diameters, lengths, etc.) of the various components can be varied to provide a desired output of the system. Although FIGS. 7-22 illustrate the various water pumps being different sizes, each of the water pumps can be configured to be the same size and provide the same function and output for a given stage of the system.

Although the liquid in the compressor/expander devices was described above as including water, other liquids can be used, additionally or alternatively. As is to be appreciated, water may naturally condense out of air that is being compressed by the system, and in this respect, may combine with the liquid without adverse impact. Additionally, when used in embodiments of the expander/compressor devices, water may evaporate into air during expansion without having an adverse impact. Other types of liquids, however, may be used in addition to or in place of water. Some examples of such liquids may include additives or entire liquids formulated to prevent freezing, such as glycol, liquids that prevent evaporation, such as glycerin, and/or liquids to prevent foaming. Similarly, although the gas in the compressor/expander device was described above as being air (which is a convenient choice, so that ambient air can be used), other gases can be used, additionally or alternatively.

In addition, although the system 400 was described as having two stages each with two water pumps, and the water pumps are each actuated by two hydraulic cylinders (an upper and a lower hydraulic cylinder), in alternative embodiments, more hydraulic cylinders can be coupled to the top and bottom of a water pump, which can provide additional possible gear modes. In addition, in other embodiments, a system can be configured with a different number of water pumps and/or a different number of stages, which can provide additional possible gear modes. In addition, the systems and methods described herein can be controlled using known computer systems and control system used for such purposes.

Although in the embodiments described above, the driven member that is driven by (or that drives) the hydraulic actuator(s) is a piston that directly or indirectly applies pressure to (or receives pressure from) a gas to be compressed (or expanded), in alternative embodiments the driven member can be any member desired to be driven to supply mechanical power, or to receive mechanical power and be driven. Examples of other applications for the disclosed systems and methods include hydro-mechanical actuators such as those used on commercial aircraft, applications that have a widely varying force profile such as a hydraulic or pneumatic log splitter, lock gates and ocean weirs, and shock absorbers as used on cars and trucks.

The system controller (e.g., 414, 814) can include, for example, a processor-readable medium storing code representing instructions to cause a processor to perform a process. The processor can be, for example, a commercially available personal computer, or other computing or processing device that is dedicated to performing one or more specific tasks. For example, the processor can be a terminal dedicated to providing an interactive graphical user interface (GUI). The processor, according to one or more embodiments, can be a commercially available microprocessor. Alternatively, the processor can be an application-specific integrated circuit (ASIC) or a combination of ASICs, which are designed to achieve one or more specific functions, or enable one or more specific devices or applications. In yet another embodiment, the processor can be an analog or digital circuit, or a combination of multiple circuits.

The processor can include a memory component. The memory component can include one or more types of memory. For example, the memory component can include a read only memory (ROM) component and a random access memory (RAM) component. The memory component can also include other types of memory that are suitable for storing data in a form retrievable by the processor. For example, electronically programmable read only memory (EPROM), erasable electronically programmable read only memory (EEPROM), flash memory, magnetic disk memory, as well as other suitable forms of memory can be included within the memory component. It is recognized than any and all of these memory components can be accessed by means of any form of communication network. The processor can also include a variety of other components, such as for example, co-processors, graphic processors, etc., depending upon the desired functionality of the code.

The processor can be in communication with the memory component, and can store data in the memory component or retrieve data previously stored in the memory component. The components of the processor can be configured to communicate with devices external to the processor by way of an input/output (I/O) component. According to one or more embodiments, the I/O component can include a variety of suitable communication interfaces. For example, the I/O component can include, for example, wired connections, such as standard serial ports, parallel ports, universal serial bus (USB) ports, S-video ports, local area network (LAN) ports, small computer system interface (SCCI) ports, analog to digital interface input devices, digital to analog interface output devices, and so forth. Additionally, the I/O component can include, for example, wireless connections, such as infrared ports, optical ports, Bluetooth® wireless ports, wireless LAN ports, or the like. The processor can also be connected to a network, which may be any form of interconnecting network including an intranet, such as a local or wide area network, or an extranet, such as the World Wide Web or the Internet. The network can be physically implemented on a wireless or wired network, on leased or dedicated lines, including a virtual private network (VPN).

What is claimed is:

1. An apparatus for optimizing the efficiency of hydraulic actuation systems and suitable for use in the conservation of energy resources, the apparatus comprising:
    a working actuator having a working cylinder and a working piston disposed for reciprocating movement in the working cylinder, the working piston defining at least in part between a first side thereof and the working cylinder a working chamber having an effective working piston surface area upon which the application of a working pressure of working fluid in the working chamber produces a working force on the first side of the working piston acting in a first direction;
    a pressure vessel having an interior region fluidically coupled to the working actuator and defining in part therewith the working chamber, movement of the working piston in a second direction, opposite the first direction, causing a reduction in the volume of the working chamber and compression of a gas contained in the working chamber or movement of the working piston in the first direction causing an increase in the volume of the working chamber and expansion of a gas contained in the working chamber;
    a hydraulic actuator coupled to the working piston, the hydraulic actuator including a hydraulic cylinder and a hydraulic piston disposed for reciprocating movement in the hydraulic cylinder, the hydraulic piston dividing the hydraulic cylinder into, and defining therewith, a first hydraulic chamber and a second hydraulic chamber,
    the first hydraulic chamber having a first hydraulic fluid port and having a first effective hydraulic piston surface area upon which the application of a hydraulic pressure of hydraulic fluid in the first hydraulic chamber produces a first hydraulic force on the hydraulic piston acting in the second direction,
    the second hydraulic chamber having a second hydraulic fluid port and having a second effective hydraulic piston surface area upon which the application of the hydraulic pressure of hydraulic fluid in the second hydraulic chamber produces a second hydraulic force on the hydraulic piston acting in the first direction,
    the second effective hydraulic piston area being less than the first effective hydraulic piston area and the second hydraulic force being less than the first hydraulic force; and
    a hydraulic controller fluidically coupleable to the first hydraulic fluid port, the second hydraulic fluid port, and to pressurized hydraulic fluid, the hydraulic controller operable in a first operating state in which the pressurized hydraulic fluid is fluidically coupled to the first hydraulic fluid port but not the second hydraulic fluid port, a second operating state in which the pressurized hydraulic fluid is fluidically coupled to the second hydraulic fluid port but not the first hydraulic fluid port, a third operating state in which the pressurized hydraulic fluid is fluidically coupled both to the first hydraulic fluid port and the second hydraulic fluid port, and a fourth operating state in which the pressurized hydraulic fluid is fluidically isolated from the first hydraulic port and the second hydraulic port,
    the hydraulic controller being operable with pressurized hydraulic fluid having the hydraulic pressure to cause the hydraulic actuator to produce a selected hydraulic actuator force on the working piston: a) in the first operating state the hydraulic actuator force acting in the second direction and being approximately equal to the first hydraulic force, b) in the second operating state the hydraulic actuator force acting in the first direction and being approximately equal to the second hydraulic force, and c) in the third operating state the hydraulic actuator force acting in the second direction and being approximately equal to the difference between the first hydraulic force and the second hydraulic force,
    whereby operation of the hydraulic controller to produce a hydraulic actuator force in the second direction that is greater than the working force results in the working piston and the hydraulic piston moving in the second direction and operation of the hydraulic controller to produce a hydraulic actuator force in the second direction that is less than the working force results in the working piston and the hydraulic piston moving in the first direction.

2. The apparatus of claim 1, wherein the hydraulic actuator is coupled to the working piston by a connecting rod coupled to the working piston and to the hydraulic piston.

3. The apparatus of claim 1, wherein the hydraulic cylinder is a first hydraulic cylinder and the hydraulic piston is a first hydraulic piston, the apparatus further comprising:
    a second hydraulic actuator coupled to the working piston, the hydraulic actuator including a second hydraulic cylinder and a second hydraulic piston disposed for reciprocating movement in the second hydraulic cylinder,
    the second hydraulic piston dividing the second hydraulic cylinder into, and defining therewith, a third hydraulic chamber and a fourth hydraulic chamber,
    the third hydraulic chamber having a third hydraulic fluid port and having a third effective hydraulic piston surface area upon which the application of the hydraulic pressure of hydraulic fluid in the third hydraulic chamber produces a third hydraulic force on the hydraulic piston acting in the second direction,
    the hydraulic controller being further operable in a fifth operating state in which the source of pressurized hydraulic fluid is fluidically coupled to the third hydraulic port but not the first or second hydraulic fluid port, a sixth operating state in which the source of pressurized hydraulic fluid is coupled to the first hydraulic port and the third hydraulic port but not the second hydraulic fluid port, and a seventh operating state in which the source of pressurized hydraulic fluid is fluidically coupled to the first hydraulic port, the second hydraulic port, and the third hydraulic port, the hydraulic controller being further operable with pressurized hydraulic fluid having the hydraulic pressure to cause the hydraulic actuator to produce a selected hydraulic actuator force on the working piston: d) in the fifth operating state the hydraulic actuator force acting in the second direction and being approximately equal to the third hydraulic force, b) in the sixth operating state the hydraulic actuator force acting in the second direction and being approximately equal to the sum of the first hydraulic force and the third hydraulic force, and c) in the seventh operating state the hydraulic actuator force acting in the second direction and being approximately equal to the difference between the sum of the third hydraulic force and difference between the first hydraulic force and the second hydraulic force.

4. The apparatus of claim 3, wherein the working piston is disposed between the first hydraulic actuator and the second hydraulic actuator.

5. The apparatus of claim 3, wherein the first hydraulic actuator is disposed between the second hydraulic actuator and the working piston.

6. The apparatus of claim 5, wherein the first hydraulic actuator is coupled to the working piston by a first piston rod coupled to the working piston and to the first hydraulic piston and the second hydraulic piston is coupled to the first hydraulic piston by a second piston rod.

7. The apparatus of claim 1, wherein the pressurized hydraulic fluid is in fluidic communication with the high pressure side of a hydraulic pump.

8. The apparatus of claim 1, wherein the pressurized hydraulic fluid is in fluidic communication with the high pressure side of a hydraulic motor.

9. An apparatus for optimizing the efficiency of hydraulic actuation systems and suitable for use in the conservation of energy resources, the apparatus comprising:

a working actuator having a working cylinder and a working piston disposed for reciprocating movement in the working cylinder, the working piston defining at least in part between a first side thereof and the working cylinder a working chamber within which a gas can be contained;

a first hydraulic actuator operably coupled to said working piston and having a first hydraulic cylinder and a first hydraulic piston movably disposed in said first hydraulic cylinder and defining therewith a first hydraulic chamber on a first side of the first hydraulic piston and a second hydraulic chamber on a second, opposite side of the first hydraulic piston, said first hydraulic chamber defining a first hydraulic piston area upon which application of a pressurized hydraulic fluid produces a force on the working piston acting in a first direction, said second hydraulic chamber defining a second hydraulic piston area, smaller than said first hydraulic piston area, upon which application of a pressurized hydraulic fluid produces a force on the working piston acting in a second direction;

a second hydraulic actuator operably coupled to said working piston and having a second hydraulic cylinder and a second hydraulic piston movably disposed in said second hydraulic cylinder and defining therewith a third hydraulic chamber on a first side of the second hydraulic piston and a fourth hydraulic chamber on a second, opposite side of the second hydraulic piston, said third hydraulic chamber defining a third hydraulic piston area upon which application of a pressurized hydraulic fluid produces a force on the working piston acting in the first direction, said fourth hydraulic chamber defining a fourth hydraulic piston area, larger than said third hydraulic piston area, upon which application of a pressurized hydraulic fluid produces a force on the working piston acting in the second direction; and a hydraulic controller coupled to said first hydraulic actuator, said second hydraulic actuator, and fluidically coupleable to pressurized hydraulic fluid, said hydraulic controller operable to selectively provide or not provide the pressurized hydraulic fluid to any one or more of said first, second, third, and fourth hydraulic chambers in at least four combinations, each combination establishing a state of pressurization of said hydraulic chambers, a first state and a second state each producing a net hydraulic piston area upon which application of a hydraulic pressure produces a net actuator force from said first hydraulic actuator and said second hydraulic actuator on said working piston acting in said first direction, a third state and a fourth state producing a net hydraulic piston area upon which application of the hydraulic pressure produces a net actuator force on said working piston acting in said second direction, said first state having a net hydraulic piston area different from said second state, said third state having a net hydraulic piston area different from said fourth state, wherein said hydraulic controller is operable to cause said hydraulic actuators to displace said working piston in said first direction to compress gas contained in said working chamber.

10. The apparatus of claim 9, wherein said hydraulic controller is operable to cause said hydraulic actuators to displace the working piston in the first direction by sequentially establishing said first state and said second state.

11. The apparatus of claim 10, wherein said hydraulic controller is further operable to cause said hydraulic actuators to displace the working piston in the second direction by sequentially establishing said third state and said fourth state.

12. The apparatus of claim 9, wherein said hydraulic controller is further operable to selectively provide or not provide pressurized hydraulic fluid to any one or more of said first, second, third, and fourth hydraulic chambers in at least six combinations, to further establish a fifth state producing a net hydraulic piston area acting in said first direction and to establish a sixth state producing a net hydraulic piston area acting in said second direction, said fifth state having a net hydraulic piston area different from said first state and said second state, said sixth state having a net hydraulic piston area different from said third state and said fourth state.

13. The apparatus of claim 12, wherein said hydraulic controller is further operable to selectively provide or not provide pressurized hydraulic fluid to any one or more of said first, second, third, and fourth hydraulic chambers in at least eight combinations, to further establish a seventh state producing a net hydraulic piston area acting in said first direction and to establish an eighth state producing a net hydraulic piston area acting in said second direction, said seventh state having a net hydraulic piston area different from said first state, said second state, and said fifth state, said eighth state having a net hydraulic piston area different from said third state, said fourth state, and said sixth state.

14. The apparatus of claim 13, wherein each of said first, second, third, and fourth hydraulic piston areas is different from the others of said hydraulic piston areas, said hydraulic controller is further operable to selectively provide or not provide pressurized hydraulic fluid to any one or more of said first, second, third, and fourth hydraulic chambers in at least ten combinations, to further establish a ninth state producing a net hydraulic piston area acting in said first direction and to establish an tenth state producing a net hydraulic piston area acting in said second direction, said ninth state having a net hydraulic piston area different from said first state, said second state, said fifth state, and said seventh state, said tenth state having a net hydraulic piston area different from said third state, said fourth state, said sixth state, and said eighth state.

15. The apparatus of claim 14, wherein said hydraulic controller is operable to cause said hydraulic actuators to displace the working piston in the first direction by sequentially establishing said first state, said second state, said fifth state, said seventh state, and said ninth state.

16. The apparatus of claim 15, wherein said hydraulic controller is further operable to cause said hydraulic actuators to displace the working piston in the second direction by sequentially establishing said third state, said fourth state, said sixth state, said eighth state, and said tenth state.

17. The apparatus of claim 9, wherein the working piston is disposed between the first hydraulic actuator and the second hydraulic actuator.

18. The apparatus of claim 9, wherein the first hydraulic actuator is disposed between the second hydraulic actuator and the working piston.

19. The apparatus of claim 9, wherein the pressurized hydraulic fluid is in fluidic communication with the high pressure side of a hydraulic pump.

20. The apparatus of claim 9, wherein the pressurized hydraulic fluid is in fluidic communication with the high pressure side of a hydraulic motor.

21. An apparatus for optimizing the efficiency of hydraulic actuation systems and suitable for use in the conservation of energy resources, the apparatus comprising:
a hydraulic pump operable to deliver hydraulic fluid over at least a hydraulic pressure range that includes a predetermined lower pressure and a predetermined upper pressure, greater than said lower pressure;
a hydraulic actuator arrangement including a first hydraulic piston and a second hydraulic piston, each of said hydraulic pistons having a first side and a second side; and
a working actuator operably coupled to said hydraulic actuator arrangement, said working actuator having a working cylinder and a working piston disposed for reciprocating movement in the working cylinder, the working piston defining at least in part between a first side thereof and the working cylinder a working chamber configured to contain a quantity of gas,
said hydraulic actuator arrangement being operatively coupled to said hydraulic pump to enable selective delivery of pressurized hydraulic fluid from said hydraulic pump to one or both of said first side and said second side of each of said first and second hydraulic pistons in at least a first, second, and third combinations,
each of said combinations yielding an output force for said hydraulic actuator that is approximately proportional to the pressure of the pressurized hydraulic fluid delivered by said hydraulic pump,
said hydraulic actuator arrangement operable to receive pressurized hydraulic fluid from said hydraulic pump over said hydraulic pressure range and to yield an output force in a first force range corresponding to said first combination, and second force range, greater than said first force range corresponding to said second combination, and a third force range, greater than said second force range, corresponding to said third combination,
said hydraulic actuator arrangement being operable with said hydraulic pump to sequentially yield said first force range, said second force range, and said third force range on said working piston to compress the quantity of gas to correspondingly higher gas pressure ranges.

22. The apparatus of claim 21, wherein said hydraulic actuator arrangement is further operable
to enable selective delivery of pressurized hydraulic fluid from said hydraulic pump to one or both of said first side and said second side of each of said first and second hydraulic pistons in at least a fourth and a fifth combination, and
to receive pressurized hydraulic fluid from said hydraulic pump over said hydraulic pressure range and to yield an output force in a fourth force range, greater than said third force range, corresponding to said fourth combination, and a fifth force range, greater than said fourth force range, corresponding to said fifth combination.

23. The apparatus of claim 21, wherein the hydraulic actuator arrangement is coupled to the working piston by a connecting rod coupled to the working piston and to at least one of said first hydraulic piston and said second hydraulic piston.

24. The apparatus of claim 21, wherein the working piston is disposed between the first hydraulic piston and the second hydraulic piston.

25. The apparatus of claim 24, wherein the first hydraulic piston is coupled to the working piston by a first piston rod and the second hydraulic piston is coupled to the working piston by a second piston rod.

26. The apparatus of claim 21, wherein the first hydraulic piston is disposed between the second hydraulic piston and the working piston.

27. The apparatus of claim 26, wherein the first hydraulic piston is coupled to the working piston by a first piston rod and the second hydraulic piston is coupled to the first hydraulic piston by a second piston rod.

* * * * *